United States Patent
Kanai et al.

(10) Patent No.: US 7,761,779 B2
(45) Date of Patent: Jul. 20, 2010

(54) ACCESS CONTROL APPARATUS, ACCESS CONTROL SYSTEM, PROCESSOR, ACCESS CONTROL METHOD, MEMORY ACCESS CONTROL APPARATUS, MEMORY ACCESS CONTROL SYSTEM, AND MEMORY ACCESS CONTROL METHOD

(75) Inventors: Tatsunori Kanai, Kanagawa (JP); Kenichiro Yoshii, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 910 days.

(21) Appl. No.: 11/519,797

(22) Filed: Sep. 13, 2006

(65) Prior Publication Data

US 2007/0136647 A1 Jun. 14, 2007

(30) Foreign Application Priority Data

Nov. 30, 2005 (JP) ............................. 2005-346518
Mar. 22, 2006 (JP) ............................. 2006-079691

(51) Int. Cl.
*G06F 12/14* (2006.01)

(52) U.S. Cl. ..................................... 714/805; 711/164

(58) Field of Classification Search ................. 714/805; 711/164

See application file for complete search history.

(56) References Cited

U.S. PATENT DOCUMENTS

| | | | | |
|---|---|---|---|---|
| 5,450,563 A | * | 9/1995 | Gregor | 711/3 |
| 5,590,309 A | * | 12/1996 | Chencinski et al. | 711/145 |
| 5,666,411 A | * | 9/1997 | McCarty | 705/51 |
| 5,737,575 A | * | 4/1998 | Blaner | 711/164 |
| 6,230,231 B1 | * | 5/2001 | DeLong et al. | 711/3 |
| 6,754,799 B2 | * | 6/2004 | Frank | 711/216 |
| 6,883,077 B2 | * | 4/2005 | Kimura et al. | 711/164 |
| 7,366,829 B1 | * | 4/2008 | Luttrell et al. | 711/108 |
| 7,472,231 B1 | * | 12/2008 | Cihla et al. | 711/144 |
| 7,590,869 B2 | * | 9/2009 | Hashimoto | 713/194 |

OTHER PUBLICATIONS z/Architecture, "Principles of Operation," IBM, SA22-7832-00, pp. 3-9 to 3-12, (Dec. 2000).
Blahut, "Algebraic Codes for Data Transmission," Cambridge University Press (2003), p. 63.
Hsiao, "A Class of Optimal Minimum Odd-weight-column SEC-DED Codes," IBM J. Res. Develop. (Jul. 1970), pp. 395-401.

* cited by examiner

*Primary Examiner*—Stephen M Baker
(74) *Attorney, Agent, or Firm*—Finnegan, Henderson, Farabow, Garrett & Dunner, L.L.P.

(57) ABSTRACT

An access control apparatus includes a parity generator that generates a parity for original data to be written into a memory; and a parity adder that generates parity-added data by adding the parity to the original data; a first syndrome generator that generates a first syndrome of first mask data to mask the parity-added data. The first syndrome is a value associated beforehand with a first access code to be used when a writer accesses the memory. The apparatus also includes a first mask generator that generates the first mask data based on the first syndrome, the first access code, and a first memory address; a first XOR unit that obtains first post-operation data by calculating an XOR between the parity-added data and the first mask data; and a writing unit that writes the first post-operation data into the memory.

28 Claims, 77 Drawing Sheets

FIG.4

$H =$ [large binary matrix]

FIG.5

$$G = \begin{pmatrix}
10000000000000000000000000000000000000000000000000000000000000011000100\\
01000000000000000000000000000000000000000000000000000000000000011000010\\
00100000000000000000000000000000000000000000000000000000000000011000001\\
00010000000000000000000000000000000000000000000000000000000000010111100\\
00001000000000000000000000000000000000000000000000000000000000010100010\\
00000100000000000000000000000000000000000000000000000000000000010100001\\
00000010000000000000000000000000000000000000000000000000000000010010001\\
00000001000000000000000000000000000000000000000000000000000000010010010\\
00000000100000000000000000000000000000000000000000000000000000001100010\\
00000000010000000000000000000000000000000000000000000000000000001100001\\
00000000001000000000000000000000000000000000000000000000000000011100000\\
00000000000100000000000000000000000000000000000000000000000000001011110\\
00000000000010000000000000000000000000000000000000000000000000001010001\\
00000000000001000000000000000000000000000000000000000000000000110010000\\
00000000000000100000000000000000000000000000000000000000000000011001000\\
00000000000000010000000000000000000000000000000000000000000000001001001\\
00000000000000001000000000000000000000000000000000000000000000000110001\\
00000000000000000100000000000000000000000000000000000000000000101110000\\
00000000000000000010000000000000000000000000000000000000000000001110000\\
00000000000000000001000000000000000000000000000000000000000000000101111\\
00000000000000000000100000000000000000000000000000000000000000010101000\\
00000000000000000000010000000000000000000000000000000000000000011101000\\
00000000000000000000001000000000000000000000000000000000000000011100100\\
00000000000000000000000100000000000000000000000000000000000000010100100\\
00000000000000000000000010000000000000000000000000000000000000010011000\\
00000000000000000000000001000000000000000000000000000000000000010111000\\
00000000000000000000000000100000000000000000000000000000000000000111000\\
00000000000000000000000000010000000000000000000000000000000000010010111\\
00000000000000000000000000001000000000000000000000000000000000001010100\\
00000000000000000000000000000100000000000000000000000000000000000110100\\
00000000000000000000000000000010000000000000000000000000000000000110010\\
00000000000000000000000000000001000000000000000000000000000000001010010\\
00000000000000000000000000000000100000000000000000000000000000001001100\\
00000000000000000000000000000000010000000000000000000000000000000101100\\
00000000000000000000000000000000001000000000000000000000000000000011100\\
00000000000000000000000000000000000100000000000000000000000000011001011\\
00000000000000000000000000000000000010000000000000000000000000000101010\\
00000000000000000000000000000000000001000000000000000000000000000011010\\
00000000000000000000000000000000000000100000000000000000000000000011001\\
00000000000000000000000000000000000000010000000000000000000000000101001\\
00000000000000000000000000000000000000001000000000000000000000000100110\\
00000000000000000000000000000000000000000100000000000000000000000010110\\
00000000000000000000000000000000000000000010000000000000000000000001110\\
00000000000000000000000000000000000000000001000000000000000000000011100101\\
00000000000000000000000000000000000000000000100000000000000000000010101\\
00000000000000000000000000000000000000000000010000000000000000000001101\\
00000000000000000000000000000000000000000000001000000000000000000010011100\\
00000000000000000000000000000000000000000000000100000000000000000010010100\\
00000000000000000000000000000000000000000000000010000000000000000000010011\\
00000000000000000000000000000000000000000000000001000000000000000000001011\\
00000000000000000000000000000000000000000000000000100000000000000000000111\\
00000000000000000000000000000000000000000000000000010000000000011110010\\
00000000000000000000000000000000000000000000000000001000000000000010010100\\
00000000000000000000000000000000000000000000000000000100000000000010000110\\
00000000000000000000000000000000000000000000000000000010000000000010000110\\
00000000000000000000000000000000000000000000000000000001000000000001001010\\
00000000000000000000000000000000000000000000000000000000100000000010001001\\
00000000000000000000000000000000000000000000000000000000010000000010000101\\
00000000000000000000000000000000000000000000000000000000001000000010000011\\
00000000000000000000000000000000000000000000000000000000000100001111001\\
00000000000000000000000000000000000000000000000000000000000010001000101\\
00000000000000000000000000000000000000000000000000000000000001001000011\\
00000000000000000000000000000000000000000000000000000000000000101000011\\
00000000000000000000000000000000000000000000000000000000000000100100101
\end{pmatrix}$$

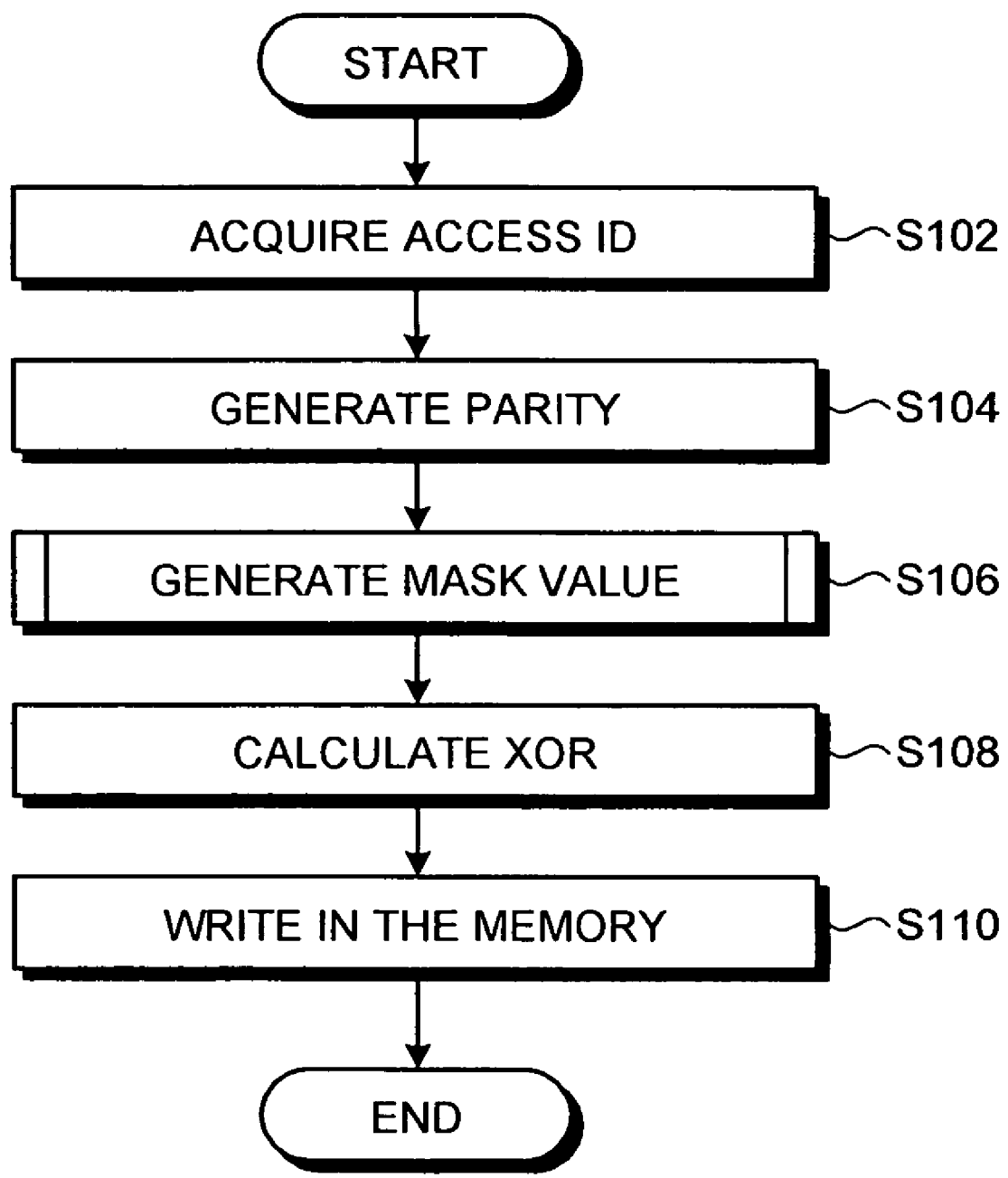

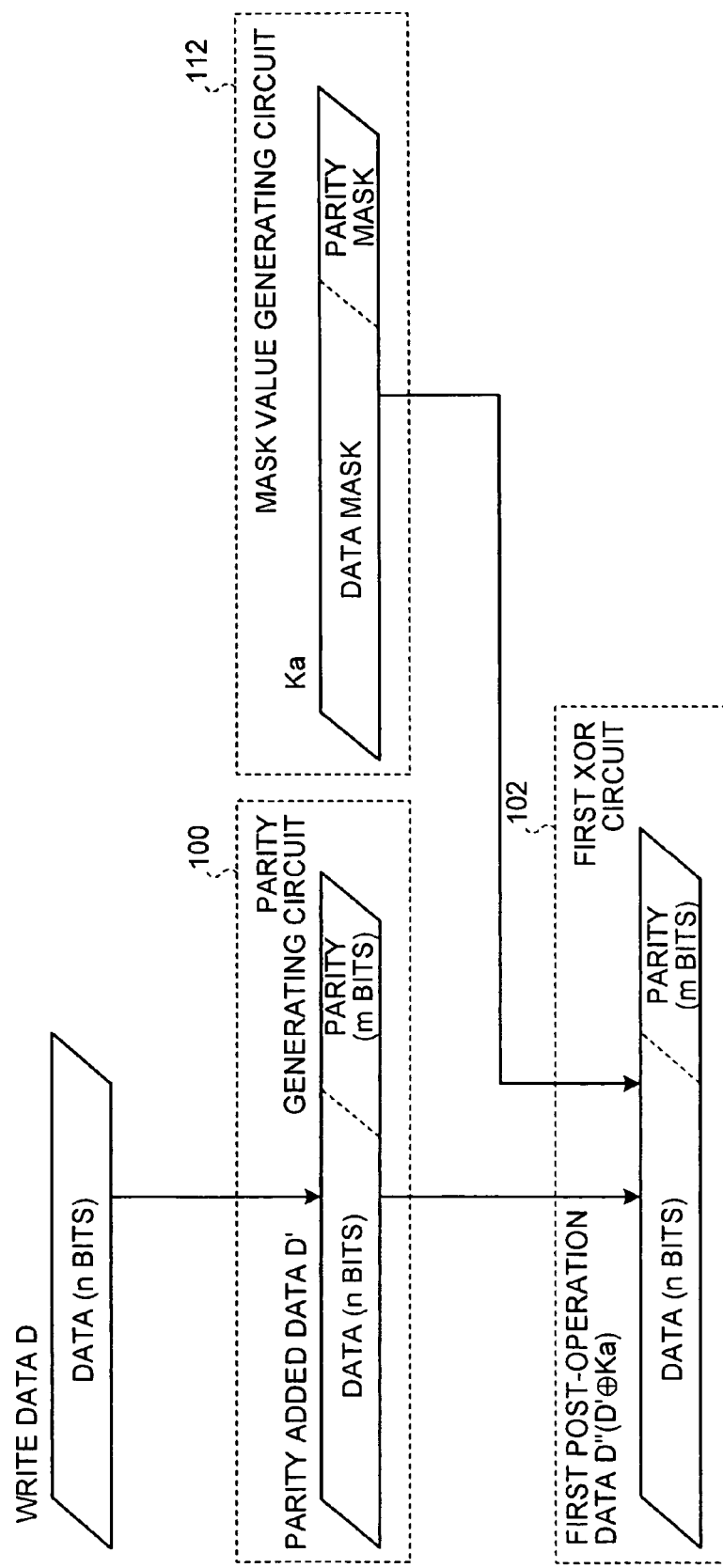

FIG.13

| PROCESS ID | PRIORITY INFORMATION | ACCESS RIGHT INFORMATION | PROGRAM COUNTER | REGISTER SAVING REGION | PAGE TABLE | ACCESS ID INFORMATION |
|---|---|---|---|---|---|---|
| | | | | | | |
| | | | | | | |
| | | | | | | |
| | | | | | | |
| | | | | | | |

| START ADDRESS | END ADDRESS | ACCESS ID |
|---|---|---|
| 00010000 | 0001FFFF | 25 |
| 00020000 | 0002FFFF | 64 |
| 00100000 | 0010FFFF | 103 |
| 00200000 | 0020FFFF | 79 |

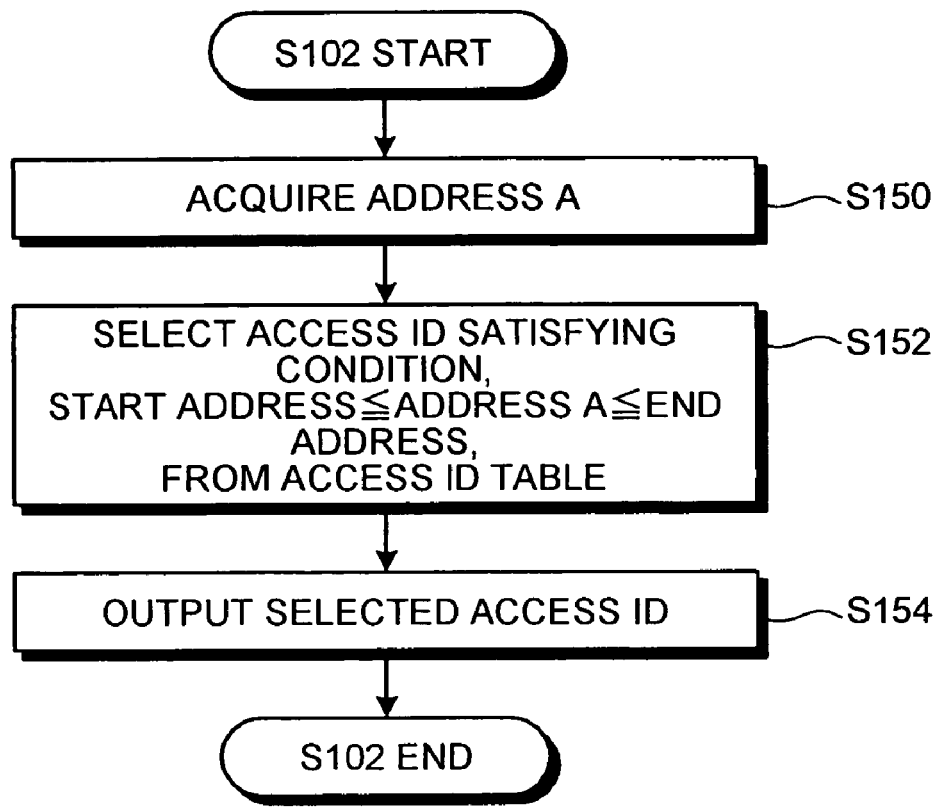

FIG.30

| ACCESS ID | FIRST CHARACTERISTIC POLYNOMIAL COEFFICIENT | FIRST DELAY COEFFICIENT | FIRST INITIAL MASK | SECOND CHARACTERISTIC POLYNOMIAL COEFFICIENT | SECOND DELAY COEFFICIENT | SECOND INITIAL MASK | THIRD CHARACTERISTIC POLYNOMIAL COEFFICIENT | THIRD DELAY COEFFICIENT | THIRD INITIAL MASK |
|---|---|---|---|---|---|---|---|---|---|
| | | | | | | | | | |
| | | | | | | | | | |
| | | | | | | | | | |
| | | | | | | | | | |

1302

⊕ XOR CIRCUIT        ⊙ AND CIRCUIT

FIG.66B

| ADDRESS BEFORE CHANGE | ADDRESS AFTER CHANGE | ADDRESS BEFORE CHANGE | ADDRESS AFTER CHANGE |
|---|---|---|---|
| 1000000 | 0001001 | 1100000 | 0010101 |
| 1000001 | 0001011 | 1100001 | 0010110 |
| 1000010 | 0001000 | 1100010 | 0010111 |
| 1000011 | 0001010 | 1100011 | 0010100 |
| 1000100 | 1110001 | 1100100 | 0101100 |
| 1000101 | 1110010 | 1100101 | 0101111 |
| 1000110 | 1110000 | 1100110 | 0101110 |
| 1000111 | 1110011 | 1100111 | 0101101 |
| 1001000 | 0000001 | 1101000 | 0110100 |
| 1001001 | 0000010 | 1101001 | 0110101 |
| 1001010 | 0000011 | 1101010 | 0110111 |
| 1001011 | 0000000 | 1101011 | 0110110 |
| 1001100 | 0011100 | 1101100 | 0011001 |
| 1001101 | 0011110 | 1101101 | 0011000 |
| 1001110 | 0011111 | 1101110 | 0011011 |
| 1001111 | 0011101 | 1101111 | 0011010 |
| 1010000 | 0110011 | 1110000 | 0111101 |
| 1010001 | 0110010 | 1110001 | 0111110 |
| 1010010 | 0110000 | 1110010 | 0111111 |
| 1010011 | 0110001 | 1110011 | 0111100 |
| 1010100 | 1000001 | 1110100 | 1010000 |
| 1010101 | 1000000 | 1110101 | 1010010 |
| 1010110 | 1000010 | 1110110 | 1010011 |
| 1010111 | 1000011 | 1110111 | 1010001 |
| 1011000 | 1110110 | 1111000 | 0010000 |
| 1011001 | 1110111 | 1111001 | 0010010 |
| 1011010 | 1110100 | 1111010 | 0010001 |
| 1011011 | 1110101 | 1111011 | 0010011 |
| 1011100 | 1111010 | 1111100 | 1010110 |
| 1011101 | 1111001 | 1111101 | 1010111 |
| 1011110 | 1111011 | 1111110 | 1010101 |
| 1011111 | 1111000 | 1111111 | 1010100 |

3rd SECTION

4th SECTION

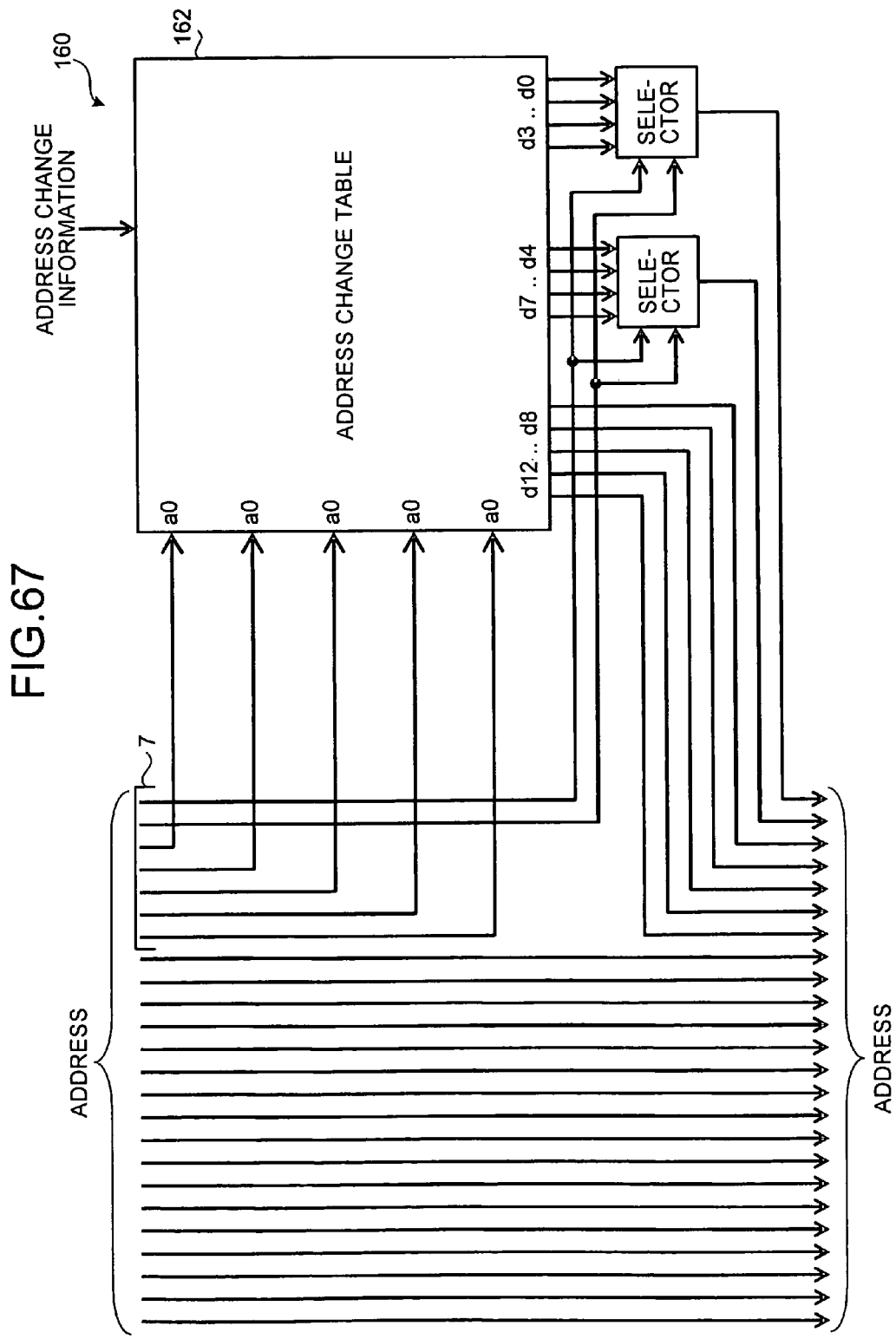

FIG.68

| ADDRESS a4..a0 | DATA d12 .. d0 |
|---|---|
| 00000 | 0100011000101 |
| 00001 | 1001000110101 |
| 00010 | 1101011000101 |
| 00011 | 1101110100110 |
| 00100 | 1111110101100 |
| 00101 | 0000110011100 |
| 00110 | 1000100110101 |
| 00111 | 0101010101100 |
| 01000 | 0111011000101 |
| 01001 | 0100110011010 |
| 01010 | 1011001101010 |
| 01011 | 1100010011010 |
| 01100 | 0001101100011 |
| 01101 | 1001110011100 |
| 01110 | 1011110101100 |
| 01111 | 1100110011010 |
| 10000 | 0001001011100 |
| 10001 | 1110001011001 |
| 10010 | 0000001101010 |
| 10011 | 0011101100011 |
| 10100 | 0110011001001 |
| 10101 | 1000000111001 |
| 10110 | 1110111000101 |
| 10111 | 1111010100110 |
| 11000 | 0010101101010 |
| 11001 | 0101101100101 |
| 11010 | 0110100110110 |
| 11011 | 0011000111010 |
| 11100 | 0111101101010 |
| 11101 | 1010001100011 |
| 11110 | 0010001010011 |
| 11111 | 1010111000110 |

FIG.72

| ACCESS ID | FIRST CHARACTE-RISTIC POLYNOMIAL COEFFICIENT | FIRST DELAY COEFFICIENT | FIRST INITIAL MASK | SECOND CHARACTE-RISTIC POLYNOMIAL COEFFICIENT | SECOND DELAY COEFFICIENT | SECOND INITIAL MASK | THIRD CHARACTE-RISTIC POLYNOMIAL COEFFICIENT | THIRD DELAY COEFFICIENT | THIRD INITIAL MASK | ADDRESS CHANGE INFORMATION |
|---|---|---|---|---|---|---|---|---|---|---|
| | | | | | | | | | | |
| | | | | | | | | | | |
| | | | | | | | | | | |
| | | | | | | | | | | |

1302

US 7,761,779 B2

ACCESS CONTROL APPARATUS, ACCESS CONTROL SYSTEM, PROCESSOR, ACCESS CONTROL METHOD, MEMORY ACCESS CONTROL APPARATUS, MEMORY ACCESS CONTROL SYSTEM, AND MEMORY ACCESS CONTROL METHOD

CROSS-REFERENCE TO RELATED APPLICATIONS

This application is based upon and claims the benefit of priority from the prior Japanese Patent Application No. 2005-346518, filed on Nov. 30, 2005 and No. 2006-079691, filed on Mar. 22, 2006, the entire contents of which is incorporated herein by reference.

BACKGROUND OF THE INVENTION

1. Field of the Invention

The present invention relates to an access control apparatus that can control access to a memory. The present invention also relates to an access control system, a processor, an access control method, a memory access control apparatus, a memory access control system, and a memory access control method.

2. Description of the Related Art

In a modern computer system, a multiprogramming method by which several processes (programs, tasks, or jobs) are switched is employed, so as to effectively utilize the various resources in the computer system such as a memory or CPU.

In such a system, data in a memory to be used exclusively by a process might be seen or damaged through overwrite by another process.

To counter this problem, a technique of comparing the key of a process with the storage key of the memory to be accessed has been widely used to determine whether access should be allowed. The "storage key" is the information that is recorded for every predetermined size of memory (4 KB, for example). Such a technique is disclosed in "z/Architecture Principles of Operation", IBM, SA22-7832-00, pages 3-9 to 3-12, December 2000.

However, in a memory protection system that employs the above described storage key, it is necessary to prepare a memory for storing the storage key as well as the memory for storing data. As a result, the amount of hardware increases.

Also, for example, assume that the unit of protection is 4 KB per page. When a small amount of data is protected, an unused memory region is left in the memory. This problem can be solved by allotting a storage key to each smaller memory region. However, such a solution requires a larger number of memories for storing the storage keys.

Furthermore, when a failure occurs in the memory, an access can be made to the memory, resulting in unauthorized data reading.

SUMMARY OF THE INVENTION

According to one aspect of the present invention, an access control apparatus to control an access among a writer, a reader, and a memory, comprising; a parity generator that generates a parity for original data to be written into the memory; a parity adder that generates parity-added data by adding the parity generated by the parity generator to the original data; a first syndrome generator that generates a first syndrome which is a value associated with a first access code used by the writer to request writing of the original data into the memory; a first mask generator that generates the first mask data, based on the first syndrome, the first access code, and a first memory address at which the original data is to be written by the writer; a first XOR unit that obtains first post-operation data by calculating an XOR between the parity-added data and the first mask data; a writing unit that writes the first post-operation data into the memory; a second syndrome generator that generates a second syndrome which is a value associated with a second access code used by the reader to request reading of data from the memory; a second mask generator that generates the second mask data, based on the second syndrome, the second access code, and a second memory address from which the data is to be read by the reader; a reading unit that reads the first post-operation data from the memory; a second XOR unit that obtains second post-operation data by calculating an XOR between the second mask data and the first post-operation data; a data syndrome calculator that calculates a real data syndrome based on the second post-operation data; and an output determining unit that determines whether the second post-operation data is to be output as the original data, based on the real data syndrome.

According to another aspect of the present invention, an access control system comprising; a processor; a memory controller; and a memory access control apparatus that controls access to a memory, the memory access control apparatus comprising a parity generator that generates a parity for original data to be written into the memory; a parity adder that generates parity-added data by adding the parity generated by the parity generator to the original data; a first syndrome generator that generates a first syndrome of first mask data to mask the parity-added data, the first syndrome being a value associated beforehand with a first access code that is information to be used when a writer accesses the memory, the writer requesting writing of the original data into the memory; a first mask generator that generates the first mask data, based on the first syndrome, the first access code, and a first memory address at which the original data is to be written; a first XOR unit that obtains first post-operation data by calculating an XOR between the parity-added data and the first mask data; a writing unit that writes the first post-operation data into the memory; a second syndrome generator that generates a second syndrome of second mask data to mask the first post-operation data, the second syndrome being a value associated beforehand with a second access code that is information to be used when a reader accesses the memory, the reader requesting reading of data from the memory; a second mask generator that generates the second mask data, based on the second syndrome, the second access code, and a second memory address from which the data is to be read; a reading unit that reads the first post-operation data from the memory; a second XOR unit that obtains second post-operation data by calculating an XOR between the second mask data and the first post-operation data; a data syndrome calculator that calculates a real data syndrome based on the second post-operation data; and an output determining unit that determines whether the second post-operation data is to be output as the original data, based on the real data syndrome.

According to still another aspect of the present invention, an access control system comprising, a processor; and a memory access control apparatus that controls access to a memory, the memory access control apparatus comprising a parity generator that generates a parity for original data to be written into the memory; a parity adder that generates parity-added data by adding the parity generated by the parity generator to the original data; a first syndrome generator that generates a first syndrome of first mask data to mask the parity-added data, the first syndrome being a value associated beforehand with a first access code that is information to be used when a writer accesses the memory, the writer requesting writing of the original data into the memory; a first mask generator that generates the first mask data, based on the first syndrome, the first access code, and a first memory address at which the original data is to be written; a first XOR unit that obtains first post-operation data by calculating an XOR between the parity-added data and the first mask data; a writing unit that writes the first post-operation data into the memory; a second syndrome generator that generates a second syndrome of second mask data to mask the first post-operation data, the second syndrome being a value associated beforehand with a second access code that is information to be used when a reader accesses the memory, the reader requesting reading of data from the memory; a second mask generator that generates the second mask data, based on the second syndrome, the second access code, and a second memory address from which the data is to be read; a reading unit that reads the first post-operation data from the memory; a second XOR unit that obtains second post-operation data by calculating an XOR between the second mask data and the first post-operation data; a data syndrome calculator that calculates a real data syndrome based on the second post-operation data; and an output determining unit that determines whether the second post-operation data is to be output as the original data, based on the real data syndrome.

According to still another aspect of the present invention, a processor that is equipped with a memory controller and a memory access control apparatus that controls access to a memory, the processor comprising, a parity generator that generates a parity for original data to be written into the memory; a parity adder that generates parity-added data by adding the parity generated by the. parity generator to the original data; a first syndrome generator that generates a first syndrome of first mask data to mask the parity-added data, the first syndrome being a value associated beforehand with a first access code that is information to be used when a writer accesses the memory, the writer requesting writing of the original data into the memory; a first mask generator that generates the first mask data, based on the first syndrome, the first access code, and a first memory address at which the original data is to be written; a first XOR unit that obtains first post-operation data by calculating an XOR between the parity-added data and the first mask data; a writing unit that writes the first post-operation data into the memory; a second syndrome generator that generates a second syndrome of second mask data to mask the first post-operation data, the second syndrome being a value associated beforehand with a second access code that is information to be used when a reader accesses the memory, the reader requesting reading of data from the memory; a second mask generator that generates the second mask data, based on the second syndrome, the second access code, and a second memory address from which the data is to be read; a reading unit that reads the first post-operation data from the memory; a second XOR unit that obtains second post-operation data by calculating an XOR between the second mask data and the first post-operation data; a data syndrome calculator that calculates a real data syndrome based on the second post-operation data; and an output determining unit that determines whether the second post-operation data is to be output as the original data, based on the real data syndrome.

According to still another aspect of the present invention, an access control method comprising, generating a parity for original data to be written into a memory; generating parity-added data by adding the parity generated to the original data; generating a first syndrome of first mask data to mask the parity-added data, the first syndrome being a value associated beforehand with a first access code that is information to be used when a writer accesses the memory, the writer requesting writing of the original data into the memory; generating the first mask data based on the first syndrome, the first access code, and a first memory address at which the original data is to be written; acquiring first post-operation data by calculating an XOR between the parity-added data and the first mask data; writing the first post-operation data into the memory; generating a second syndrome of second mask data to mask the first post-operation data, the second syndrome being a value associated beforehand with a second access code that is information to be used when a reader accesses the memory, the reader requesting reading of data from the memory; generator that generates the second mask data, based on the second syndrome, the second access code, and a second memory address from which the data is to be read; reading the first post-operation data from the memory; obtaining second post-operation data by calculating an XOR between the second mask data and the first post-operation data; calculating a real data syndrome based on the second post-operation data; and determining whether the second post-operation data is to be output as the original data, based on the real data syndrome.

According to still another aspect of the present invention, a memory access control apparatus, comprising, a read request acquirer that acquires data to be read from a memory, and a memory address at which the data is to be read, the data and the memory address being acquired from a reader that requests the reading of the data from the memory; a cache memory monitor that determines whether the memory address acquired by the read request acquirer is stored in a cache memory that stores data, a memory address of the data, and a requester access code in association with one another, the data being requested to be written into the memory by a writer that requests writing of the data into the memory or being requested to be read from the memory by the reader, the requester access code being information to be used when a writer or a reader that is allowed to access the data accesses the memory; an access code comparator that compares the requestor access code, which is associated with the memory address in the cache memory, with a second access code that is information to be used by the reader to access the memory, when the cache memory monitor determines that the memory address is stored in the cache memory; and an output unit that outputs the data associated with the memory address in the cache memory to the reader, when the requestor access code matches the second access code.

According to still another aspect of the present invention, an access control system comprising, a processor; a cache memory; and a memory access control apparatus that controls access to a memory, the cache memory storing data requested by a writer that request writing of the data into the memory or a reader that requests reading of the data from the memory, a memory address of the data, and a requestor access code that is information to be used when a writer or a reader that is allowed to access the data accesses the memory, the data and the memory address being associated with the requestor access code, the memory access control apparatus comprising a read request acquirer that acquires from the reader the data to be read from the memory and the memory address of the data; a cache memory monitor that determines whether the memory address acquired by the read request acquirer is stored in the cache memory; an access code comparator that compares the requestor access code associated with the memory address in the cache memory with a second access code that is information to be used by the reader to access the memory, when the cache memory monitor determines that the memory address is stored in the cache memory; and an output unit that outputs the data associated with the memory address in the cache memory to the reader, when the requestor access code matches the second access code.

According to still another aspect of the present invention, a memory access control method, comprising, acquiring data to be read from a memory and a memory address at which the data is to be read, the data and the memory address being acquired from a reader that requests the reading of the data from the memory; determining whether the memory address acquired is stored in a cache memory that stores data, a memory address of the data, and a requester access code in association with one another, the data being requested to be written into the memory by a writer that requests writing of the data into the memory or being requested to be read from the memory by the reader, the requestor access code being information to be used when a writer or a reader that has a right of access to the data accesses the memory; comparing the requestor access code, which is associated with the memory address in the cache memory, with a second access code that is information to be used by the reader to access the memory, when the memory address is stored in the cache memory; and outputting the data associated with the memory address in the cache memory to the reader, when the requester access code matches the second access code.

BRIEF DESCRIPTION OF THE DRAWINGS

FIG. 4 shows an example of the check matrix to be used with a Hsiao SEC-DED code in a case where the data length is 64 bits;

FIG. 5 shows the generator matrix corresponding to the check matrix H shown in FIG. 4;

FIG. 11 is a flowchart of a writing operation that is a part of the access control operation in the access control system;

FIG. 12 shows the data flow in the writing operation;

FIG. 13 shows a process management table that is used in an access ID setting operation;

FIG. 22 is a flowchart showing the specific procedures in the access ID acquiring operation in the access control system in accordance with the second embodiment;

FIG. 23 schematically shows the data structure of the access ID table in the access ID managing circuit in an access control system in accordance with a third embodiment of the present invention;

FIG. 30 schematically shows the data structure of the data mask generation information table;

FIG. 66B also shows the address changing operation to be performed by the address changing device;

FIG. 67 shows the address changing device;

FIG. 68 shows the address change table that realizes the address changes shown in FIGS. 66A and 66B;

FIG. 72 schematically shows the data structure of the data mask generation information table in accordance with a second modification of the tenth embodiment;

DETAILED DESCRIPTION OF THE INVENTION

The following is a detailed description of embodiments of an access control apparatus, an access control system, a processor, an access control method, a memory access control apparatus, a memory access control system, and a memory access control method, with reference to the accompanying drawings. However, the present invention is not limited to the following embodiments.

Figure 1:
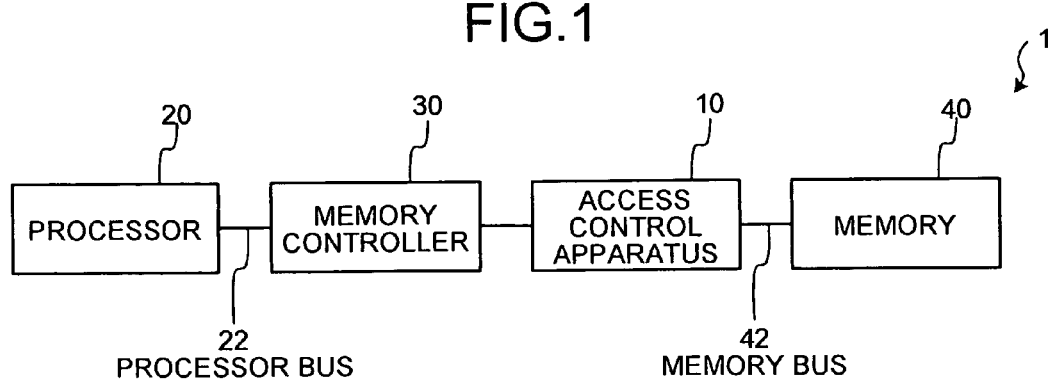
FIG. 1 shows an access control system in accordance with a first embodiment of the present invention.

FIG. 1 shows the entire structure of an access control system 1 in accordance with a first embodiment. The access control system 1 includes an access control apparatus 10, a processor 20, a memory controller 30, and a memory 40.

The processor 20 and the memory 40 are connected to each other with the memory controller 30 and the access control apparatus 10. The memory controller 30 serves to mediate the difference between the protocols of a processor bus 22 (the signal line extending directly from the processor) and the protocols of a memory bus 42. In other words, the memory controller 30 mediates the difference between a signal for reading or writing data transmitted from the processor 20 to the processor bus 22 and a signal for performing reading or writing on the memory 40.

For example, in a case where the memory 40 is a DRAM and the processor 20 designates an address and issues a read request, it is necessary to divide the address into an upper address and a lower address and then send them to the memory 40. The memory controller 30 converts the difference in procedures in between.

The access control apparatus 10 is connected between the memory controller 30 and the memory 40. When data is read from the memory 40, the access control apparatus 10 determines whether the reader of the data has the right of access to the data. The information as to the rights of access is set in the access control apparatus 10 by the processor 20 via the memory controller 30. More specifically, the processor 20 sets information such as access IDs as will be described later.

The access control apparatus 10 also has an ECC (Error correction Code or Error Control Code) function. More specifically, the access control apparatus 10 adds an ECC to data to be written by the processor 20 into the memory 40. The access control apparatus 10 also checks the ECC attached to data that is read from the memory 40. Using ECCs, the access control apparatus 10 performs access control or protection on the memory 40 by the unit of 32 bits or 64 bits, which is the same as each ECC unit. Accordingly, the memory 40 can be protected by the small unit.

The sources of requests for access to memory data on which the access control apparatus 10 performs access right control, or the readers and writers of data, are managed within the processor 20.

Figure 2:
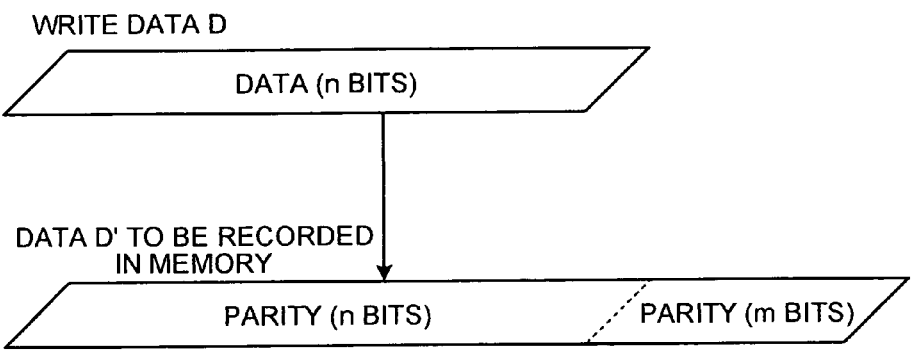
FIG. 2 shows the operation to be performed when data is written into the memory.
Figure 3:
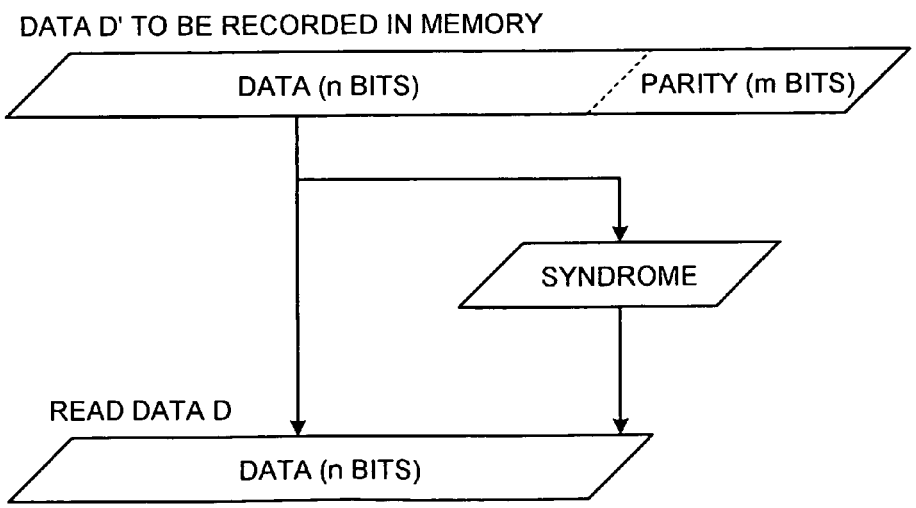
FIG. 3 shows the operation to be performed when the data D' is read out.

Next, ECCs are described. FIGS. 2 and 3 show ECCs. FIG. 2 shows the operation to be performed when data is written into the memory 40. In general, in a case where an n-bit data D is to be written into the memory 40 at once, an m-bit parity that is calculated based on the value of the data D is added to the data D, as shown in FIG. 2. As a result, n+m bit data D' is written into the memory 40.

For example, in a case where 64(=n)-bit data is to be written into the memory 40 at once, an 8(=m)-bit parity that is calculated from the value of the 64-bit data is added to the 64-bit data, and 72-bit data with a parity is written into the memory 40.

FIG. 3 shows the operation to be performed when the data D' is read out. To read the data D' from the memory 40, the value of m-bit data is calculated based on the product of the data D' and a transposed matrix of a check matrix "H". The value of m-bit data is called a syndrome. If the syndrome is "0", there is no error in the n-bit data.

If the syndrome is not "0", there is an error in the data D'. If the error is correctable, it should be corrected. If the error is not correctable, the occurrence of the error is reported to the processor 20, which is the source of the request for access to the memory data, by way of an interrupt or the like.

There are many types of ECCs. The numbers of parity bits, the methods of calculating the numbers of parity bits, the test matrices to be used for calculating syndromes, and methods of specifying the locations of bits to be corrected based on the syndromes vary with the types of ECCs.

SEC-DED (Single-Error correction and Double-Error Detecting) codes are widely used in the memories employed in computer systems. When there is one error bit (or one error) in the data or parity, the location of the error can be specified with a SEC-DED code. When there are two error bits (or two errors), the errors can be detected though the locations of the errors cannot be specified with a SEC-DED code. Generally, a 7-bit parity is added as an ECC to 32-bit data, an 8-bit parity is added as an ECC to 64-bit data, and a 9-bit parity is added as an ECC to 128-bit data.

There are also various types of SEC-DED codes, depending on the methods of calculating the parities and the methods of producing the test matrices. The most widely used among them are extended Hamming codes and Hsiao codes. Especially, Hsiao SEC-DED codes are suitable for circuit mounting, and thus are widely used. Extended Hamming codes are disclosed in "Algebraic Code for Data Transmission: Richard E. Blahut, 63 page, Cambridge University Press, 2003". Hsiao codes are disclosed in "A Class of Optimal Minimum Odd-weight-column SEC-DED Codes: M. Y. Hsiao, IBM Journal of Research and Development, 395-401 pp, July 1970". The values of syndromes are interpreted differently between the two types of SEC-DED codes, but error correction and detection are performed in the same manner.

In the access control system 1 in accordance with the first embodiment, Hsiao codes having 8-bit parities added to 64-bit data are used. However, the data length is not limited to this. The same access control can be performed for data of various lengths, such as 32-bit data, 16-bit data, and 128-bit data. Furthermore, the same access control can be performed with other SEC-DED codes such as extended Hamming codes or some other types of error correction codes.

Figure 4:
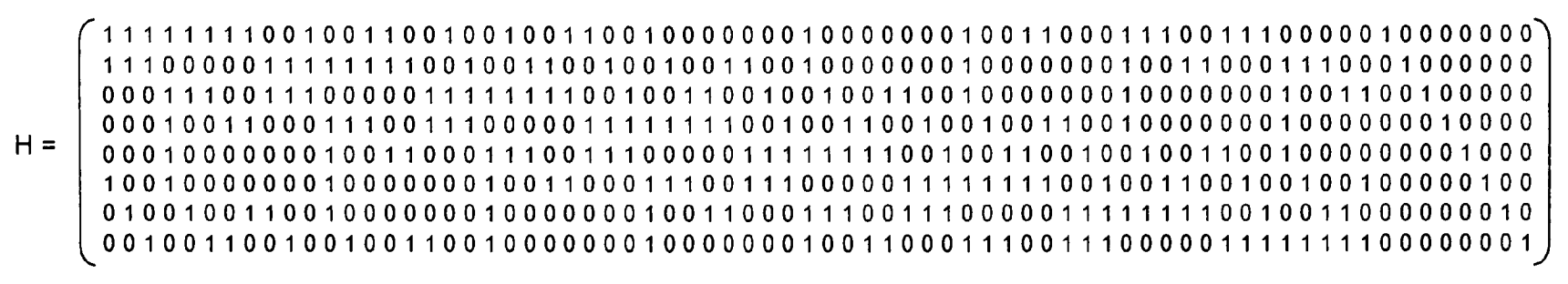

FIG. 4 shows an example of the check matrix "H" to be used with Hsiao SEC-DED codes in a case where the data length is 64 bits. The check matrix "H" consists of eight rows and 72 columns. The first to 64th bits from the left correspond to the locations of the bits of 64-bit memory data, and the remaining eight bits correspond to the locations of the parity bits. The first to eighth columns from the right are a 8×8 unit matrix, which corresponds to the parity.

FIG. 5 shows the generator matrix "G" corresponding to the check matrix "H" shown in FIG. 4. The generator matrix "G" is to be used for calculating a parity to be added to original data to which a parity has not been added. The generator matrix "G" consists of 64 rows and 72 columns. The first to 64th columns from the left form a 64×64 unit matrix, and the remaining eight columns on the right form a transposed matrix of the first to 64th columns of the generator matrix "G".

Figure 6:
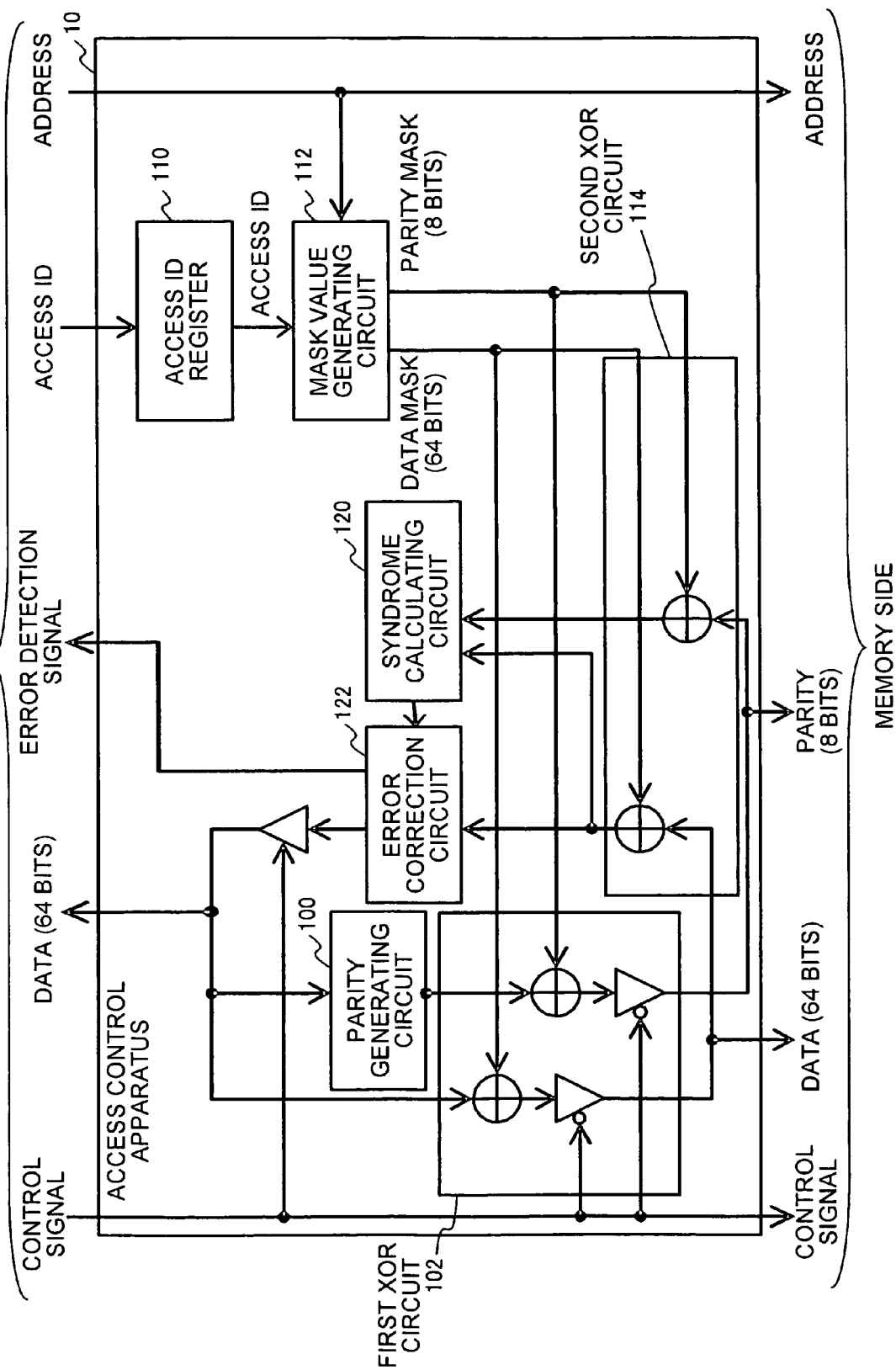
FIG. 6 is a block diagram showing the specific functional structure of the access control apparatus.

FIG. 6 is a block diagram of the specific functional structure of the access control apparatus 10. The access control apparatus 10 includes a parity generating circuit 100, a first XOR circuit 102, an access ID register 110, a mask value generating circuit 112, a second XOR circuit 114, a syndrome calculating circuit 120, and an error correction circuit 122.

In addition to a conventional ECC circuit structure, the access control apparatus 10 includes circuits for producing a mask value to be used to check the right of access, recording data together with a parity in the memory 40, and checking the right of access with respect to the data read out from the memory 40 using the mask value. Except for the first XOR circuit 102, the access ID register 110, the mask value generating circuit 112, and the second XOR circuit 114, the access control apparatus 10 have the same circuit structure of a conventional ECC circuit.

When the memory controller 30 connected to the access control apparatus 10 has an ECC circuit, the access control apparatus 10 may utilize the ECC circuit of the memory controller 30, instead of including the function of an ECC circuit.

The parity generating circuit 100 generates a parity for data that is acquired from the processor 20 via the memory controller 30. The parity is then added to the data acquired from the processor 20.

More specifically, 64-bit data is acquired from the processor 20 via the memory controller 30. An 8-bit parity is then calculated based on the acquired data, and is output to the first XOR circuit 102. This calculation is performed using the generator matrix "G" shown in FIG. 5.

The 64-bit input data "d" is represented by a vector consisting of 64 elements as shown in Equation (1), and a coded word "x" having the 8-bit parity added to the data "d" is represented by a vector consisting of 72 elements as shown in Equation (2).

$$d=(d1, d2, d3, \ldots d64) \quad (1)$$

$$x=(d1, d2, d3, \ldots d64, p1, p2, \ldots p8) \quad (2)$$

The relationship among the coded word (the data with the parity) "x", the generator matrix "G", and the data "d" is expressed by Equation (3):

$$x = dG \quad (3)$$

Accordingly, the coded word "x" can be obtained by multiplying the 64-bit data by the generator matrix "G". The last eight elements of the obtained coded word "x" is output as an 8-bit parity.

It is widely known that the parity generating circuit 100 can be embodied as a combination circuit that calculates a parity by multiplying a vector and a matrix as described above.

The access ID register 110 acquires an access ID from the processor 20 via the memory controller 30. The access ID is the information to be used when a process as the requester of an access to the data stored in the memory 40 accesses the memory 40. In this embodiment, an 8-bit parity is added to 64-bit data, so that 128 different access IDs can be managed. For example, the numbers 0 to 127 in seven bits serve as the access IDs.

When a process that is operating in the processor 20 is to access the memory 40, an access ID is first set into the access ID register 110 of the access control apparatus 10.

Figure 7:
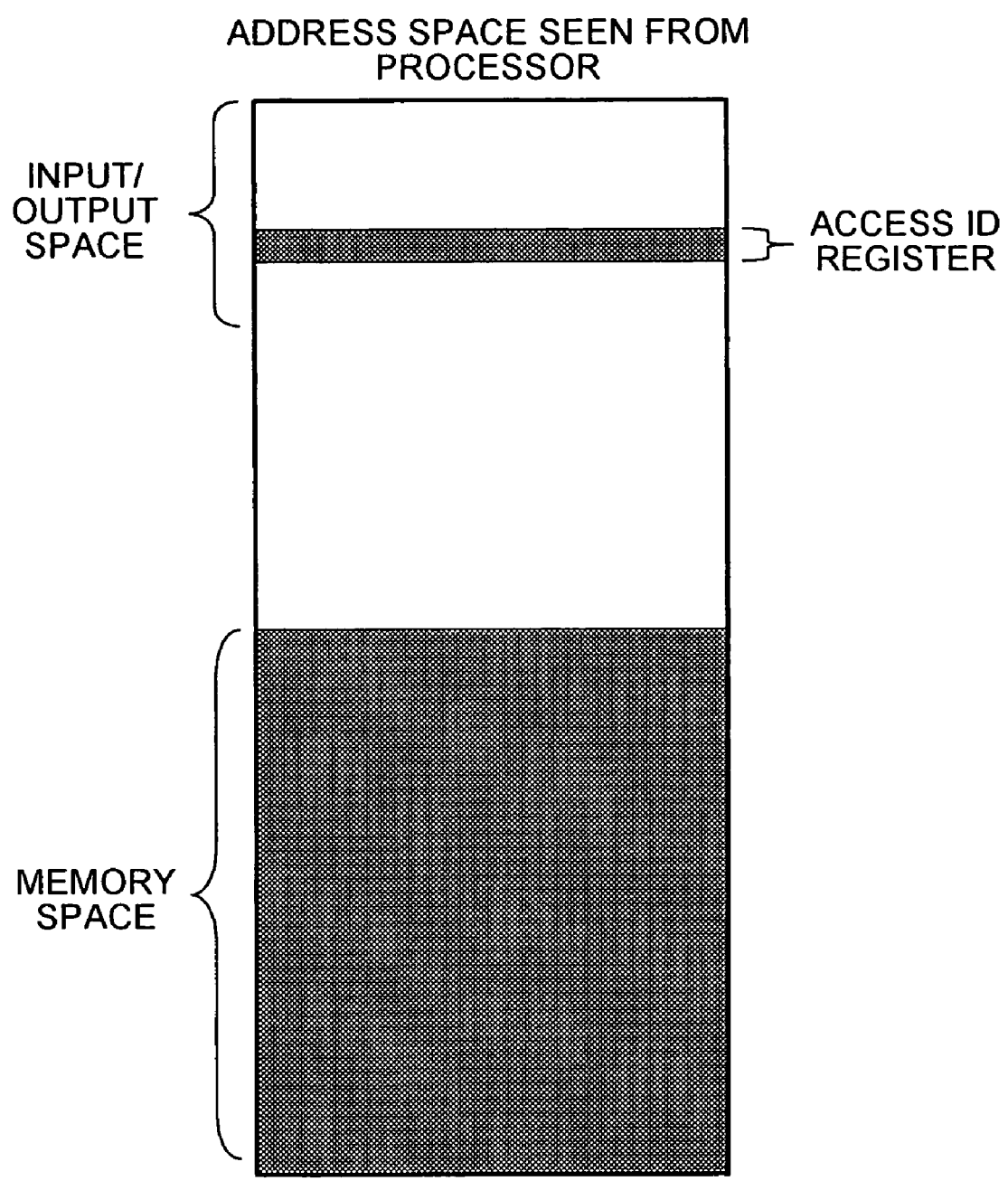
FIG. 7 shows the address spaces seen from the processor.

FIG. 7 shows address spaces seen from the processor 20. As shown in FIG. 7, the access ID register 110 of the access control apparatus 10 is mapped in an input/output space in address spaces that can be seen from the processor 20. When the processor 20 writes an access ID at the address at which the access ID register 110 is mapped in the input/output spaces, the access ID is written into the access ID register 110. However, access IDs may be set into the access ID register 110 in different manners from the above.

When a given access ID is to be set in accordance with a given program to be executed in the processor 20, the access rights can no longer be protected. It is therefore desirable to set access IDs after the authentication by operating system (OS) or hardware in the processor 20. By doing so, the access ID of a program in execution can be set in the access ID register 110 only if the program in execution has the right of access. Here, the access ID register 110 functions as a first access ID acquirer and a second access ID acquirer.

Referring back to FIG. 6, the mask value generating circuit 112 generates a mask value, based on the access ID held in the access ID register 110 and the address value of the memory 40 to be accessed by the processor 20. A mask value is the data for masking the data to be written into the memory 40 or the data to be read from the memory 40, and can be uniquely determined from the access ID and the address of the memory 40 to be accessed. The mask value generating circuit 112 of this embodiment functions as a first mask generator and a second mask generator.

When data is to be written into the memory 40, the first XOR circuit 102 calculates an "XOR" (exclusive OR) between the mask value and a pair of the data and the parity. In the pair, the data is to be written into the memory 40, and the parity is generated based on the data. The combination of the results is then written into the memory 40. More specifically, the mask value generated by the mask value generating circuit 112 is combined with the data and the parity, and the combination is written into the memory 40. This value is referred to as first post-operation data.

When data is to be read from the memory 40, the second XOR circuit 114 calculates an "XOR" between the data read from the memory 40 and the mask value, so as to cancel the mask value.

Based on the calculation result of the second XOR circuit 114, the syndrome calculating circuit 120 calculates a syndrome. In accordance with the value of the syndrome calculated by the syndrome calculating circuit 120, the error correction circuit 122 performs error correction, if necessary.

Here, the operations of the syndrome calculating circuit 120 and the error correction circuit 122 are described in detail. To detect or correct an error in the data accompanied by a parity that is read from the memory 40, a syndrome is calculated. More specifically, the syndrome calculating circuit 120 acquires the 64-bit data read from the memory 40 and the 8-bit parity calculated based on the 64-bit data. Using the check matrix "H", an 8-bit syndrome is calculated based on the 64-bit data and the 8-bit parity. The syndrome is output to the error correction circuit 122.

The 8-bit syndrome "s" is expressed by Equation (4), and the vector "x" that is to be an input and is formed with the 64-bit data and the 8-bit parity is expressed by Equation (5):

$$s = (s1, s2, \ldots s8) \quad (4)$$

$$x = (d1, d2, d3, \ldots d64, p1, p2, \ldots p8) \quad (5)$$

In this case, Equation (6) is established with the syndrome "s", the vector "x", and the check matrix "H":

$$s = xH^T \quad (6)$$

where $H^T$ represents the transposed matrix of the check matrix "H". In this manner, the syndrome calculating circuit 120 calculates and outputs the 8-bit syndrome.

If there is no error, the value of the syndrome obtained with a SEC-DED code is "0". If there is one error, the syndrome indicates the same value as the element in the column of the check matrix "H" corresponding to the location of the error bit. If the syndrome is not "0", the bit at the location corresponding to the column vector in the check matrix "H" that indicates the same value as the syndrome, if any, is an error bit. In such a case, one bit in the data or the parity corresponding to the location of the error bit is inverted, so as to correct the error.

When the syndrome is not "0" and a column vector indicating the same value as the syndrome does not exist in the check matrix "H", there is an uncorrectable error. In other words, there are two or more error bits.

In a Hsiao code, the number of elements having the value "1" is invariably an odd number in each column of the text matrix. Because of this, the number of "1"s in the syndrome obtained when there are an odd number of error bits is invariably an odd number, and the number of "1"s in the syndrome obtained when there are an even number of error bits is invariably an even number.

If there are two error bits, the number of "1"s in the syndrome is invariably an even number, which is not zero, and accordingly, two or more errors should be detected with a Hsiao code. If there are an odd number of error bits, which is three or more, the number of "1"s in the syndrome is invariably an odd number, but the syndrome might not be distinguished from the syndrome obtained in the case where there is only one error. As a result, if the syndrome is the same as the syndrome obtained when there is only one error, the detection result shows only one error bit, and incorrect correction is performed. In other cases, an uncorrectable error is detected.

When there are an even number of error bits, which is four or more, the number of "1"s in the syndrome is invariably an even number. However, the number of "1"s might be zero. In such a case, no errors are detected. In other cases, an uncorrectable error is detected. Generally, a SEC-DED code is used on the assumption that the number of error bits is 2 at a maximum.

In general, error correction can be performed with a SEC-DED code, even if an error is caused in a parity. In this embodiment, on the other hand, the value after parity correction is not used, and therefore, error correction is not performed on parities. However, it is of course possible to perform error correction on parities in other embodiments.

Figure 8:
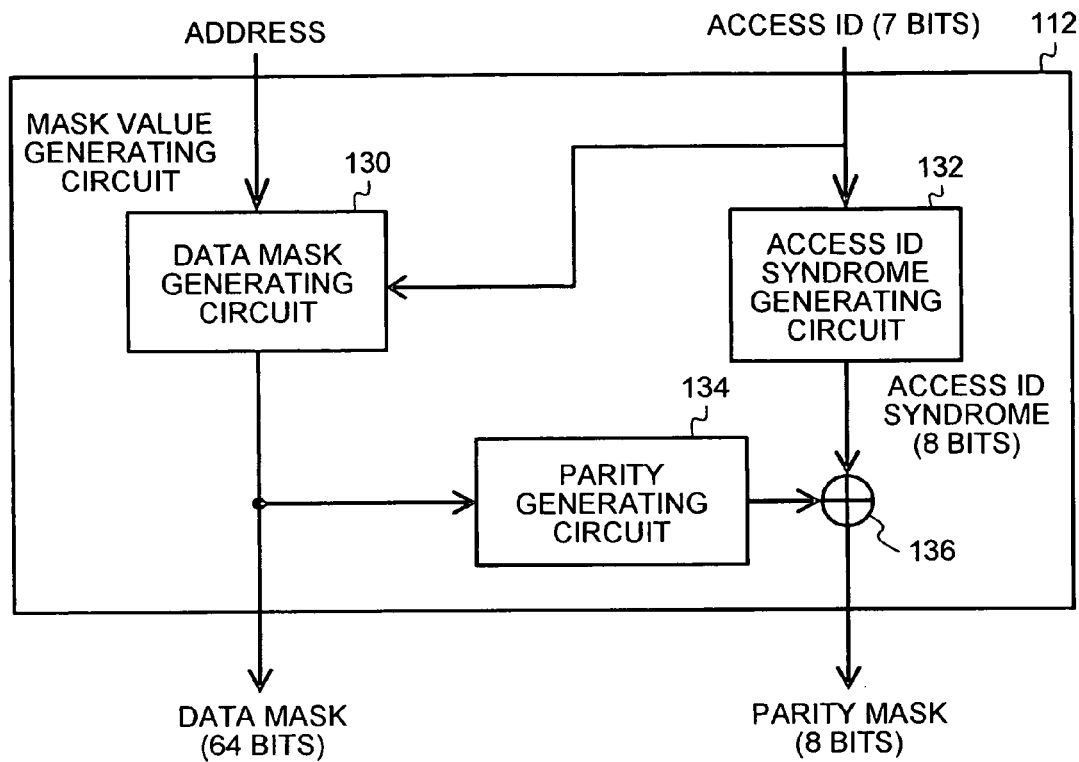
FIG. 8 is a block diagram showing the functional structure of the mask value generating circuit.

FIG. 8 is a block diagram of the functional structure of the mask value generating circuit 112. The mask value generating circuit 112 generates such a mask value that the syndrome generated based on an acquired access ID with respect to the mask exhibits a predetermined value.

The mask value generating circuit 112 includes a data mask generating circuit 130, an access ID syndrome generating circuit 132, a parity generating circuit 134, and an XOR circuit 136.

Figure 9:
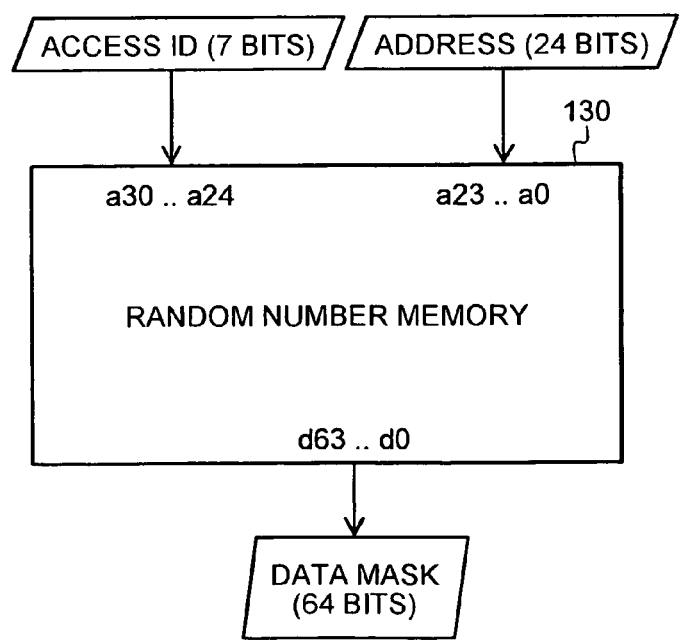
FIG. 9 shows the structure of the data mask generating circuit.

FIG. 9 shows the structure of the data mask generating circuit 130. The data mask generating circuit 130 outputs a mask for 64-bit data corresponding to an input access ID and the address of the memory 40 to be accessed. In short, the data mask generating circuit 130 outputs a data mask. Actually, the data mask generating circuit 130 is a random number memory as shown in FIG. 9. The random number memory is formed with conventional memory devices.

In the random number memory, random numbers are written. The access ID and the address are connected to the address terminal of the random number memory, so that the random values corresponding to the access ID and the address are output as a data mask value from the data terminal of the random number memory.

The data mask generating circuit 130 is not limited to the structure according to this embodiment, as long as it can output a value that is uniquely determined based on the address and the access ID. The data mask generating circuit 130 functions as a first data mask generator and a second data mask generator.

Figure 10A:
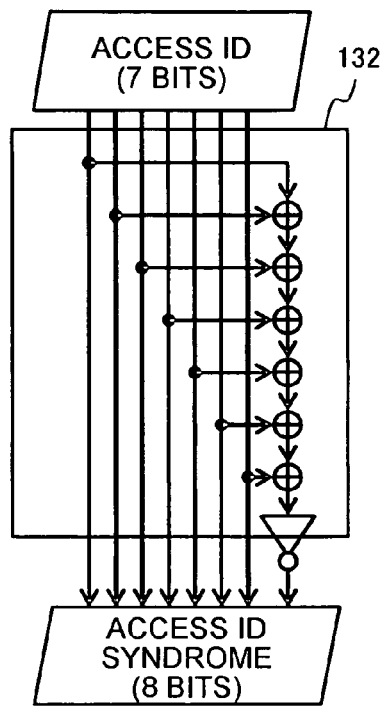
FIG. 10A shows the access ID syndrome generating circuit.

FIG. 10A shows the access ID syndrome generating circuit 132. The access ID syndrome generating circuit 132 determines a syndrome of the parity to be generated based on the acquired access ID. The access ID syndrome generating circuit 132 has the structure shown in FIG. 10A, so that all the numbers of "1"s in syndromes are odd numbers as described above.

Figure 10B:
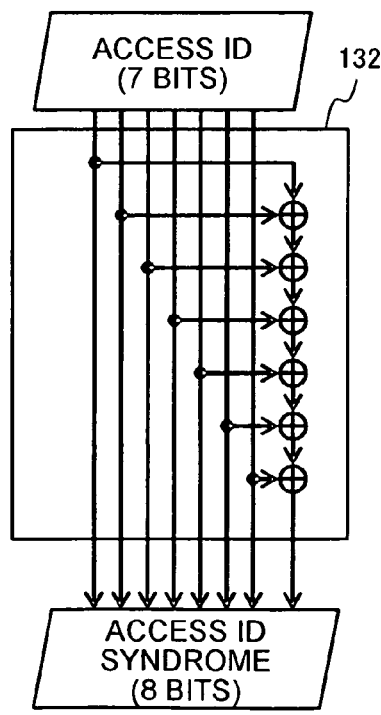
FIG. 10B also shows the access ID syndrome generating circuit.

When all the numbers of "1"s in syndromes are to be made even numbers, the access ID syndrome generating circuit 132 has the structure shown in FIG. 10B. The numbers of "1"s in syndromes generated by the access ID syndrome generating circuit 132 will be described later.

The access ID syndrome generating circuit 132 functions as a first syndrome generator for generating the first syndrome of first mask data, and a second syndrome generator for generating the second syndrome of second mask data.

The parity generating circuit 134 determines a parity for the data mask generated by the data mask generating circuit 130. The XOR circuit 136 outputs, as a parity mask, the "XOR" between the parity generated by the parity generating circuit 134 and the access ID syndrome generated by the access ID syndrome generating circuit 132. The XOR circuit 136 functions as a first parity mask generator and a second parity mask generator.

Normally, the syndrome of given data and a parity calculated based on the data is "0". However, a syndrome becomes "x" when calculated based on a new parity that is the "XOR" between the parity and a given value "x".

This is because the portion in the check matrix "H" corresponding to a parity is a unit matrix. Utilizing the above characteristics, such a parity mask is generated as to obtain the access ID syndrome generated by the access ID syndrome generating circuit 132 with respect to the data mask generated by the data mask generating circuit 130.

FIG. 11 is a flowchart of the writing operation that is part of the access control operation to be performed in the access control system 1. First, an access ID is acquired from the access ID register 110 (step S102). The parity generating circuit 100 then generates and adds a parity to the data to be written into the memory 40 (step S104). The mask value generating circuit 112 generates mask values (step S106). More specifically, the mask value generating circuit 112 generates a data mask and a parity mask.

The first XOR circuit 102 then calculates an "XOR" between the mask value and a pair of the data and the parity. The masks to be used in the "XOR" calculations are generated by the mask value generating circuit 112 (step S108). More specifically, the first excusive circuit 102 calculates the "XOR" between the data acquired from the processor 20 and the data mask generated by the mask value generating circuit 112. The first XOR circuit 102 also calculates an "XOR" between the parity generated by the parity generating circuit 100 and the parity mask generated by the mask value generating circuit 112. The first post-operation data obtained by the first XOR circuit 102 is written into the memory 40 (step S110). The writing operation then comes to an end.

FIG. 12 shows the data flow in the writing operation. When a process in operation is to write data D into the memory 40, a parity is added to the data D by virtue of an ECC, so as to form parity added data D'.

Next, an "XOR" between the parity added data D" and a mask value "Ka" generated by the mask value generating circuit 112:

$$D' \oplus Ka$$

which is the first post-operation data D", is written into the memory 40.

Here, the access ID setting operation for setting the information as to access IDs in the access control apparatus 10 is described in detail. FIG. 13 shows a process management table to be used in the access ID setting operation. The process management table is provided in the OS. When two or more processes are to be carried out in the processor 20, the OS normally manages those processes. In doing so, the process management table shown in FIG. 13 is used.

The process management table contains priority information, access right information, program counters, register saving regions, and page table pointers in association with process IDs. Access ID information associated with the process IDs is also recorded on the process management table. The information to be managed by the process management table is not limited to the above, but varies with the types of OS.

Figure 14:
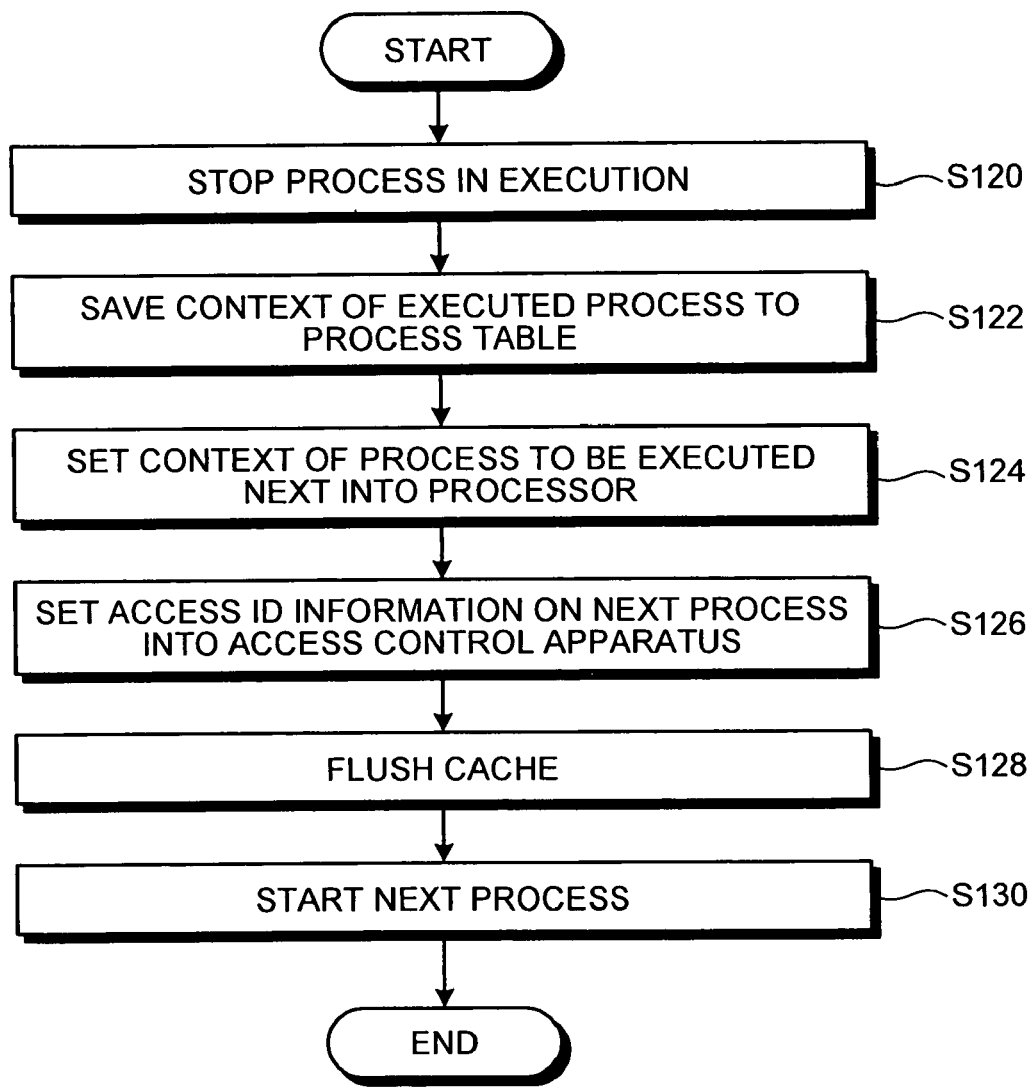
FIG. 14 is a flowchart showing the specific procedures in the access ID setting operation.

FIG. 14 is a flowchart showing the access ID setting operation in detail. This is the operation to be performed by the processor 20 when the OS switches processes. When the process in execution comes to a halt (step S120), the context of the process that has been carried out so far, which is the execution states such as the register value and the program counter value, are saved in the process management table (step S122). With the process management table being referred to, the context of the process to be carried out next, which are a register value, a program counter value, and a page table, are set into the processor 20 (step S124).

The access ID information as to the process to be carried out next is then set into the access control apparatus 10 (step S126). The access ID information contains the access ID to be used when the process makes an access.

The cache is then flushed (step S128). If the data used by the previous process stays in the cache, an access can be made without the right of access. The cache is flushed so as to prevent such an accident. Control is then started on the process to be carried out next (step S130). Here, the access ID setting operation comes to an end.

In this embodiment, the OS performs the flushing of the cache. However, some other component may perform the flushing of the cache. Also, the flushing of the cache (step S128) may be performed at any time before the start of the next process (step S130) and after the saving of the context of the executed process (step S122). In another example, the access control apparatus 10 may interrupt the processor 20 when a change is made to the settings of the access ID register 110, and the cache may be flushed in the interrupt processing routine.

Figure 15:
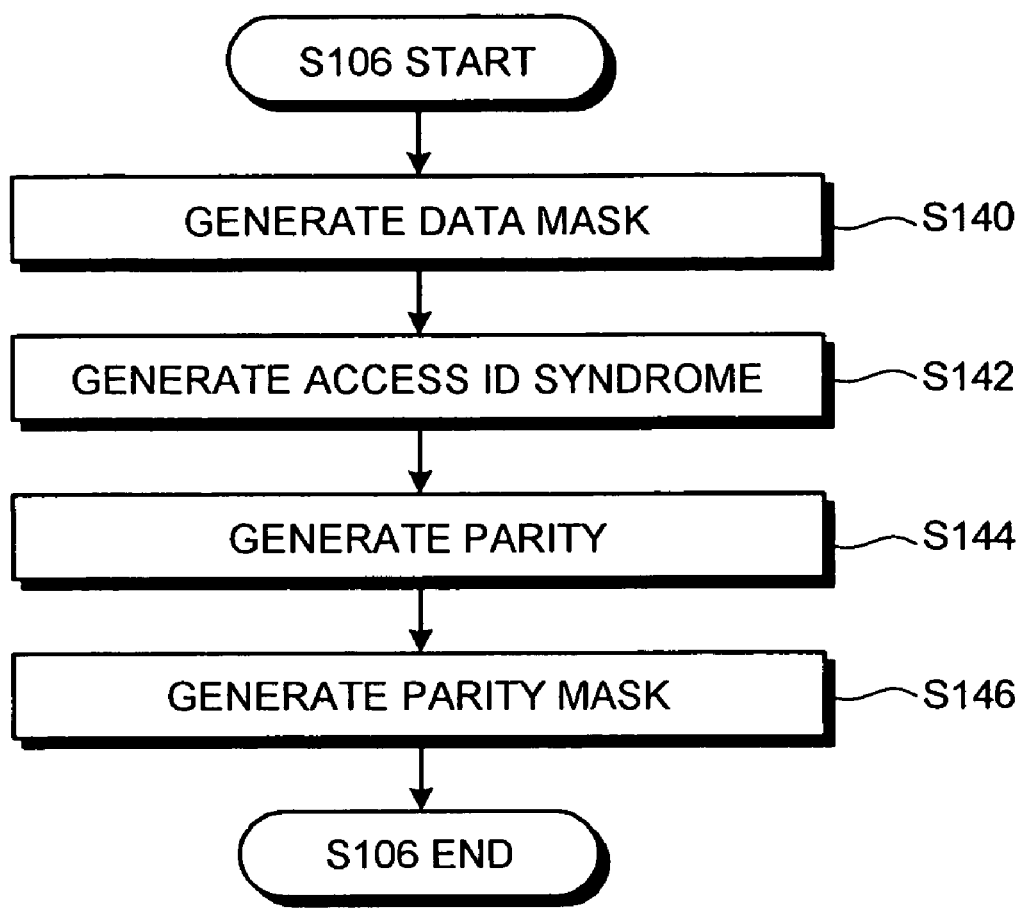
FIG. 15 is a flowchart showing the specific procedures in the mask value generating operation by the mask value generating circuit.

FIG. 15 is a flowchart of the operation to be performed by the mask value generating circuit 112 in the mask value generating operation (step S106). First, based on the access ID and the address to which an access is to be made, the data mask generating circuit 130 generates a data mask (step S140). Based on the access ID, the access ID syndrome generating circuit 132 generates an access ID syndrome (step S142).

The parity generating circuit 134 then generates a parity of the data mask generated by the data mask generating circuit 130 (step S144). The XOR circuit 136 calculates an "XOR" between the parity generated by the parity generating circuit 134 and the syndrome generated by the access ID syndrome generating circuit 132. In this manner, the XOR circuit 136 generates a parity mask (step S146). Here, the mask value generating operation (step S106) comes to an end. The data mask should be generated at any time before the parity is generated, and may not be generated before the access ID syndrome is generated.

Figure 16:
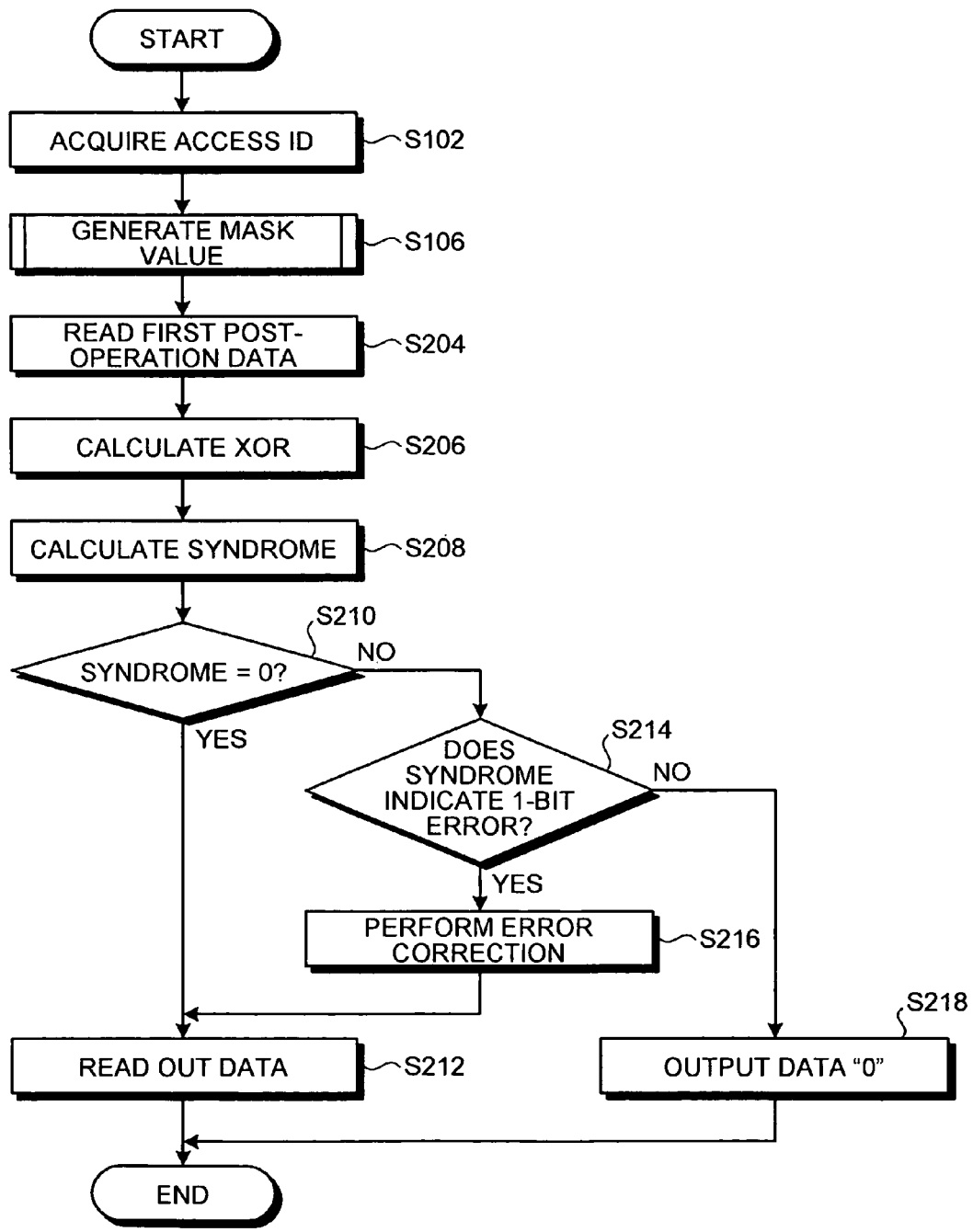
FIG. 16 is a flowchart of an operation of reading data from the memory in the access control operation.

FIG. 16 is a flowchart of the operation of reading data from the memory 40, which is part of the access control operation. First, an access ID is acquired from the access ID register 110 (step S102). The mask value generating circuit 112 then generates a mask value (step S106). The mask value generating operation (step S106) is the same as the mask value generating operation (step S106) described with referent to FIG. 14 and FIG. 15.

The second XOR circuit 114 reads out the first post-operation data D" written in the memory 40 (step S204). The second XOR circuit 114 then calculates a "XOR" between the first post-operation data D" and the mask value generated by the mask value generating circuit 112 (step S206).

The syndrome calculating circuit 120 calculates a syndrome, using an ECC (step S208). If the syndrome is "0", or if no errors are detected ("YES" in step S210), the data D is read out (step S212).

If the syndrome is not "0" and the number of "1" bits in the syndrome is an odd number ("NO" in step S210 and "YES" in step S214), one error is detected, and the error correction circuit 122 performs error correction (step S216). The data D after the correction is read out (step S212). If the syndrome is not "0" but more than one error bit is detected ("NO" in step S210 and "NO" in step S214), the error is uncorrectable. Therefore, "0" data is output, instead of the data D (step 218). In this manner, the data reading operation is completed.

In this embodiment, "0" data is output in step S218. However, no data may be output in a modification of this embodiment. Also, the data read from the memory 40 may be output as it is in another modification of this embodiment.

In yet another modification, when an uncorrectable error is detected, the error correction circuit 122 may output an error detection signal indicating the error detection, and the processor 20 may be notified of the error detection through an interrupt or the like based on the signal.

Figure 17:
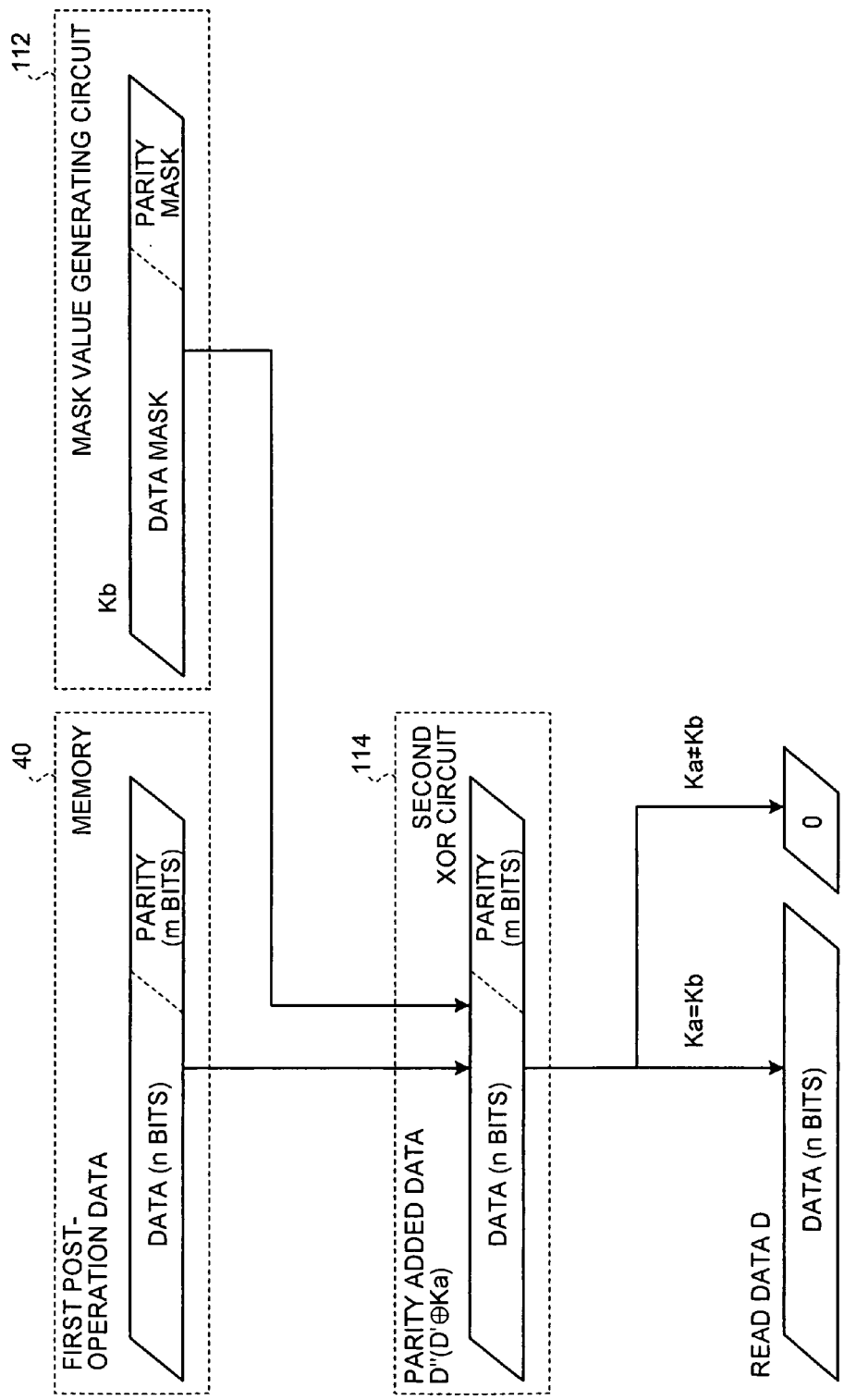
FIG. 17 shows the operation of reading data written in the memory.

FIG. 17 shows the operation of reading out data written in the memory 40. When a process in operation is to read out the data from the memory 40, an "XOR" between the first post-operation data D":D'⊕Ka, which is read from the memory, and a mask "Kb" generated based on the access ID set in the access ID register 110 during the process is calculated by $$D'' \oplus Kb = D' \oplus (Ka \oplus Kb)$$

This value is equivalent to the second post-operation data. Based on the calculation result of the syndrome calculating circuit 120, the value on which error test and error correction with an ECC have been performed is read out.

When the mask generated in the writing operation is the same as the mask generated in the reading operation, or where Ka=Kb, the correct data D can be read out. When the mask generated in the writing operation is different from the mask generated in the reading operation, or where Ka≠Kb, errors that are equivalent to the number of "1" bits in the value, Ka⊕Kb exist in the first post-operation data D" read from the memory 40. In such a case, the error correction circuit 122 outputs "0" data, accordingly.

In a modification of this embodiment, if the mask generated in the writing operation is different from the mask generated in the reading operation, the error correction circuit 122 may not output any data, instead of outputting "0" data.

As described above, in the access control system 1 of this embodiment, when data is written into the memory 40, data and a parity that are obtained by calculating an "XOR" between the data to be written and its parity and the inherent mask value of the requestor are written into the memory 40. When the requestor reads the data from the memory 40, data and a parity are produced by calculating an "XOR" between the data and the parity read from the memory 40 and the inherent mask value of the requester. Error correction is then performed on the data and the parity, and the corrected data is returned to the requester.

If the requester of the writing in the memory 40 is the same as the requestor of the reading from the memory 40, the access IDs become equal to each other, and the mask values become equal to each other. Accordingly, the mask value used for calculating an XOR in the writing operation becomes equal to the mask value used for calculating an XOR in the reading operation. Thus, the mask effect is canceled, and the data can be read out correctly.

If the requestor of the writing in the memory 40 is different from the requestor of the reading from the memory 40 in this embodiment, mask values are set so that an error can be detected by the error correction circuit 122. Therefore, the mask value used for calculating an XOR in the writing operation is different from the mask value used for calculating an XOR in the reading operation. Thus, data reading by other requesters can be prevented.

To prohibit unauthorized access from other requesters, mask values should be selected so as to generate a syndrome indicating an error uncorrectable state when the mask value generated in the writing operation is different from the mask value generated in the reading operation. More specifically, the value of the "XOR" between the value of the syndrome calculated based on the mask value in the writing operation and the value of the syndrome calculated based on the mask value in the reading operation should not be "0", and the number of "1"s in the value of the "XOR" should be an even number.

Therefore, all the numbers of "1"s in the syndromes calculated based on the respective mask values should be either odd numbers or even numbers. Depending on the numbers of "1"s, the access ID syndrome generating circuit 132 should selectively have either the structure shown in FIG. 10A or the structure shown in FIG. 10B.

In this manner, when mask values are set, the number of requestors that can be managed becomes equal to the number of syndromes that satisfy the above conditions. More specifically, in the structure in which an 8-bit parity is to be added to 64-bit data, 128 different requesters can be distinguished from one another both in the case where the numbers of "1"s in the syndromes are all odd numbers and in the case where the numbers of "1"s in the syndromes are all even numbers (including 0).

Masks are set so that each process has a unique mask value. Accordingly, if a process tries to read data that has been written by a predetermined process, reading cannot be performed in the access control system 1 of this embodiment. Thus, data can be protected from any other processes.

While protecting data from unauthorized processes, the access control system 1 performs protection so that only those originally authorized to write data are allowed to write data. More specifically, before data is written into the memory 40, the data written in the memory 40 is read out. Data writing is then prohibited at each address that cannot be accessed for reading due to mask mismatching. In this manner, precise protection against unauthorized writing access can be provided.

Furthermore, the mask values to be used in the access control system 1 are generated based on the access IDs for identifying the processes that are requesters and the addresses of the memory regions to be accessed. Thus, access control can be performed for each requester and for each memory region to be accessed.

Figure 18:
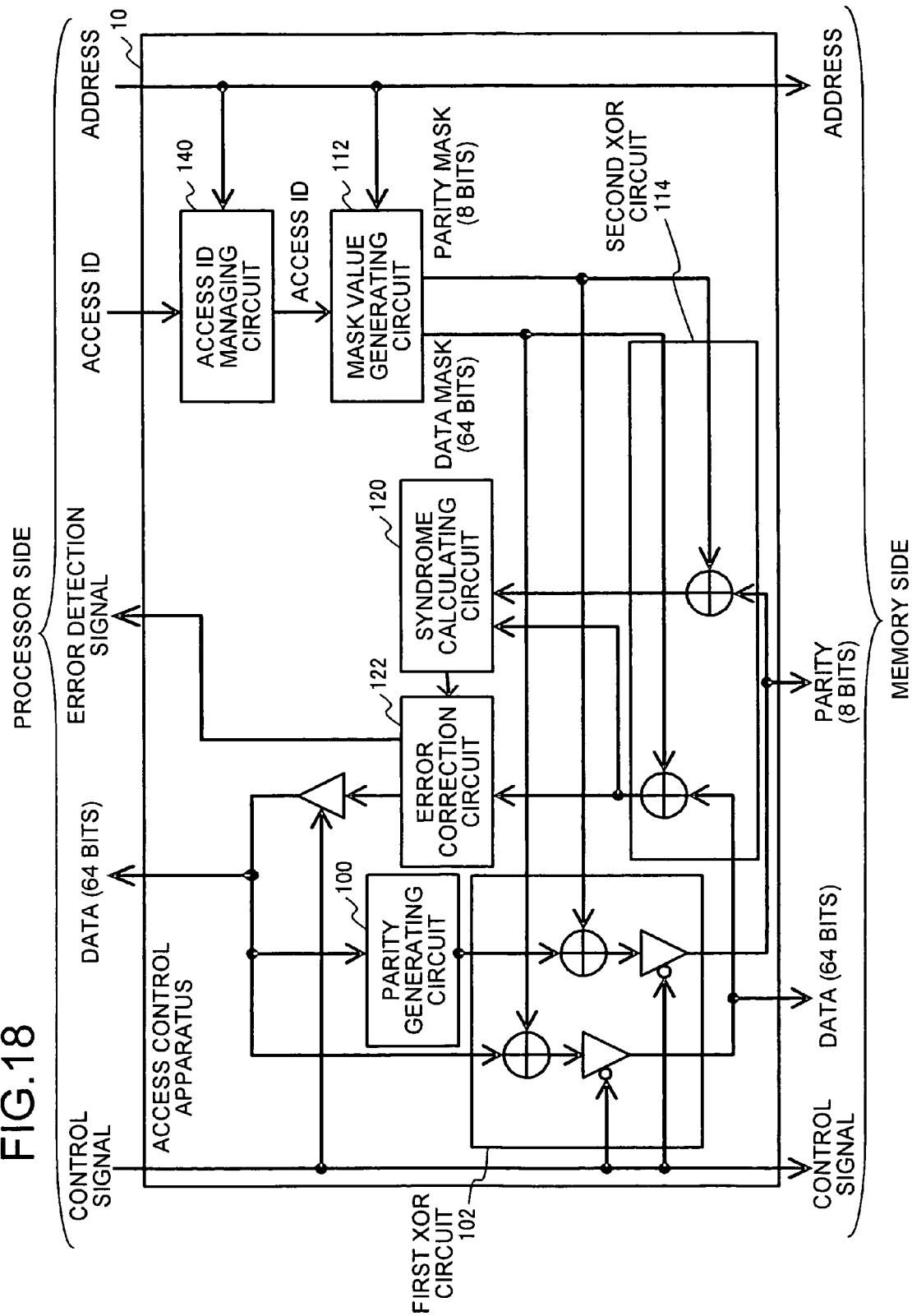
FIG. 18 is a block diagram showing the functional structure of an access control apparatus in accordance with a second embodiment of the present invention.

FIG. 18 is a block diagram showing the functional structure of an access control apparatus 10 in accordance with a second embodiment. The access control apparatus 10 in accordance with the second embodiment differs from the access control apparatus 10 in accordance with the first embodiment, in that an access ID managing circuit 140 is employed in place of the access ID register 110.

Figures 19, 20:
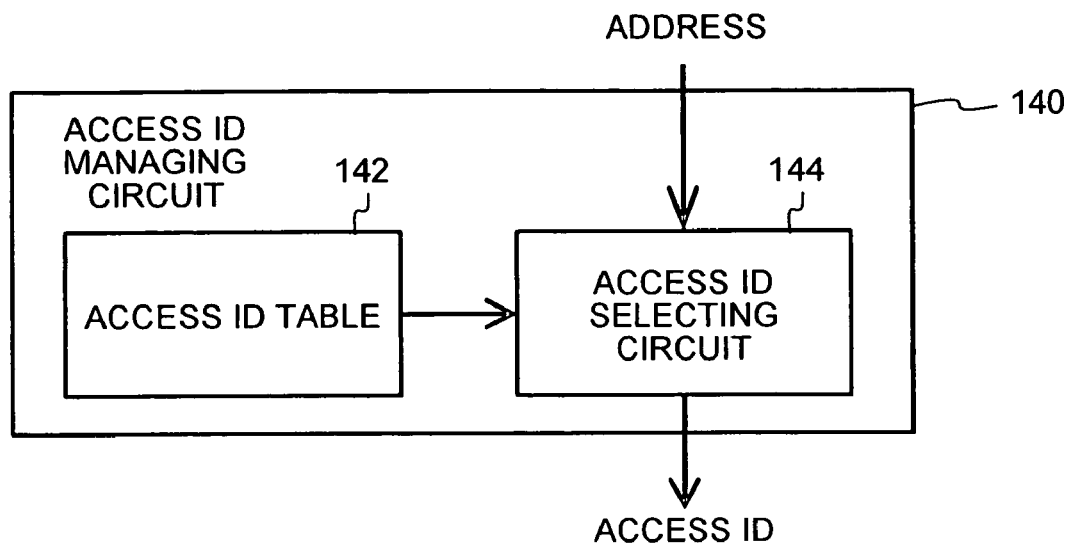
FIG. 19 is a block diagram showing the functional structure of the access ID managing circuit.
FIG. 20 schematically shows the data structure of the access ID table.

FIG. 19 is a block diagram showing the functional structure of the access ID managing circuit 140 in detail. The access ID managing circuit 140 includes an access ID table 142 and an access ID selecting circuit 144.

FIG. 20 schematically shows the data structure of the access ID table 142. The access ID table 142 contains access IDs associated with the start addresses and the end addresses of the memory regions to which the requesters identified by the access IDs can access. The access ID table 142 of this embodiment functions as a first access code storage and a second access code holding unit. Also, the access ID managing circuit 140 of this embodiment functions as a writer address acquirer and a second address acquirer.

When processes to be executed in the processor 20 are switched, the processor 20 writes the access IDs held by the process to be executed after the switching, and the required number of sets of the start addresses and end addresses of the memory regions corresponding to the access IDs, into the access ID table 142. Accordingly, every time processes are switched, the data as to the process to be executed after the switching is recorded in the access ID table 142.

The data corresponding to each access to be recorded in the access ID table 142 is contained in the access ID information in the process management table shown in FIG. 13. When processes are switched, the data contained in the access ID information is set into the access ID table 142 in step S126 described with reference to FIG. 14 in the first embodiment.

The access ID table 142 is mapped in the input/output space in the address spaces that can be viewed from the processor 20. Accordingly, the processor 20 can perform writing directly into the access ID table 142.

The access ID selecting circuit 144 acquires a request for access to the memory 40 from the processor 20. The request for access contains the address of the memory region to be accessed. The access ID selecting circuit 144 then refers to the access ID table 142, and outputs the access ID corresponding to the memory region. The access ID selecting circuit 144 of this embodiment functions as a first access code specifier and a second access code specifier.

Figure 21:
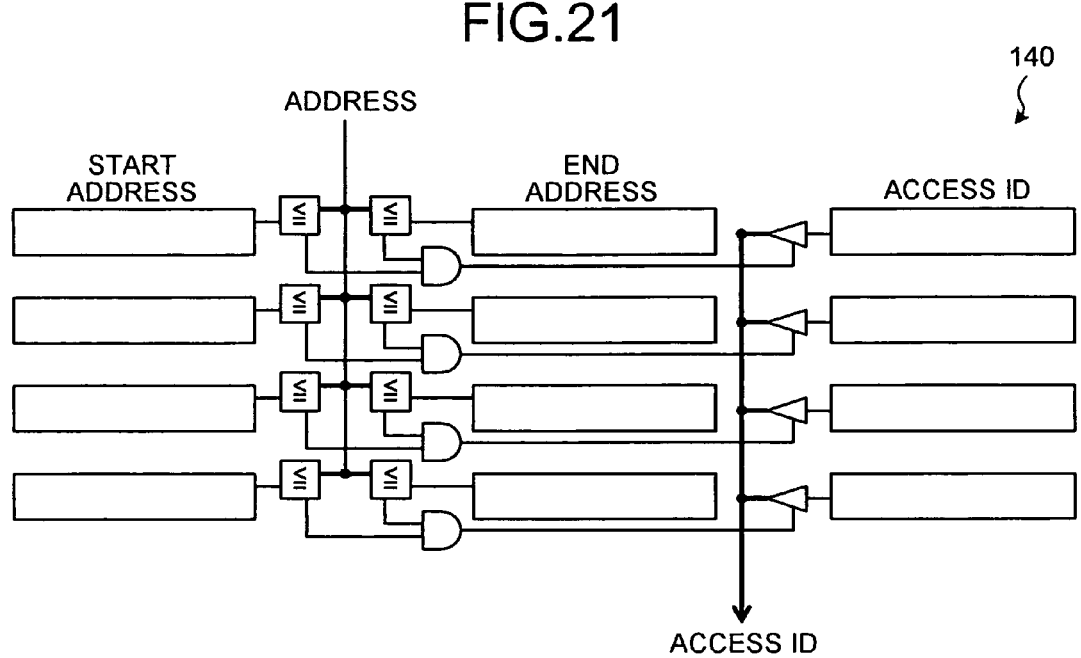
FIG. 21 shows the structure of the access ID managing circuit.

FIG. 21 shows the specific structure of the access ID managing circuit 140. As shown in FIG. 21, start addresses, end addresses, and access IDs are recorded, and operations are performed for those data, so as to embody the access ID table 142 and the access ID selecting circuit 144.

FIG. 22 is a flowchart showing in detail the access ID acquiring operation (S102) in the access control system 1 of the second embodiment.

As described above, an address A is first acquired from the processor 20 (step S150). The access ID selecting circuit 144 refers to the access ID table 142, and selects the access ID associated with such a start address and such an end address that the address A is equal to or larger than the start address and is equal to or smaller than the end address (step S152). The selected access ID is output to the mask value generating circuit 112 (step S154). In this manner, the access ID acquiring operation (step S102) is completed.

In the access control system 1 in accordance with the second embodiment, different access IDs of access requesters are allotted to memory regions, so that access control can be performed for each memory region.

When memory regions are shared among processes to be executed in the processor 20, processes that are allowed to access are preferably allotted to each memory region, so that the rights of access can be checked. The access control apparatus 10 of the access control system 1 in accordance with the second embodiment can check the right of access to each memory region.

Also in this embodiment, the cache is flushed in an interrupt processing routine that is executed when the access control apparatus 10 interrupts the processor 20 after a change is made to the access ID table 142.

The other aspects of the structure and the operation of the access control system 1 in accordance with the second embodiment are the same as the structure and the operation of the access control system 1 in accordance with the first embodiment.

Next, an access control system 1 in accordance with a third embodiment is described. Like the access control system 1 in accordance with the second embodiment, the access control system 1 includes the access ID managing circuit 140. However, the operation to be performed by the access ID managing circuit 140 in accordance with the third embodiment differs from the operation to be performed by the access ID managing circuit in accordance with the second embodiment. The access ID managing circuit 140 in accordance with this embodiment functions as a writer ID acquiring unit and a reader ID acquiring unit. The access ID selecting circuit 144 in accordance with the third embodiment acquires a requester ID for identifying the requester, and selects an access ID based on the requestor ID.

FIG. 23 schematically shows the data structure of the access ID table 142 provided in the access ID managing circuit 140 in the access control system 1 in accordance with the third embodiment. As shown in FIG. 23, the access ID table 142 holds requestor IDs associated with access IDs. The access ID table 142 in accordance with this embodiment functions as a first access code storage and a second access code holding unit.

The access ID selecting circuit 144 acquires a requestor ID, instead of an address, for identifying the requestor of an access. A signal indicating which device has issued a request is normally transmitted to the processor bus 22 to which more than one processor 20 can be connected. In accordance with the signal, the access ID selecting circuit 144 determines the requestor ID. The access ID selecting circuit 144 then refers to the access ID table 142, and selects the access ID associated with the acquired requester ID. The access ID selecting circuit 144 in accordance with this embodiment functions as a first access code specifier and a second access code specifier.

Figure 24:
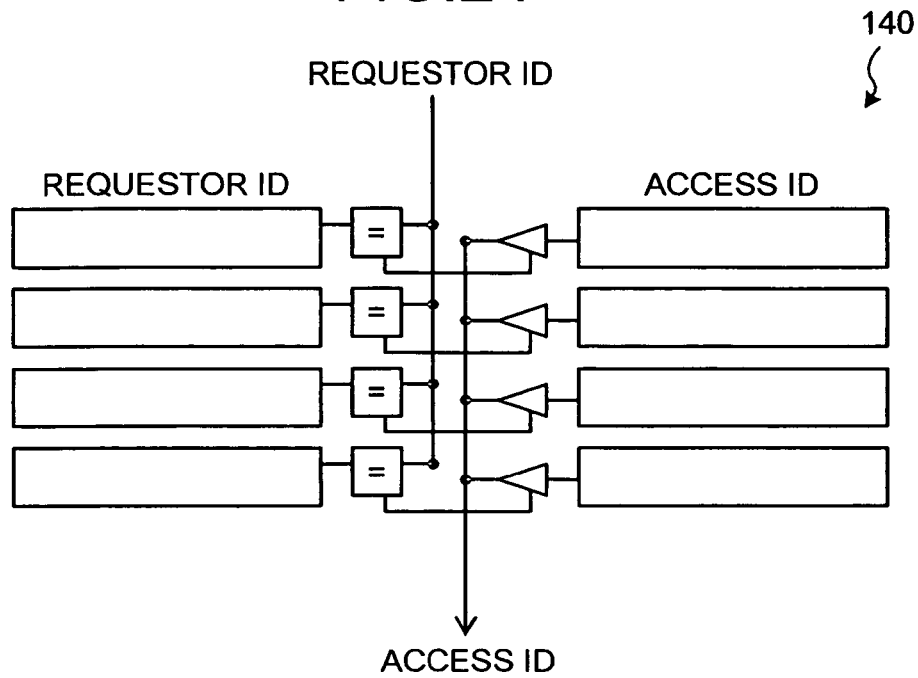
FIG. 24 shows the structure of the access ID managing circuit.

FIG. 24 shows the structure of the access ID managing circuit 140 in detail. As shown in FIG. 24, requestor IDs and access IDs are recorded in advance, and operations are performed for those data, so as to embody the access ID table 142 and the access ID selecting circuit 144.

Figure 25:
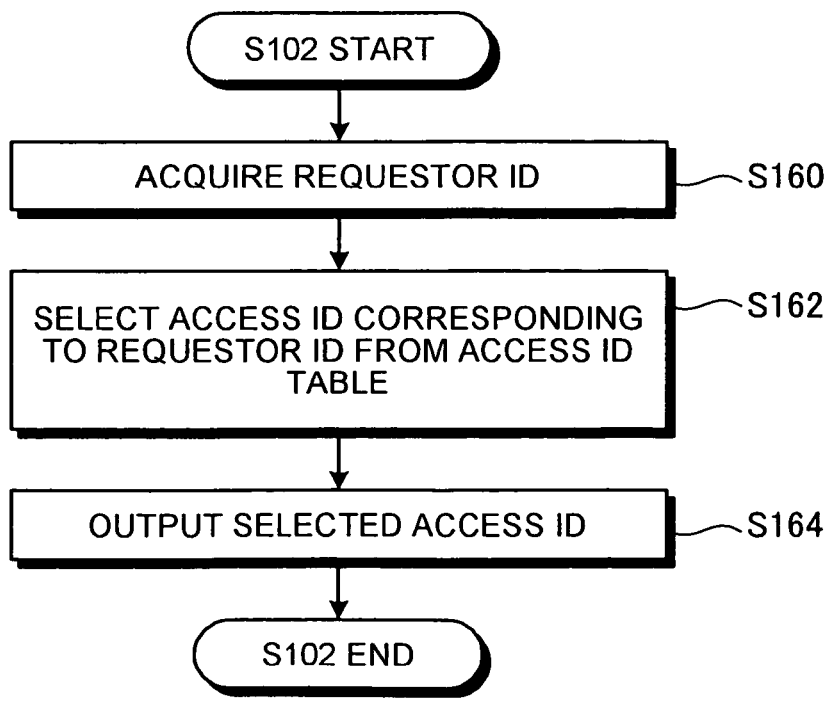
FIG. 25 is a flowchart showing the specific procedures in the access ID acquiring operation in the access control system in accordance with the third embodiment.

FIG. 25 is a flowchart showing in detail the access ID acquiring operation (S102) in the access control system 1 of the third embodiment.

First, a requestor ID is acquired from the processor bus 22 (step S160). The access ID selecting circuit 144 refers to the access ID table 142, and selects the access ID corresponding to the requestor ID (step S162). The selected access ID is output to the mask value generating circuit 112 (step S164). In this manner, the access ID acquiring operation (step S102) is completed.

As described above, a requester ID is acquired, instead of an access ID acquired directly from the requester. Accordingly, even higher security can be achieved. When more than one processor 20 or input/output devices are connected to the processor bus 22, for example, the right of access can be checked with respect to each of the devices connected to the processor bus 22.

The other aspects of the structure and the operation of the access control system 1 in accordance with the third embodiment are the same as the structure and the operation of the access control system 1 in accordance with the foregoing embodiments.

Next, an access control system 1 in accordance with a fourth embodiment is described. The access ID managing circuit 140 of the access control system 1 in accordance with the fourth embodiment has both the function of the access ID managing circuit 140 of the second embodiment and the function of the access ID managing circuit 140 of the third embodiment. The access ID managing circuit 140 in accordance with the fourth embodiment determines an access ID, based on the address of the memory region to be accessed and the requestor ID of the requester of the access.

Figure 26:
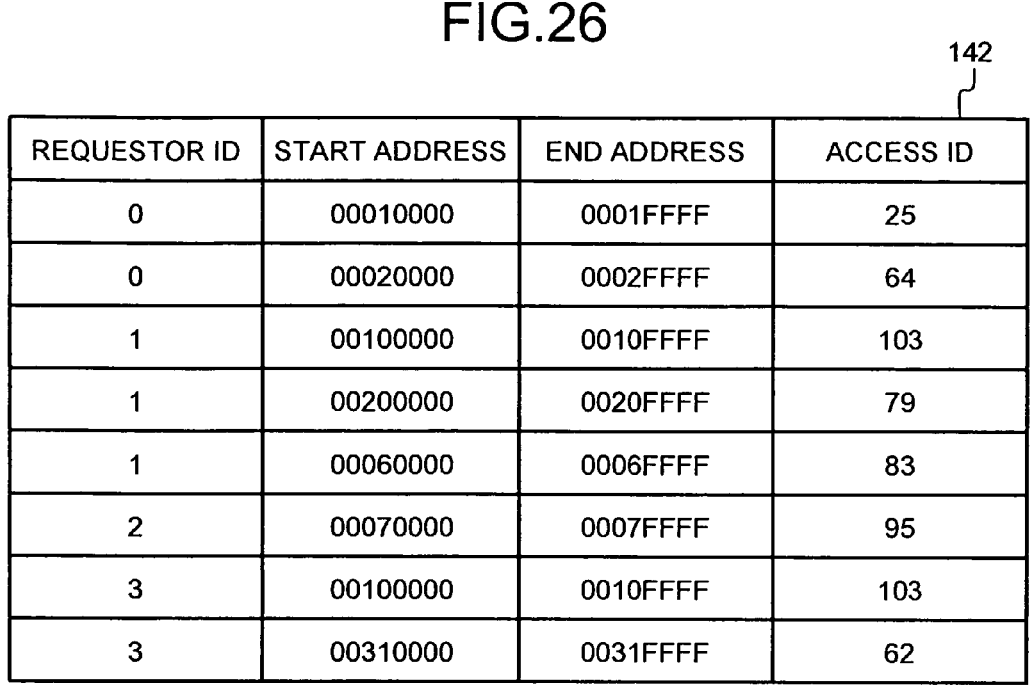
FIG. 26 schematically shows the data structure of an access ID table in accordance with a fourth embodiment of the present invention.

FIG. 26 schematically shows the data structure of the access ID table 142 in accordance with the fourth embodiment. The access ID table 142 contains requestor IDs, start addresses and end addresses, and access IDs associated with one another. The access ID selecting circuit 144 determines the address of a memory region contained in a request for access obtained from the processor 20, and acquires a requester ID from the processor bus 22.

Figure 27:
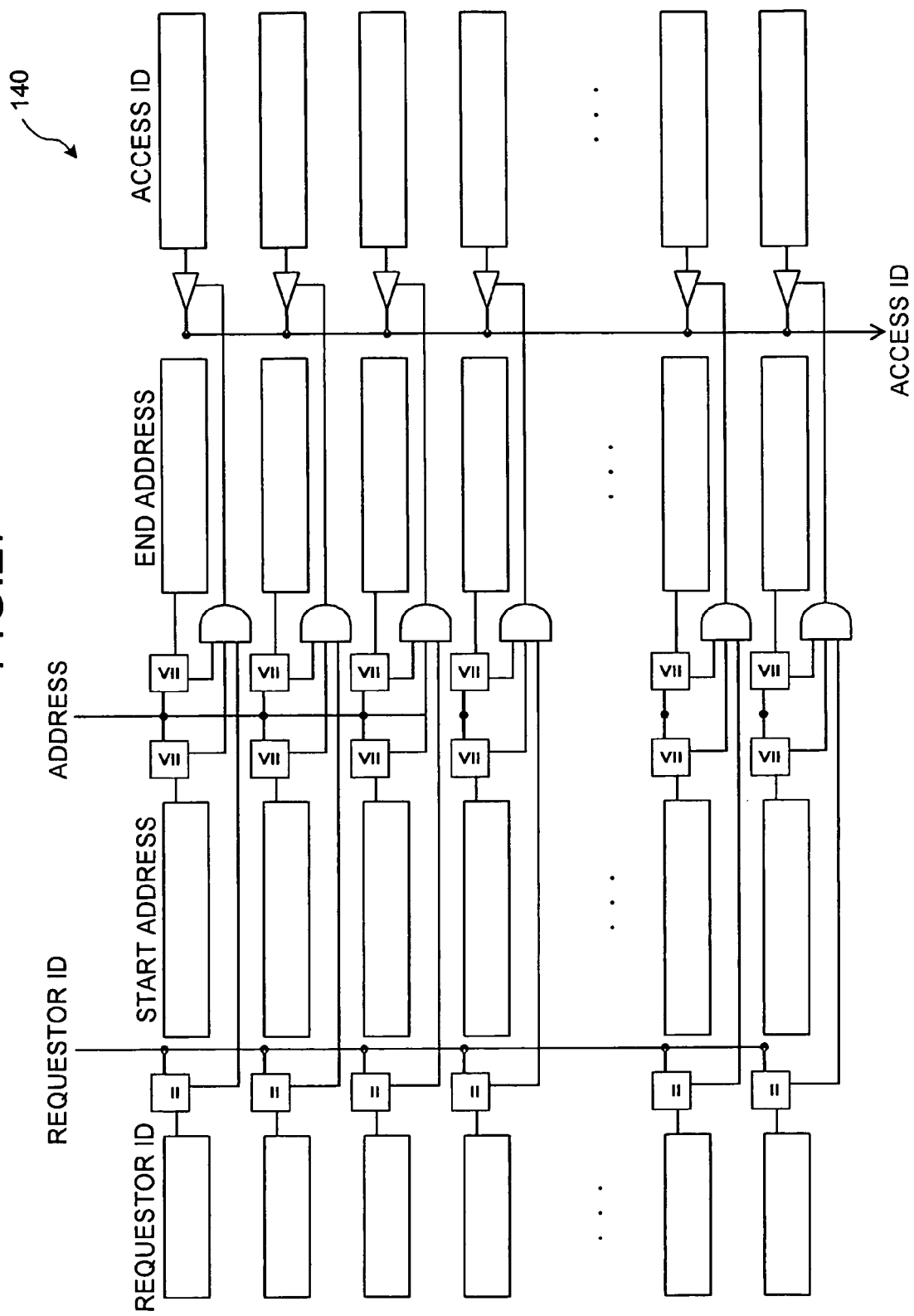
FIG. 27 shows the structure of the access ID managing circuit.

FIG. 27 shows the structure of the access ID managing circuit 140 in detail. As shown in FIG. 27, start addresses, end addresses, requester IDs, and access IDs are recorded in advance, and operations are performed for those data, so as to embody the access ID table 142 and the access ID selecting circuit 144.

Figure 28:
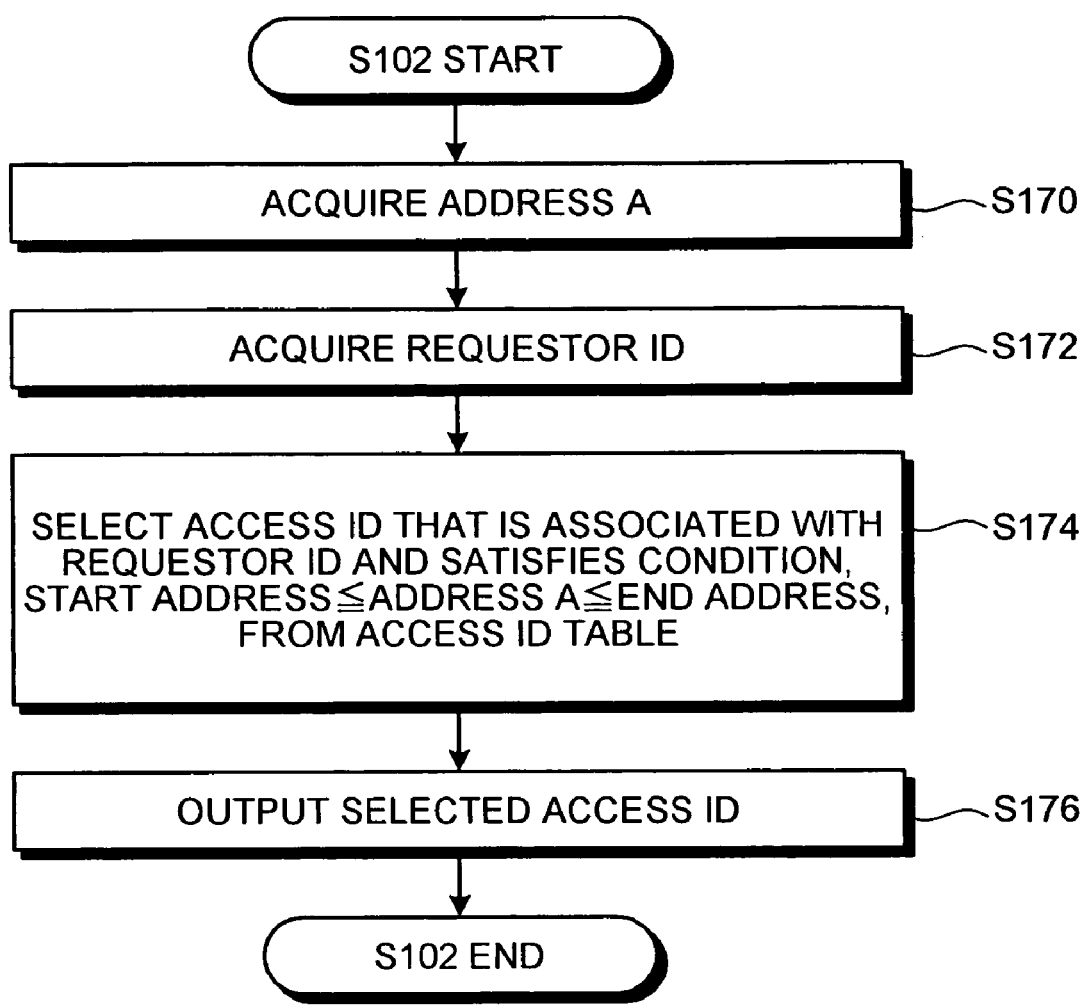
FIG. 28 is a flowchart showing the specific procedures in the access ID acquiring operation in the access control system in accordance with the fourth embodiment.

FIG. 28 is a flowchart showing in detail the access ID acquiring operation (S102) in the access control system 1 in accordance with the fourth embodiment. The access ID selecting circuit 144 acquires an address A from the processor 20 (step S170). The access ID selecting circuit 144 also acquires a requestor ID from the processor bus 22 (step S172). The access ID selecting circuit 144 then refers to the access ID table 142, and selects the access ID corresponding to the requestor ID and the address A (step S174). The selected access ID is output to the mask value generating circuit 112 (step S176). In this manner, the access ID acquiring operation (step S102) is completed.

The other aspects of the structure and the operation of the access control system 1 in accordance with the fourth embodiment are the same as the structure and the operation of the access control system 1 in accordance with the foregoing embodiments.

Next, an access control system 1 in accordance with a fifth embodiment is described. The access control apparatus 10 in accordance with the fifth embodiment differs from the access control apparatus 10 of any of the other embodiments in the random mask generating operation.

Figure 29:
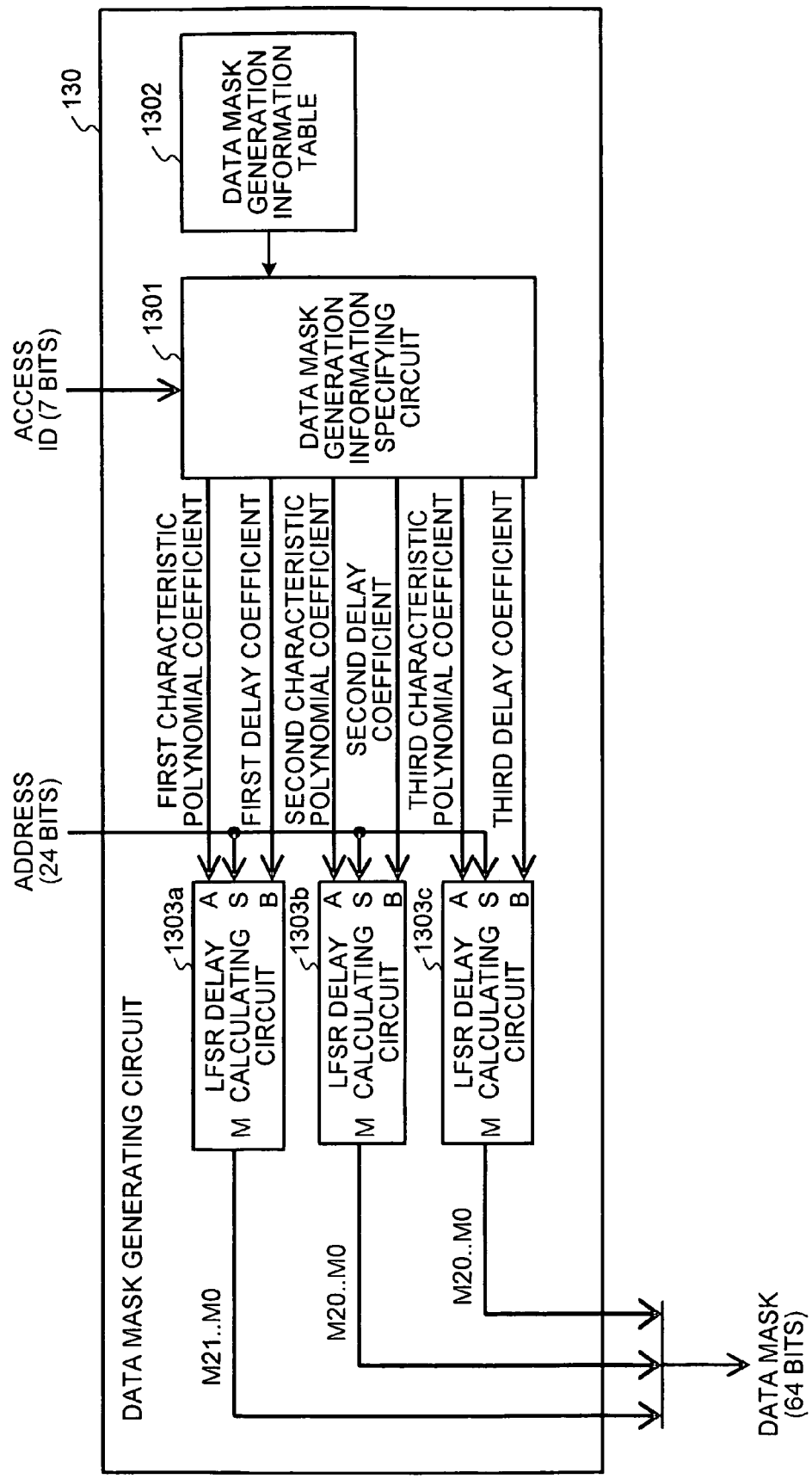
FIG. 29 is a block diagram showing the functional structure of a data mask generating circuit in accordance with a fifth embodiment of the present invention.

FIG. 29 is a block diagram showing the functional structure of a data mask generating circuit 130 in accordance with the fifth embodiment. The data mask generating circuit 130 includes a data mask generation information specifying circuit 1301, a data mask generation information table 1302, and LFSR (linear feedback shift register) delay calculating circuits 1303a, 1303b, and 1303c.

FIG. 30 schematically shows the data structure of the data mask generation information table 1302. The data mask generation information table 1302 contains the data mask generation information associated with access IDs. The data mask generation information contains various parameters to be used for generating a data mask value based on each of the access IDs. The parameters include characteristic polynomial coefficients, delay coefficients, and initial masks that are to be input to the LFSR delay calculating circuits 1303a, 1303b, and 1303c. However, it is not necessary to record the data of the initial masks in the fifth embodiment, because the LFSR delay calculating circuits 1303a, 1303b, and 1303c of the fifth embodiment do not use initial masks.

Referring back to FIG. 29, the data mask generation information specifying circuit 1301 first acquires an access ID from the access ID register 110 or the access ID managing circuit 140. The data mask generation information specifying circuit 1301 then refers to the data mask generation information table 1302, and determines the data mask generation information, which is the various parameters associated with the acquired access ID.

The parameters determined by the data mask generation information specifying circuit 1301 are input to the LFSR delay calculating circuits 1303a, 1303b, and 1303c. The address of the memory 40 to be accessed is also input to the LFSR delay calculating circuits 1303a, 1303b, and 1303c. Based on those input data, the LFSR delay calculating circuits 1303a, 1303b, and 1303c calculate a data mask.

In general, the series generated by LFSRs using primitive polynomials as characteristic polynomials are called M series and are widely known as having excellent characteristics as pseudo random numbers. In this embodiment, the LFSR corresponding to a certain characteristic polynomial sets the address of the memory 40 to be accessed as its initial state.

The internal state after predetermined shifting from the initial state is performed by the steps corresponding to the access ID is used as the data mask.

In this embodiment, each address consists of 24 bits, and three 24-step LFSRs that use three 24th-order primitive polynomials as characteristic polynomials are employed. The internal state of each 24-step LFSR consists of 24 bits. Accordingly, a mask of 72 bits at a maximum can be acquired from the three LFSR delay calculating circuits 1303a, 1303b, and 1303c. However, only 64 bits are required in this embodiment. Therefore, 22 bits are acquired from the LFSR delay calculating circuit 1303a, and 21 bits are acquired from each of the LFSR delay calculating circuits 1303b and 1303c.

The address is set in the initial states of the LFSR delay calculating circuits 1303a, 1303b, and 1303c, and the internal states "Mx" obtained after the LFSRs are shifted by the steps corresponding to the delay coefficient determined by the access ID is acquired. The values of those internal states are added up to be output as a data mask. The arrangement of the signal lines used for turning the values acquired from the three LFSR delay circuits 1303a, 1303b, and 1303c into a data mask is not particularly limited.

The operation of the LFSR delay calculating circuit 1303a is now described in greater detail. It should be noted that the operation of each of the LFSR delay calculating circuits 1303b and 1303c is the same as that of the LFSR delay calculating circuit 1303a. The characteristic polynomial of a LFSR is expressed by Equation (7):

$$f(x) = A_0 x^0 + A_1 x^1 + A_2 x^2 + \ldots + A_{24} x^{24} \tag{7}$$

In this case, to obtain the value to be output after d steps in the LFSR, the remainder $g(x)$ of $x^d$ divided by $f(x)$ is determined. Here, $g(x)$ is expressed by Equation (8):

$$g(x) = B_0 x^0 + B_1 x^1 + B_2 x^2 + \ldots + B_{23} x^{23} \tag{8}$$

The sum of products of the coefficients of $g(x)$ ($B_0$, $B_1$, ... $B_{23}$) and the internal state of the LFSR (the vector of the value of each step in the shift register) is calculated, so as to obtain the number of "1" bits that appear after the d steps. The coefficients $B_0$, $B_1$, ... $B_{23}$ are called delay coefficients.

The data mask generation information table 1302 contains the characteristic polynomial coefficients $A_0, A_1, \ldots A_{n-1}$, the delay coefficients $B_0, B_1, \ldots B_{n-1}$, and the internal states as the initial values $S_0, S_1, \ldots S_{n-1}$. The highest-order coefficient $A_n$ of the characteristic polynomial coefficients is always 1, and therefore, it is not necessary to hold An in advance.

The LFSR delay calculating circuits 1303a, 1303b, and 1303c output the values $M_0, M_1, \ldots M_{m-1}$, after the steps that are determined by the initial values and the delay coefficients $B_0, B_1, \ldots B_{n-1}$. In this embodiment, n is 24. Also, the value of m-bit data differs among the LFSR delay calculating circuits 1303a, 1303b, and 1303c. Since 21 bits are to be acquired from each of the LFSR delay calculating circuits 1303b and 1303c, m-bit data for each of the LFSR delay calculating circuits 1303b and 1303c is 21. Since 22 bits are to be acquired from the LFSR delay calculating circuit 1303a, m-bit data for the LFSR delay calculating circuit 1303a is 22.

Figure 31:
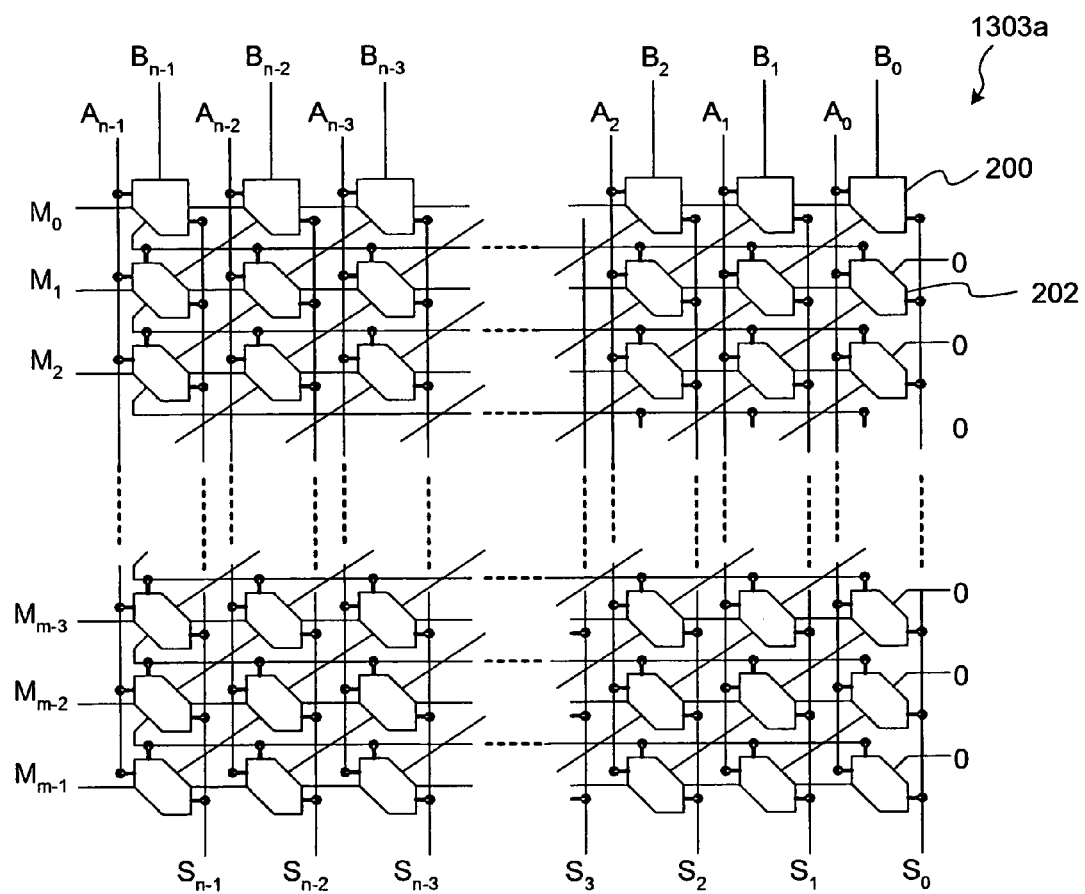
FIG. 31 shows in greater detail the structure of a LFSR delay calculating circuit.
Figure 32:
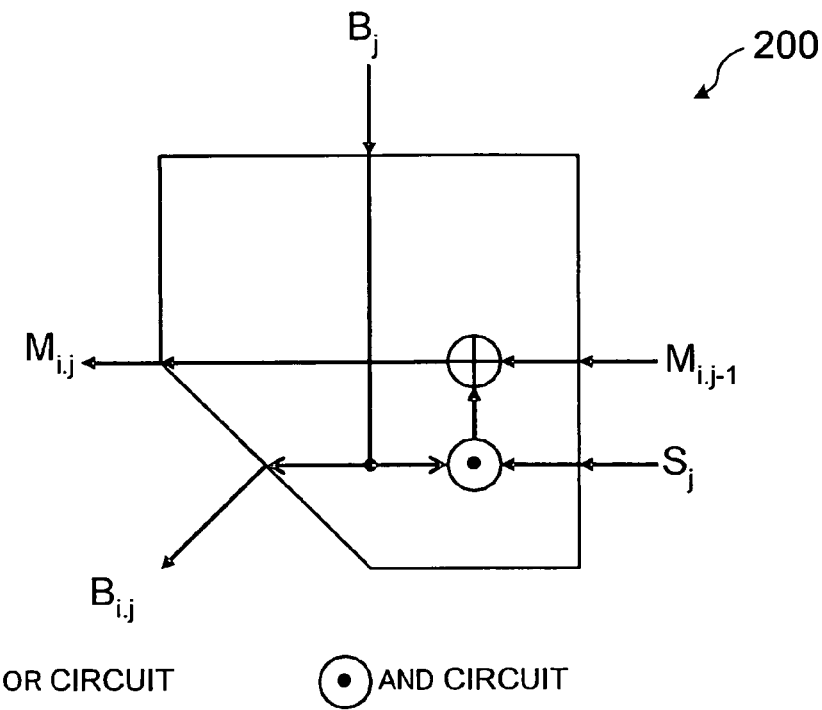
FIG. 32 shows a circuit contained in the LFSR delay calculating circuit.
Figure 33:
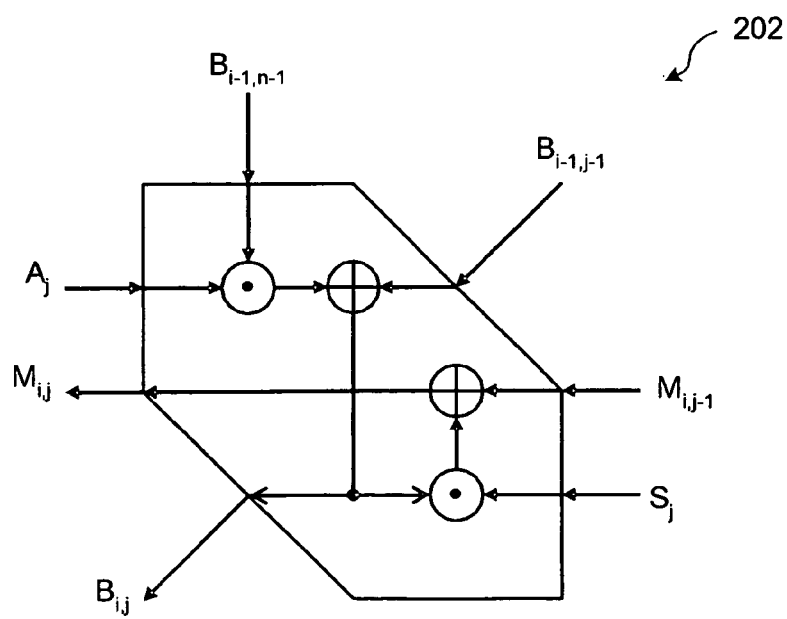
FIG. 33 shows another circuit contained in the LFSR delay calculating circuit.

FIG. 31 shows a more specific structure of the LFSR delay calculating circuit 1303a. The structure of each of the other LFSR delay calculating circuits 1303b and 1303c is the same as the structure of the LFSR delay calculating circuit 1303a. FIG. 32 shows a circuit 200 that is provided in the LFSR delay calculating circuit 1303a. FIG. 33 shows a circuit 202 that is provided in the LFSR delay calculating circuit 1303a.

The first-stage circuit of the LFSR delay calculating circuit 1303a formed with the circuit 200 shown in FIG. 32 calculates the bit M that is determined by the delay coefficient B after a delay. More specifically, the first-stage circuit calculates the sum of products of the delay coefficients $B_0, B_1, \ldots B_{n-1}$ and the initial values $S_0, S_1, \ldots S_{n-1}$, and outputs the sum of products as $M_0$.

The circuit that is formed with the circuit 202 shown in FIG. 33 and is located at the second or later stage in the LFSR delay calculating circuit 1303a calculates the bit after the delay of a later step. More specifically, based on the delay coefficients and the characteristic polynomials of the upper stage, the circuit 202 calculates the delay coefficients of the subject stage, and then calculates and outputs the sum of products of the delay coefficients and the initial values.

The delay coefficients of the subject stage are calculated based on the delay coefficients of the upper stage in the following manner. Where $g(x)$ represents the delay coefficients of d steps, the remainder $g'(x)$ of $g(x) \cdot x$ divided by $f(x)$ represents the delay coefficients of d+1 steps. Utilizing this relationship, the delay coefficients of the upper stage are shifted by 1 bit. If the highest-order coefficient is "1", it is larger than $f(x)$. Accordingly, the delay coefficients of the subject stage can be determined by dividing it by $f(x)$. The dividing by $f(x)$ is performed by calculating the XOR between $f(x)$ and the coefficients.

The delay coefficients to be stored in association with access IDs in the data mask generation information table 1302 should be different for each access ID. Also, the delay coefficients associated with the access IDs should be different for each access ID.

The delay coefficients associated with the access IDs should be determined based on random numbers or the likes at the time of access ID generation. Here, the number d of delay steps should be determined based on random numbers, and the delay coefficients corresponding to the number d should be calculated. In a modification, the values of random numbers may be used as the delay coefficients as they are.

The other aspects of the structure and the operation of the access control system 1 in accordance with the fifth embodiment are the same as the structure and the operation of the access control system 1 in accordance with the foregoing embodiments.

Modifications of the access control system 1 in accordance with the fifth embodiment are now described. Although each characteristic polynomial is determined based on an access ID in this embodiment, characteristic polynomials to be used may be set in advance. In other words, fixed characteristic polynomials may be set. The characteristic polynomials to be used by the LFSR delay calculating circuits 1303a, 1303b, and 1303c may be either the same or different from one another.

In such a case, the data mask generation information table 1302 may not hold the coefficients of the characteristic polynomials. Furthermore, the LFSR delay calculating circuit 1303a shown in FIG. 31 may be embodied as a simpler circuit.

Next, an access control system 1 in accordance with a sixth embodiment is described. The access control system 1 in accordance with the sixth embodiment is substantially the same as the access control system 1 in accordance with the fifth embodiment, except for the operation to be performed by the data mask generating circuit 130.

Figure 34:
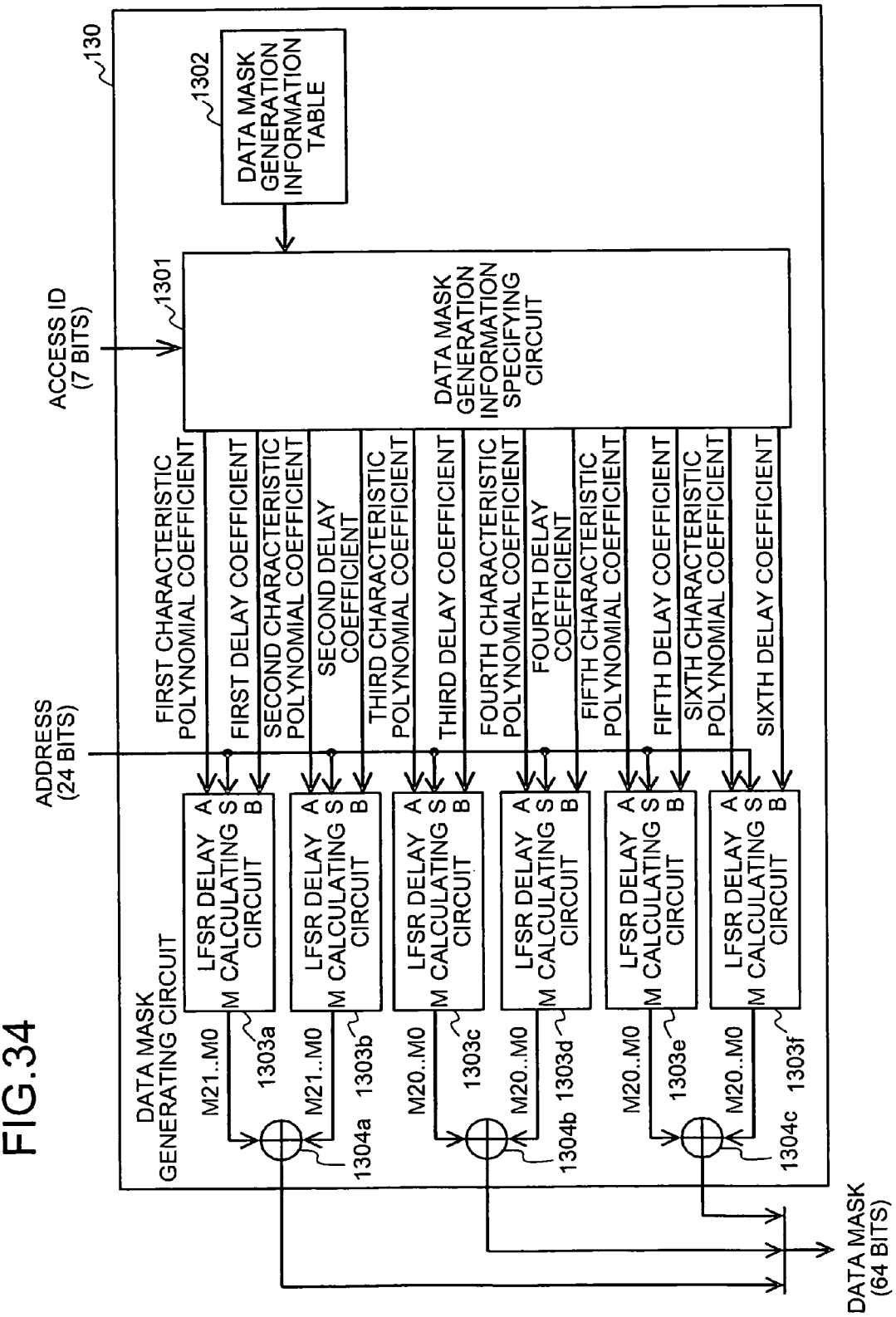
FIG. 34 is a block diagram showing the functional structure of a data mask generating circuit in accordance with a sixth embodiment of the present invention.

FIG. 34 is a block diagram showing the functional structure of the data mask generating circuit 130 in accordance with the sixth embodiment. The data mask generating circuit 130 in accordance with the sixth embodiment includes a data mask generation information specifying circuit 1301, a data mask generation information table 1302, LFSR delay calculating circuits 1303*a*, 1303*b*, 1303*c*, 1303*d*, 1303*e*, and 1303*f*, and XOR circuits 1304*a*, 1304*b*, and 1304*c*.

The data mask generating circuit 130 in accordance with the sixth embodiment combines two of the LFSR delay calculating circuits 1303, and uses an excusive OR between the values output from the two LFSR delay calculating circuits 1303 as a data mask.

For example, the LFSR delay calculating circuit 1303*a* and the LFSR delay calculating circuit 1303*b* are combined as a set. The XOR circuit 1304*a* calculates the XOR between the value M output from the LFSR delay calculating circuit 1303*a* and the value M output from the LFSR delay calculating circuit 1303*b*. The set of the LFSR delay calculating circuit 1303*c* and the LFSR delay calculating circuit 1303*d*, and the XOR circuit 1304*b* operate in the same manner as above. The set of the LFSR delay calculating circuit 1303*e* and the LFSR delay calculating circuit 1303*f*, and the XOR circuit 1304*c* also operate in the same manner as above.

As described above, the data mask generating circuit 130 in accordance with the sixth embodiment does not use the LFSR delay calculating circuits independently of one another, but combines each two LFSR delay calculating circuits and obtains an XOR between each two outputs. Thus, the randomness among the data masks output from the data mask generating circuit 130 can be increased.

The other aspects of the structure and the operation of the access control system 1 in accordance with the sixth embodiment are the same as the structure and the operation of the access control system 1 in accordance with the fifth embodiment.

Although an XOR between the output values of each two LFSR delay calculating circuits is calculated in this embodiment, three or more LFSR delay calculating circuits may be combined as a set, and an XOR among the output values of those LFSR delay calculating circuits may be used as a data mask. Alternatively, a set of two LFSR delay calculating circuits and a set of three LFSR delay calculating circuits may coexist.

Next, an access control system 1 in accordance with a seventh embodiment is described. The access control system 1 in accordance with the seventh embodiment is substantially the same as the access control system 1 in accordance with the fifth embodiment, except for the operation to be performed by the data mask generating circuit 130.

Figure 35:
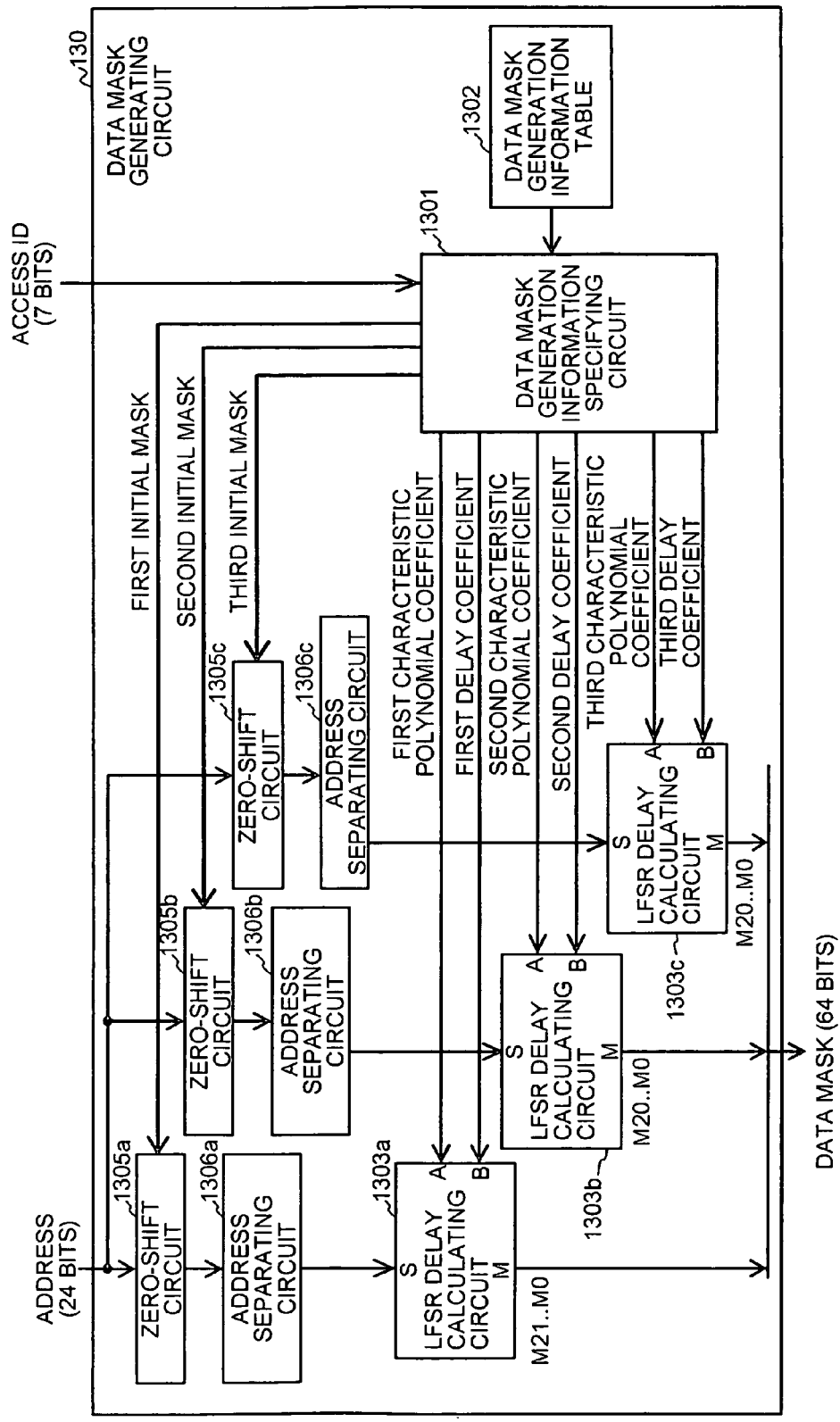
FIG. 35 is a block diagram showing the functional structure of a data mask generating circuit in accordance with a seventh embodiment of the present invention.

FIG. 35 is a block diagram showing the function structure of the data mask generating circuit 130 in accordance with the seventh embodiment. The data mask generating circuit 130 in accordance with the seventh embodiment further includes zero-shift circuits 1305*a*, 1305*b*, and 1305*c*, and address separating circuits 1306*a*, 1306*b*, and 1306*c*.

The LFSR delay calculating circuits 1303*a*, 1303*b*, and 1303*c* do not receive addresses directly as inputs, but receive addresses on which zero shifting and address separating have been performed by the zero-shift circuits 1305*a*, 1305*b*, and 1305*c*, and the address separating circuits 1306*a*, 1306*b*, and 1306*c*.

The zero-shift circuits 1305*a*, 1305*b*, and 1305*c* perform the same operation, and the address separating circuits 1306*a*, 1306*b*, and 1306*c* also perform the same operation. Therefore, only the zero-shift circuit 1305*a* and the address separating circuit 1306*a* are described in the following.

The zero-shift circuit 1305*a* converts an address of zero into another address. The LFSR delay calculating circuit 1303*a* invariably outputs zero when the address is "zero". Accordingly, when the address is "zero", the address is output as it is, even though the address has been subjected to processing by the LFSR delay calculating circuit 1303*a*. Therefore, the zero-shift circuit 1305*a* converts the value "zero" into another value.

More specifically, the zero-shift circuit 1305*a* adds an input address to an initial mask, and outputs the result of the addition. Initial masks are recorded in the data mask generation information table 1302. The data mask generation information specifying circuit 1301 reads the initial masks and sends them to the zero-shift circuits 1305*a*, 1305*b*, and 1305*c*, respectively.

In a modification, an XOR between an input address and an initial mask may be output.

The address separating circuit 1306*a* converts addresses having close values to each other into addresses that are more distant from each other. When two addresses are input successively, the chances are that only one bit in one of the two addresses has a different value from the corresponding bit in the other. This leads to an undesirable situation in which there might be a correlation between the mask values of the adjacent addresses. To prevent a correlation between mask values, each two adjacent addresses are converted into addresses that are more distant from each other.

Figure 36:
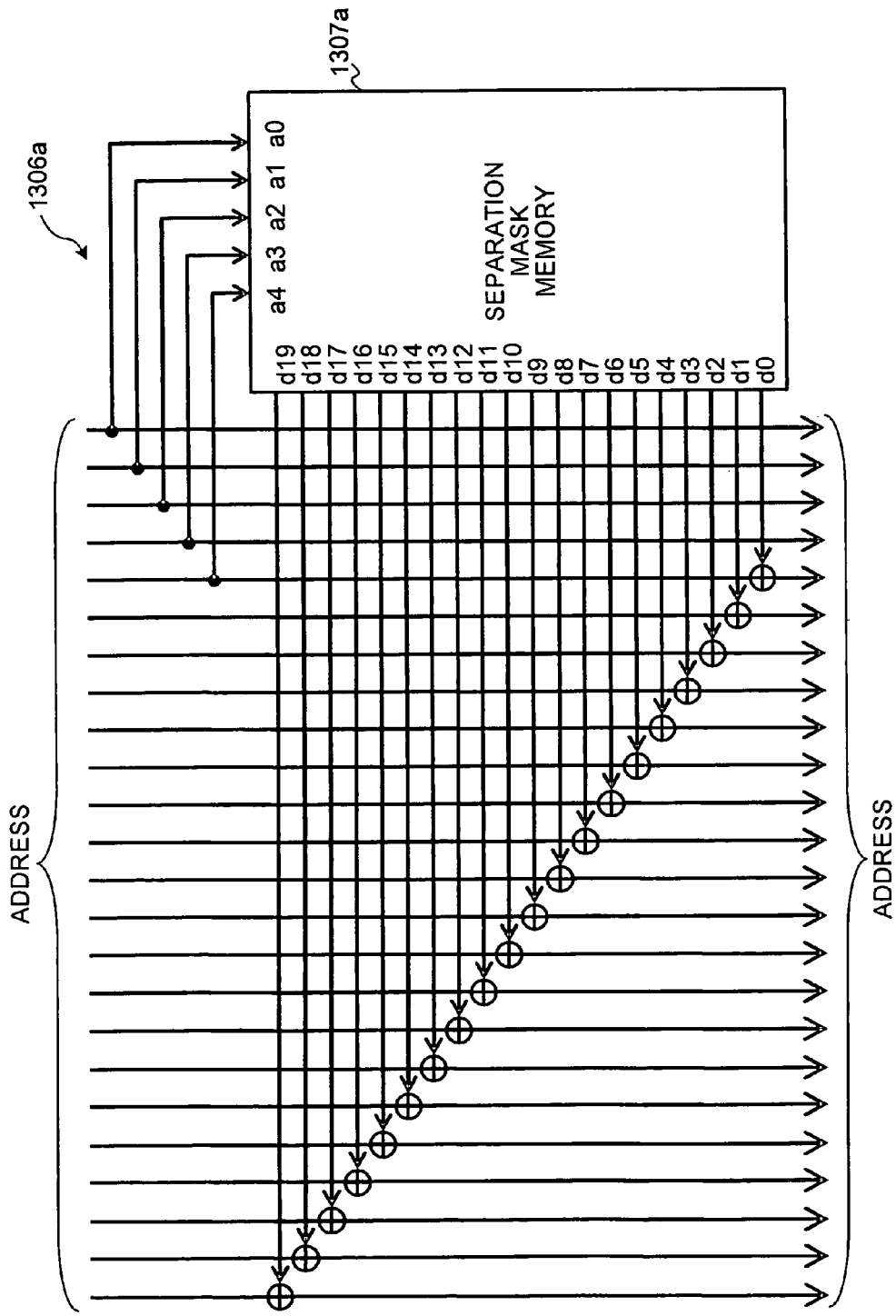
FIG. 36 shows an address separating circuit.

FIG. 36 shows a specific example structure of the address separating circuit 1306*a*. The address separating circuit 1306*a* includes a separation mask memory 1307*a*. The separation mask memory 1307*a* has an address separation pattern that is recorded therein in advance. When an address is input to the address separating circuit 1306*a*, the separation mask memory 1307*a* is referred to in accordance with the lower-order bits of the address, and an XOR between the value and the higher-order bits of the address is calculated. In this manner, even when two successive addresses are input, the addresses are converted into addresses distant from each other before output.

The other aspects of the structure and the operation of the access control system 1 in accordance with the seventh embodiment are the same as the structure and the operation of the access control system 1 in accordance with the fifth embodiment.

Figure 37:
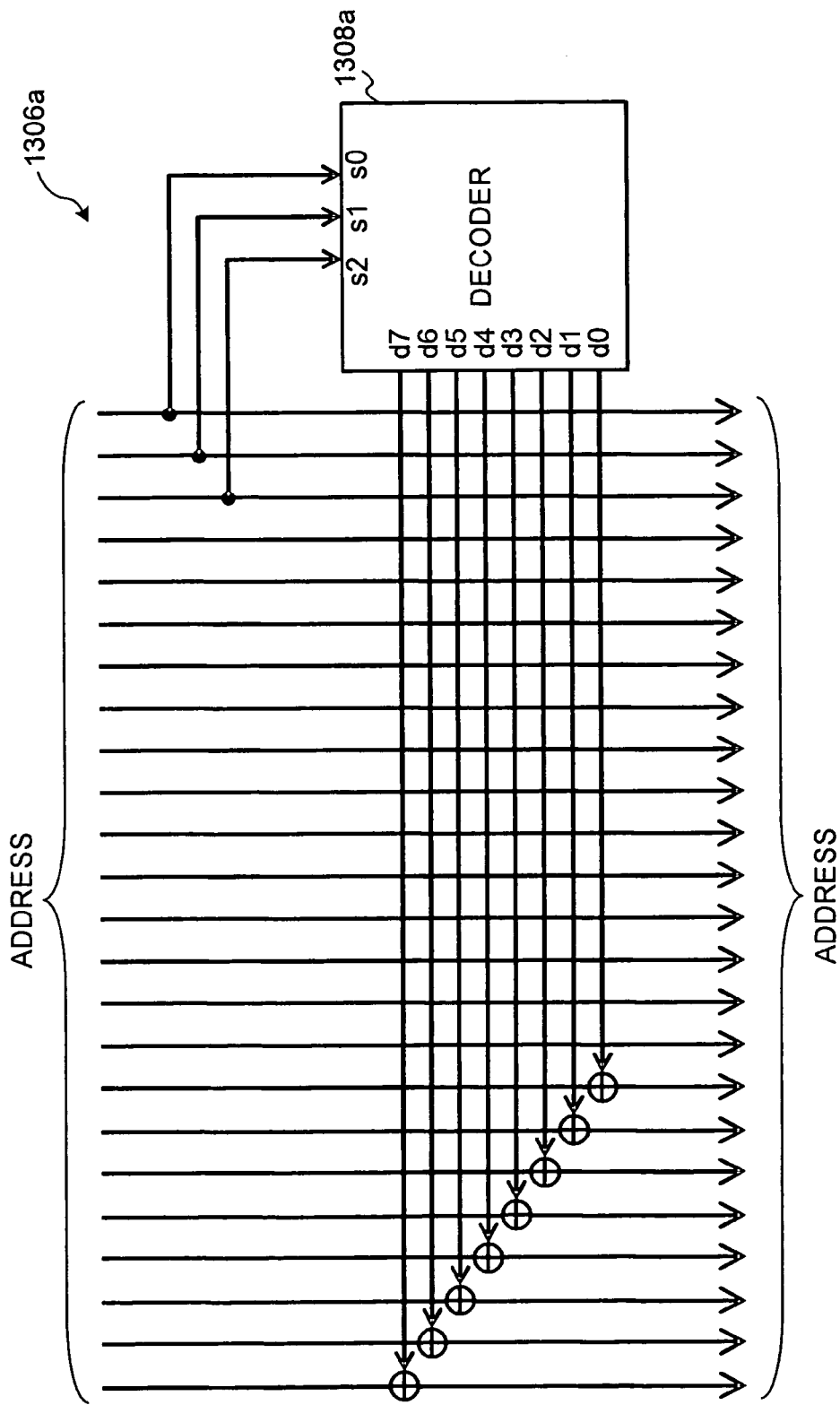
FIG. 37 shows an address separating circuit in accordance with a first modification of the seventh embodiment.

A first modification of the data mask generating circuit 130 in accordance with the seventh embodiment is now described. FIG. 37 shows a specific structure of the address separating circuit 1306*a* in accordance with the first modification. The address separating circuit 1306*a* in accordance with the first modification includes a decoder 1308*a*. The decoder 1308*a* selects a higher-order address from the lower-order bits of a subject address, and inverts the value of the selected address by calculating an XOR. Like the address separating circuit 1306*a* of the seventh embodiment, the address separating circuit 1306*a* in accordance with this modification can change each two neighboring addresses to addresses that are distant from each other.

In a second modification, the data mask generating circuit 130 of the access control system 1 may include only either the zero-shift circuits 1305*a*, 1305*b*, and 1305*c*, or the address separating circuits 1306*a*, 1306*b*, and 1306*c*, though the data mask generating circuit 130 includes both the zero-shift circuits 1305*a*, 1305*b*, and 1305*c*, and the address separating circuits 1306*a*, 1306*b*, and 1306*c*.

Figure 38:
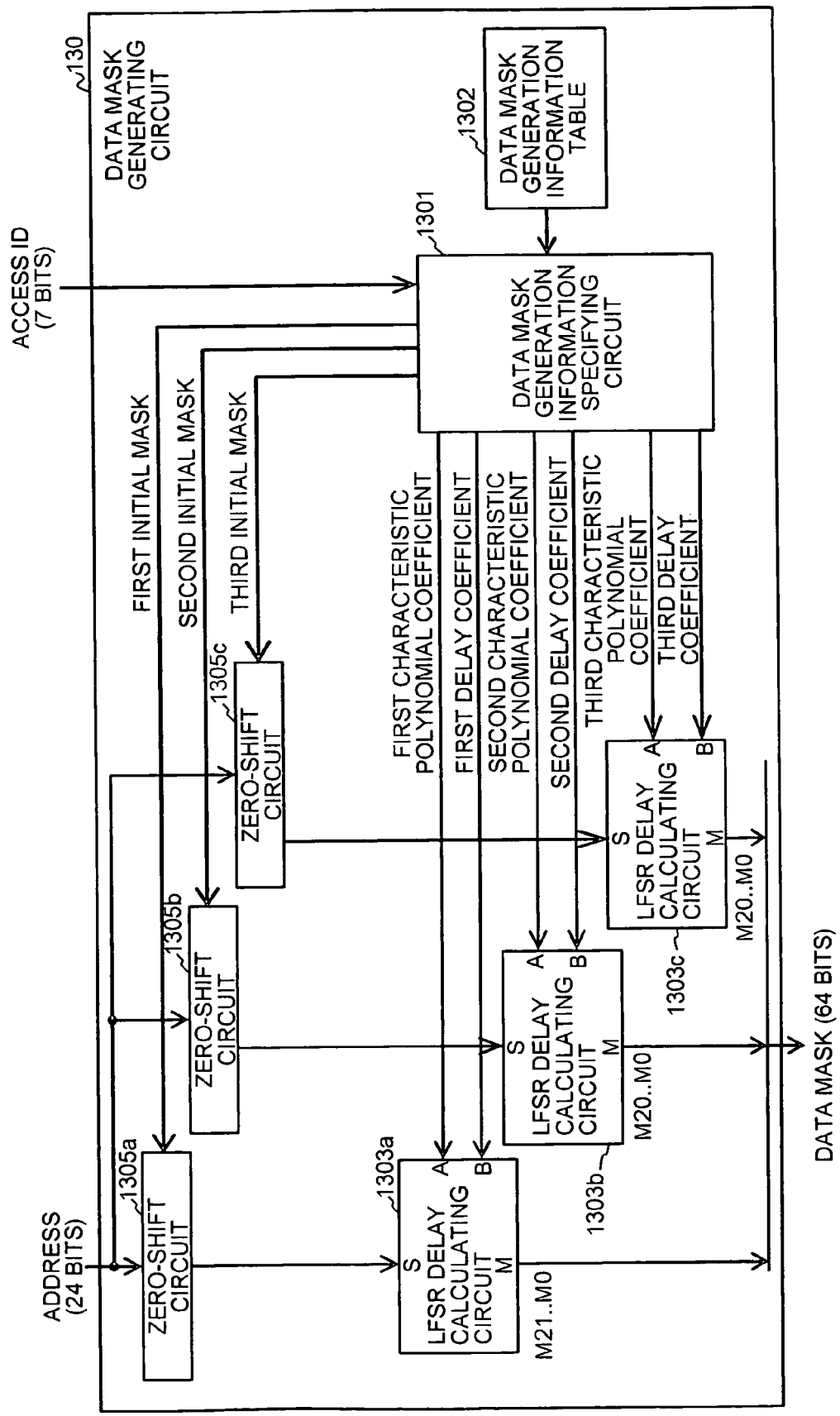
FIG. 38 is a block diagram of a data mask generating circuit that includes only the zero-shift circuits.
Figure 39:
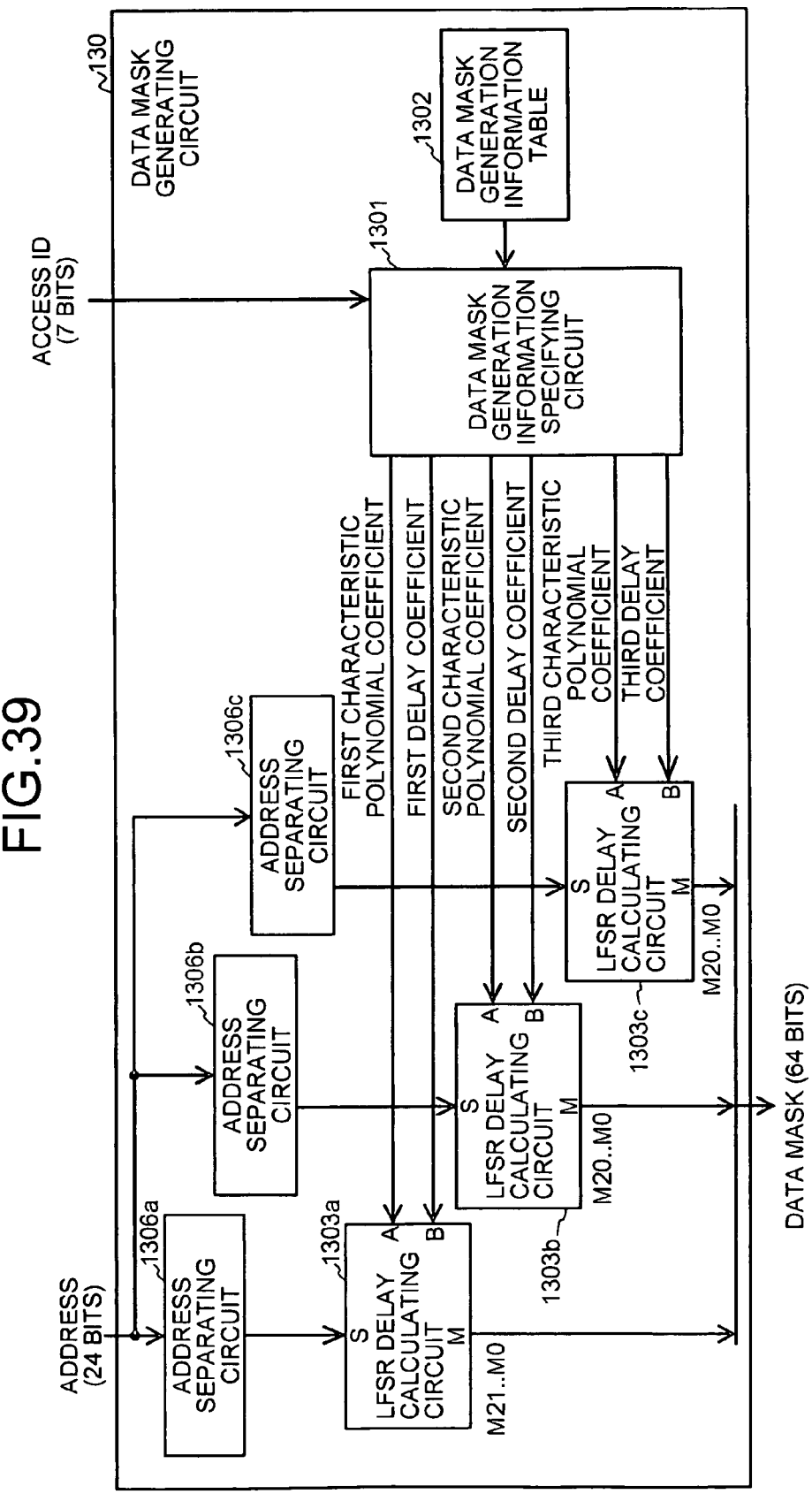
FIG. 39 is a block diagram of the data mask generating circuit that includes only the address separating circuits.

FIG. 38 is a block diagram of the data mask generating circuit 130 that includes the zero-shift circuits 1305*a*, 1305*b*, and 1305*c*, but does not include the address separating circuits 1306*a*, 1306*b*, and 1306*c*. FIG. 39 is a block diagram of the data mask generating circuit 130 that includes the address separating circuits 1306*a*, 1306*b*, and 1306*c*, but does not include the zero-shift circuits 1305*a*, 1305*b*, and 1305*c*.

Figure 40:
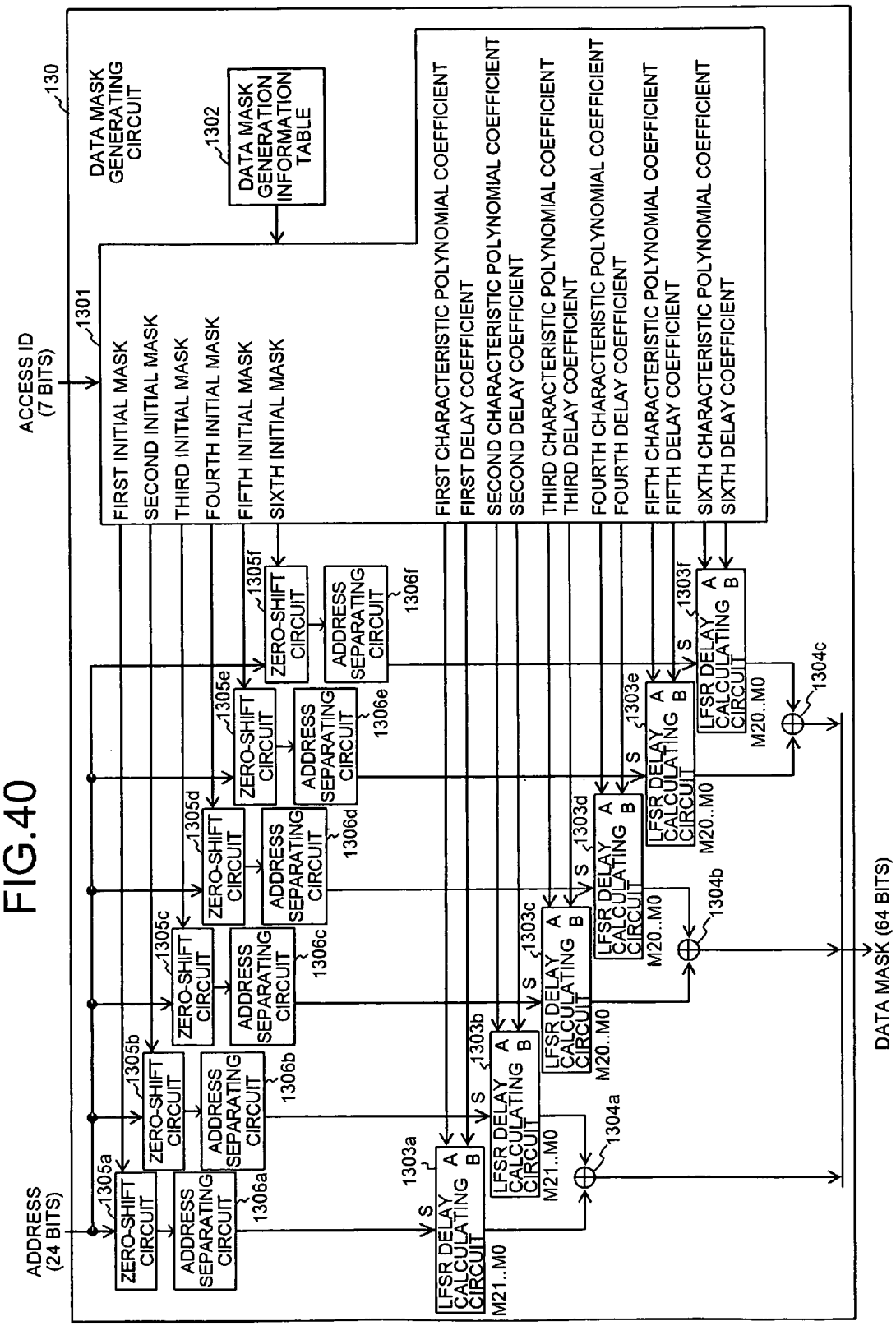
FIG. 40 is a block diagram of the data mask generating circuit in accordance with a third modification of the seventh embodiment.

FIG. 40 is a block diagram of the data mask generating circuit 130 in accordance with a third modification. The data mask generating circuit 130 in accordance with this modification is a combination of the data mask generating circuit 130 in accordance with the seventh embodiment and the data mask generating circuit 130 in accordance with the sixth embodiment. As shown in FIG. 40, the zero-shift circuits 1305 and the address separating circuits 1306 may be provided for each set of two LFSR delay calculating circuits 1303.

In this modification, the zero-shift circuits 1305 may be employed while the address separating circuits 1306 are not employed as described above. Alternatively, the address separating circuits 1306 may be employed while the zero-shift circuits 1305 are not employed.

Figure 41:
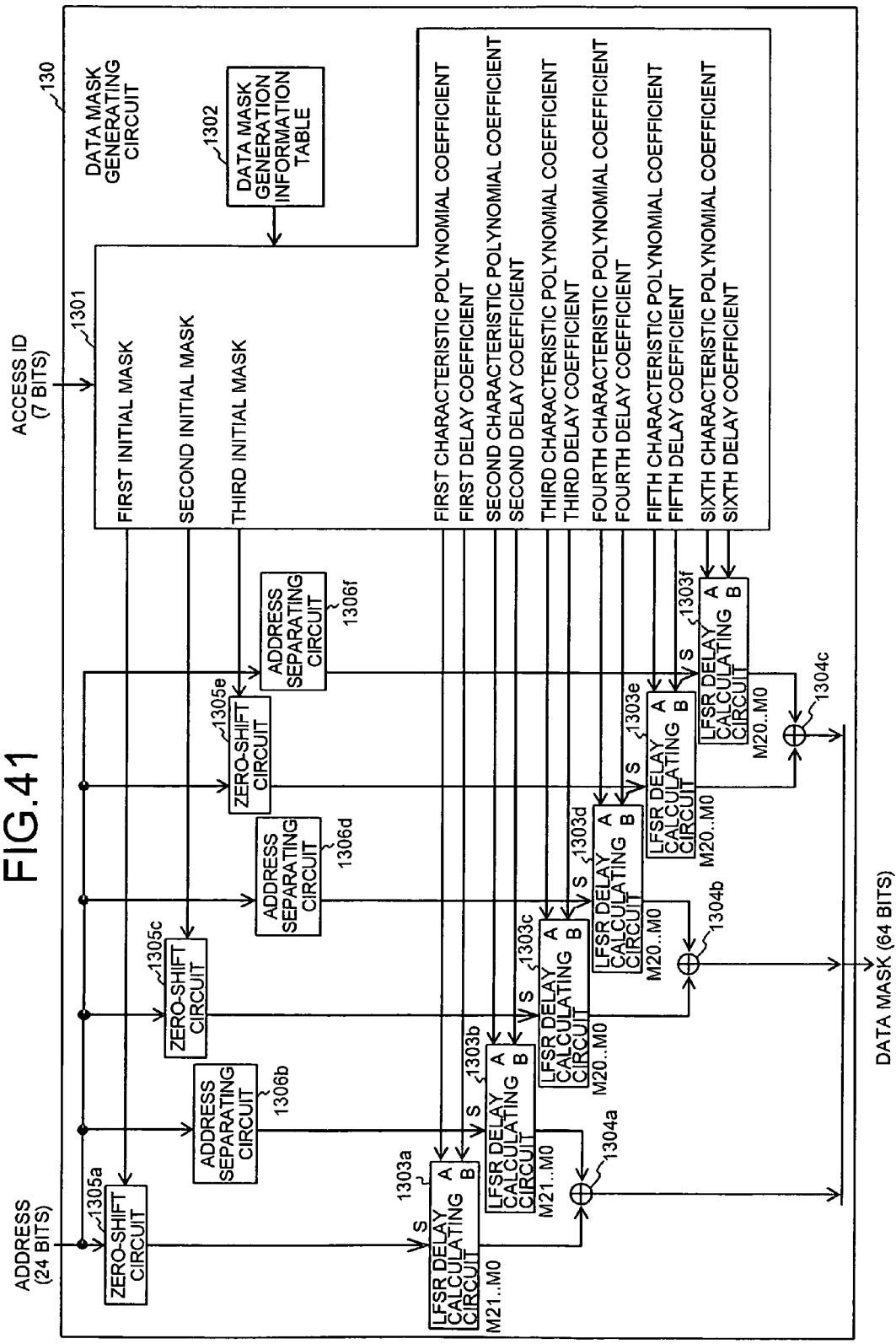
FIG. 41 is a block diagram of the data mask generating circuit in accordance with a fourth modification of the seventh embodiment.

FIG. 41 is a block diagram of the data mask generating circuit 130 in accordance with a fourth modification. Like the data mask generating circuit 130 shown in FIG. 40, the data mask generating circuit 130 shown in FIG. 41 uses each two LFSR delay calculating circuits 1301 as one set. In each set, a zero-shift circuit 1305 is provided in one of the two LFSR delay calculating circuits 1303, and an address separating circuit 1306 is provided in the other. Accordingly, each of the LFSR delay calculating circuits 1303 has either a zero-shift circuit 1305 or an address separating circuit 1306.

Figure 42:
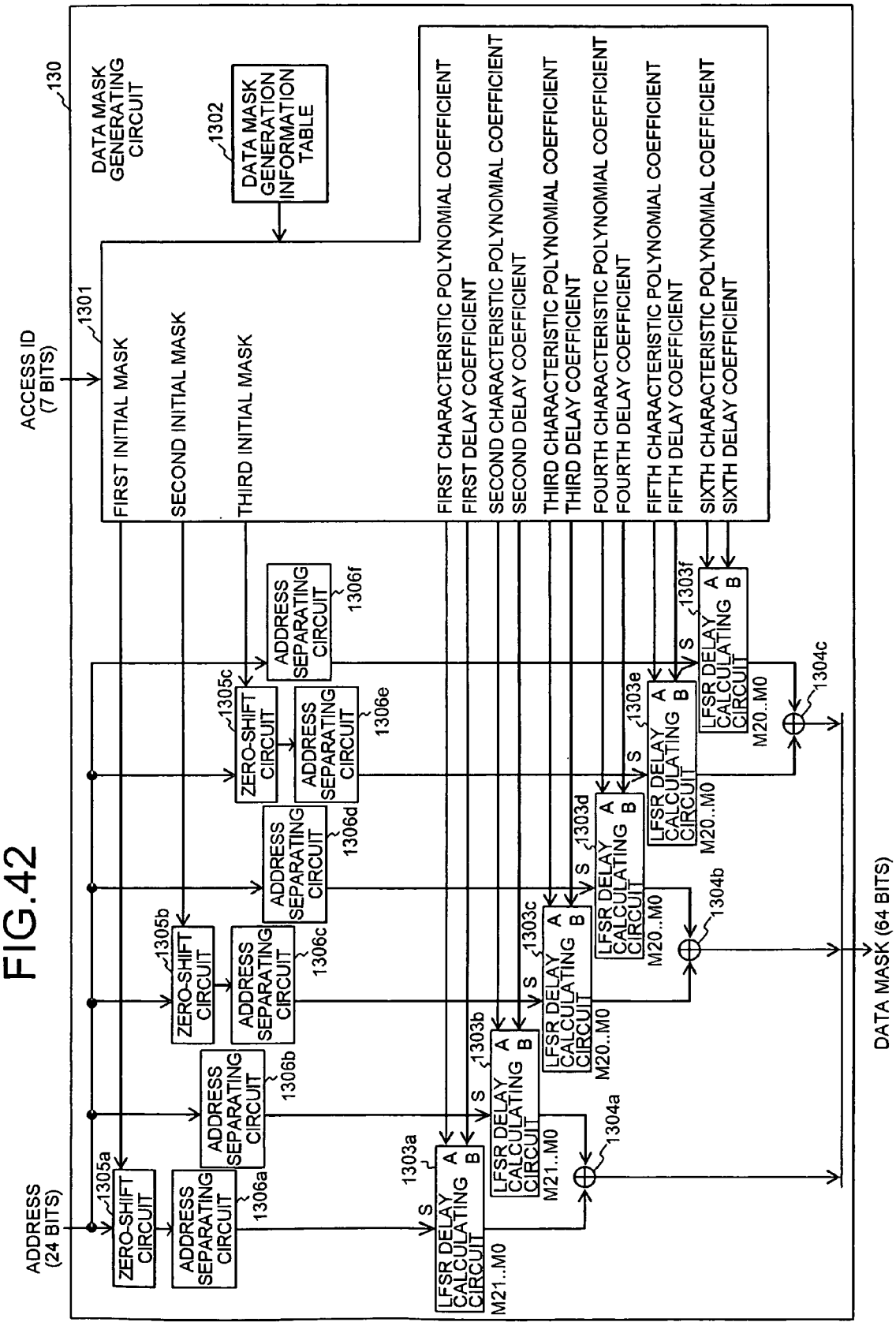
FIG. 42 is a block diagram of the data mask generating circuit in accordance with a fifth modification of the seventh embodiment.

FIG. 42 is a block diagram of the data mask generating circuit 130 in accordance with a fifth modification. Like the data mask generating circuit 130 shown in FIG. 40, the data mask generating circuit 130 shown in FIG. 42 uses each two LFSR delay calculating circuits 1303 as one set. In each set, a zero-shift circuit 1305 and an address separating circuit 1306 are provided in one of the two LFSR delay calculating circuits 1303, while only an address separating circuit 1306 is provided in the other. However, the combinations of the zero-shift circuits and the address separating circuits are not limited to the above, but may vary with situations.

Figure 43:
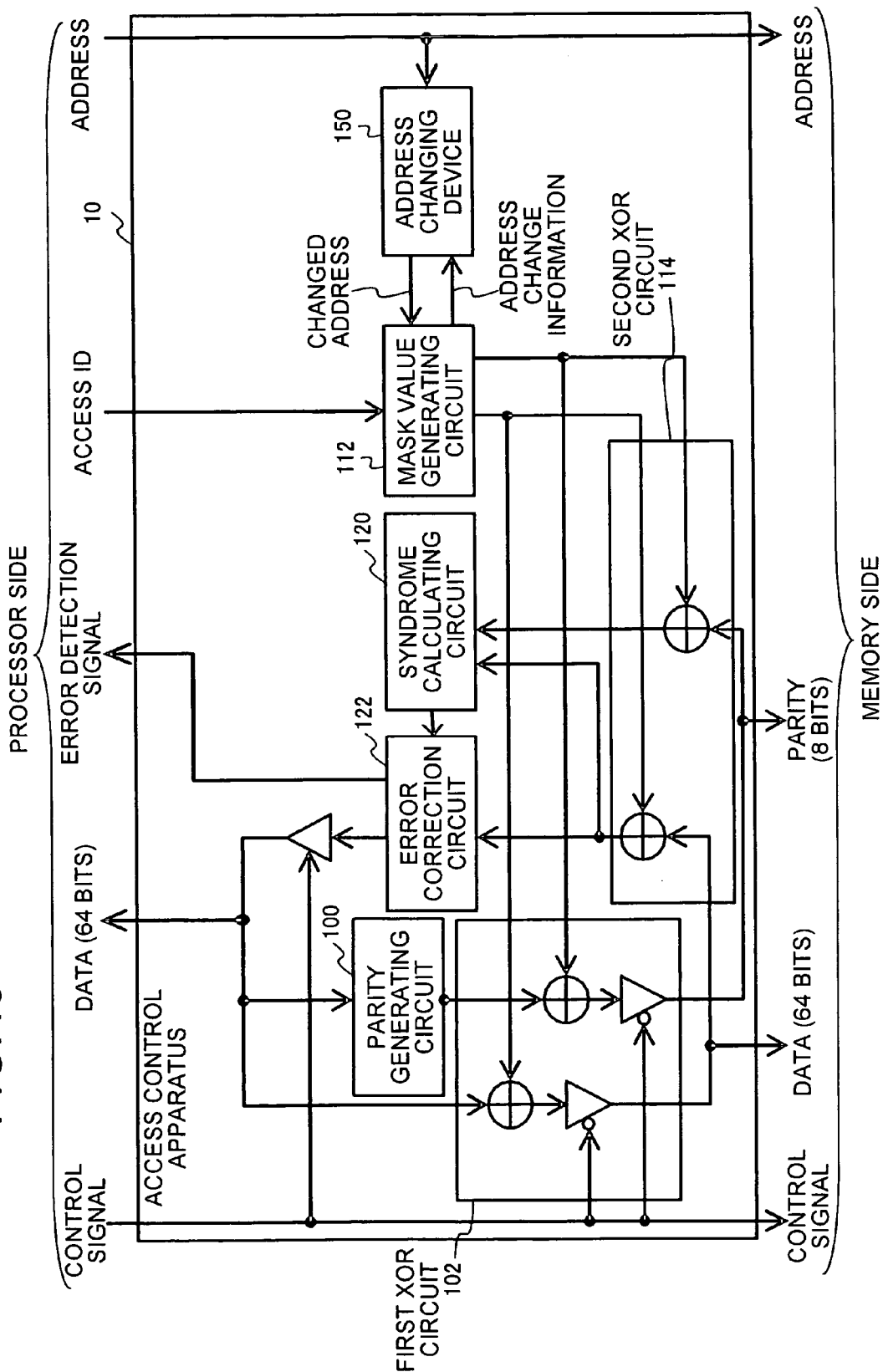
FIG. 43 is a block diagram showing the functional structure of an access control apparatus in accordance with an eighth embodiment of the present invention.

Next, an access control system 1 in accordance with an eighth embodiment is described. FIG. 43 is a block diagram showing the functional structure of the access control apparatus 10 in accordance with the eighth embodiment. The access control apparatus 10 in accordance with the eighth embodiment differs from the access control apparatus 10 in accordance with any of the foregoing embodiments in further including an address changing device 150.

The address changing device 150 changes an address acquired from the processor 20 to another address. The mask value generating circuit 112 acquires the address changed by the address changing device 150. Based on the changed address, the mask value generating circuit 112 generates a mask value.

As described above, in the access control apparatus 10 in accordance with the eighth embodiment, the mask value generating circuit 112 generates a mask value based on a changed address. Accordingly, the mask value generating circuit 112 can generate a mask value that has a less significant correlation with the address required from the processor 20, compared with the case where a mask value is generated based on the address acquired from the processor 20.

Figure 44:
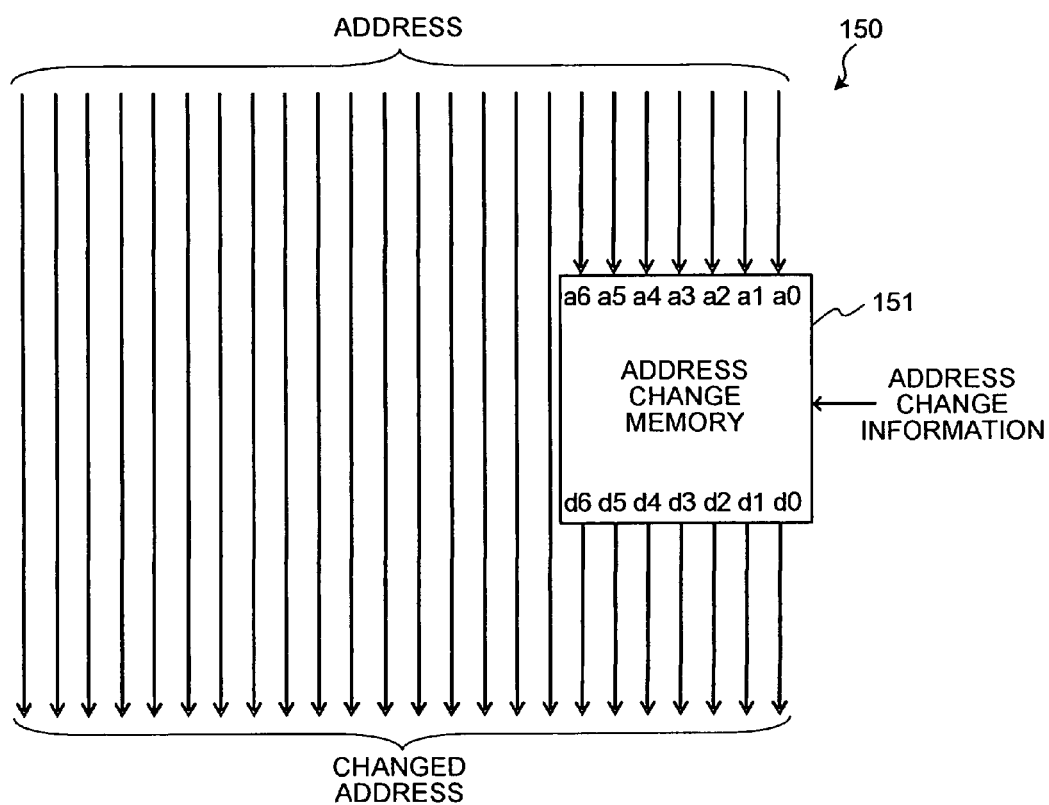
FIG. 44 shows the address changing device.

FIG. 44 shows the structure of the address changing device 150 in detail. The address changing device 150 has an address change memory 151. In the address change memory 151, a correspondence table showing which address is to be changed to which address is recorded. The lower-order bits of the input address are changed and are then output.

The correspondence table recorded in the address change memory 151 should preferably be unique to each access ID. The correspondence table for each access ID is held by the mask value generating circuit 112. More specifically, it is stored in the data mask generation information table 1302. At the time of switching access IDs, the correspondence table is written into the address change memory 151.

The other aspects of the structure and the operation of the access control system 1 in accordance with the eighth embodiment are the same as the structure and the operation of the access control system 1 in accordance with any of the foregoing embodiments.

Figure 45:
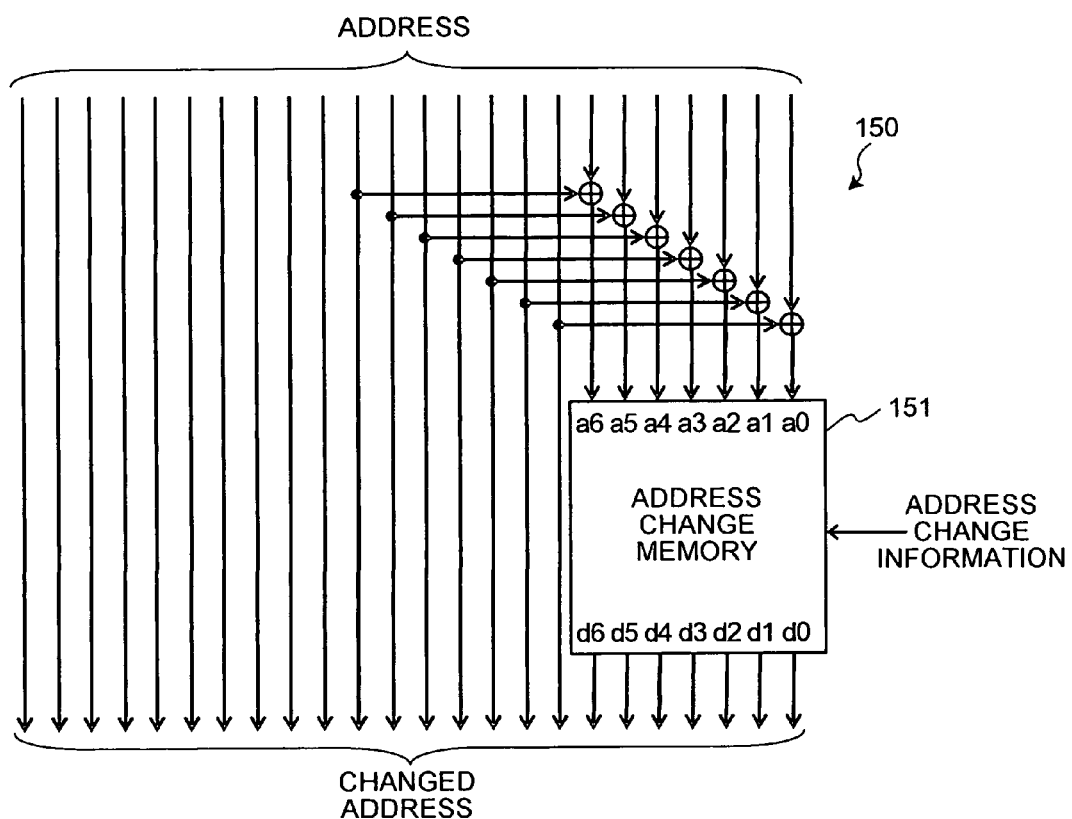
FIG. 45 shows the address changing device in accordance with a first modification of the eighth embodiment.

FIG. 45 shows the structure of the address changing device 150 in accordance with a first modification of the eighth embodiment. The address changing device 150 in accordance with the first modification calculates XORs between the middle-order bits and the lower-order bits in an input address. The address changing device 150 then outputs the address that has been changed from the original input address. Accordingly, the number of lower-order bit changing patterns stored in the address change memory 151 can be increased.

Figure 46:
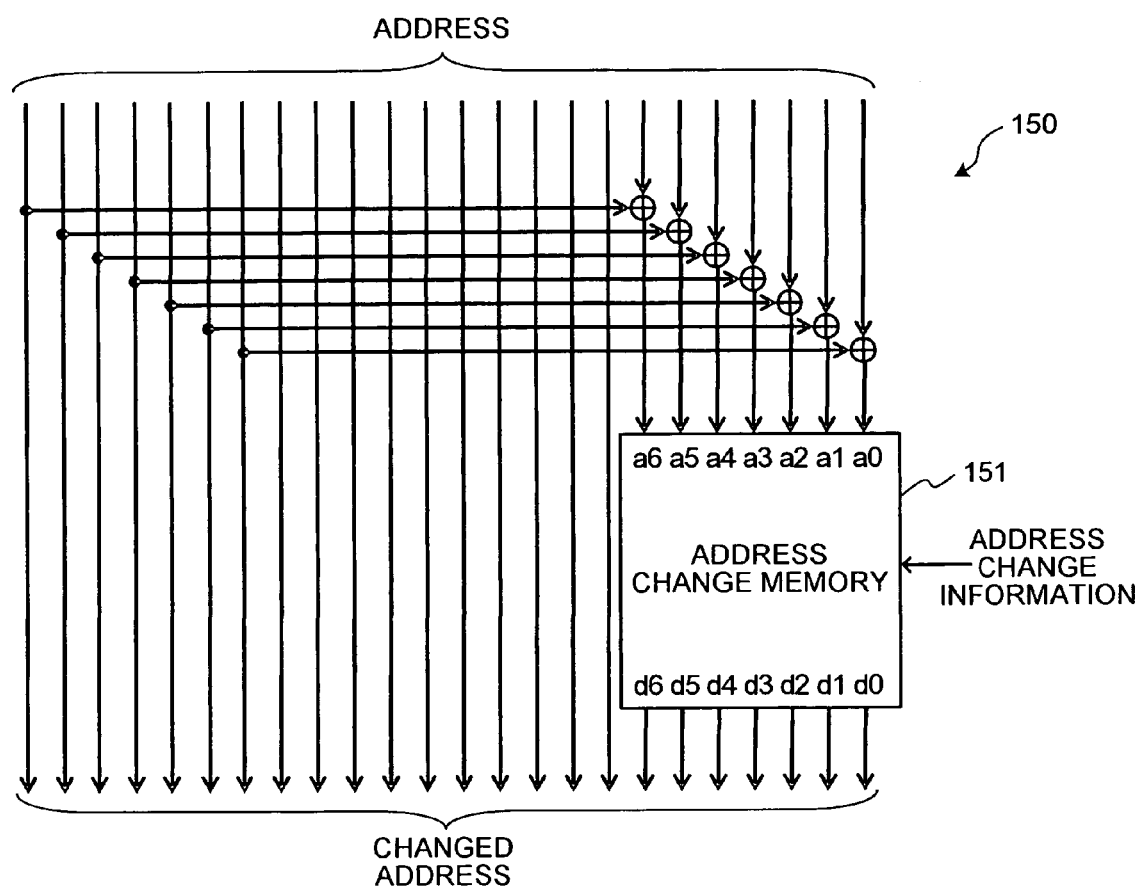
FIG. 46 shows the address changing device in accordance with a second modification of the eighth embodiment.

FIG. 46 shows the structure of the address changing device 150 in accordance with a second modification of the eighth embodiment. In this modification, XORs between the higher-order bits and the lower-order bits in an input address are calculated.

Figure 47:
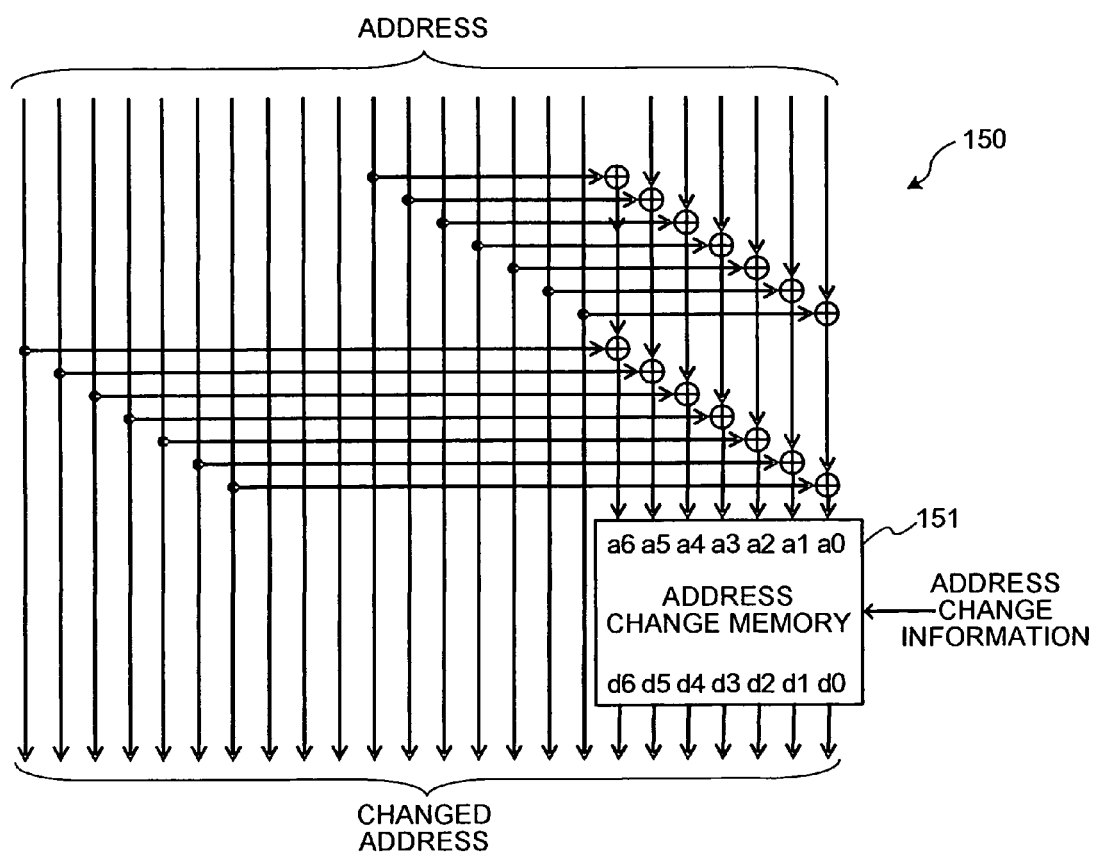
FIG. 47 shows the address changing device in accordance with a third modification of the eighth embodiment.

FIG. 47 shows the structure of the address changing device 10 in accordance with a third modification of the eighth embodiment. In this modification, XORs between the middle-order bits and the lower-order bits are calculated, and XORs between the calculation results and the higher-order bits are then calculated.

So far, the access control systems 1 in accordance with the first through eighth embodiments have been described. However, any of the access control apparatuses 10 that are characteristic of the present invention may also be applied to such systems as described below.

Figure 48:
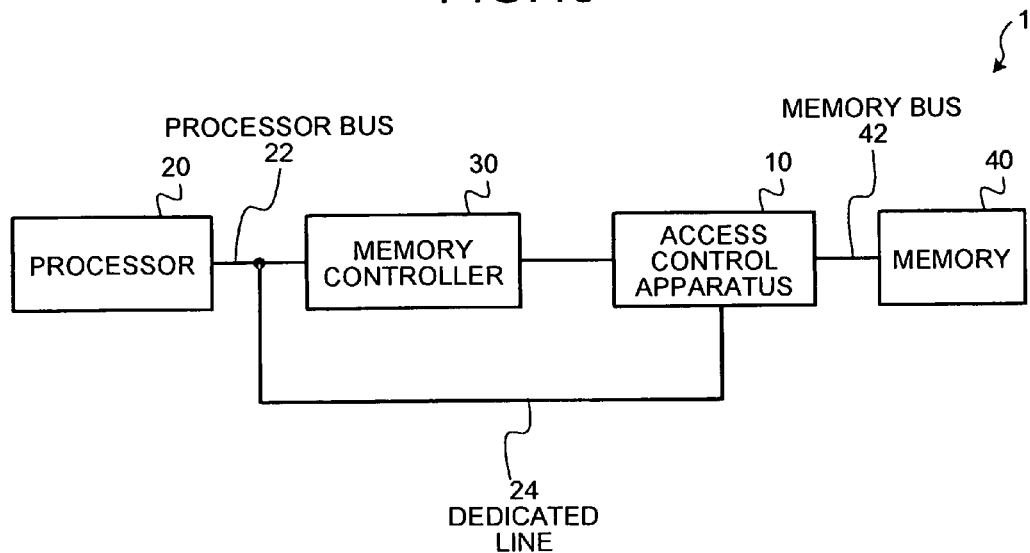
FIG. 48 shows an access control system as a first modification of the present invention.

FIG. 48 shows the entire structure of an access control system 1 in accordance with a first modification. Like the access control system 1 in accordance with any of the foregoing embodiments, the access control system 1 in accordance with the first modification includes an access control apparatus 10.

In the access control system 1 in accordance with the first modification, the processor 20 sets the information as to the access rights into the access control apparatus 10. Therefore, the access control system 1 further includes a dedicated line 24.

As the information as to the access rights is input and output via the dedicated line, unauthorized accesses can be prevented.

Figure 49:
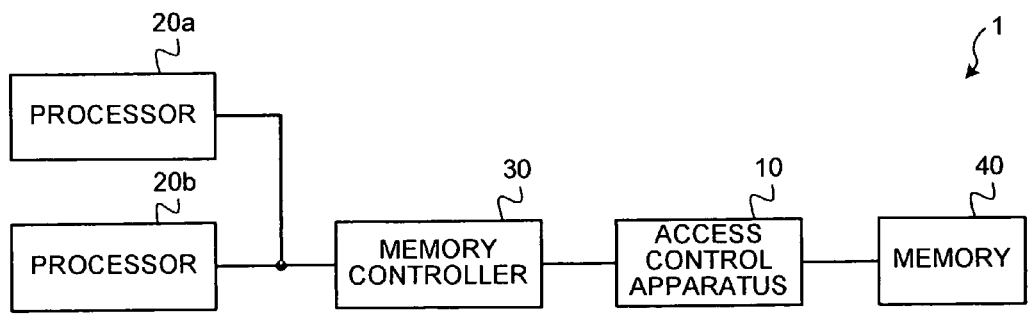
FIG. 49 shows an access control system as a second modification.

FIG. 49 shows the entire structure of an access control system 1 in accordance with a second modification. The access control system 1 in accordance with the second modification includes processors 20a and 20b. Each of the processors 20a and 20b may be a requestor of access to the memory 40. The access control apparatus 10 may control the access to the memory 40 by each of the processors 20a and 20b. Accordingly, access IDs are allotted to each of the processors 20a and 20b. More particularly, access IDs are allotted to each memory region to be accessed by the processors 20a and 20b.

Figure 50:
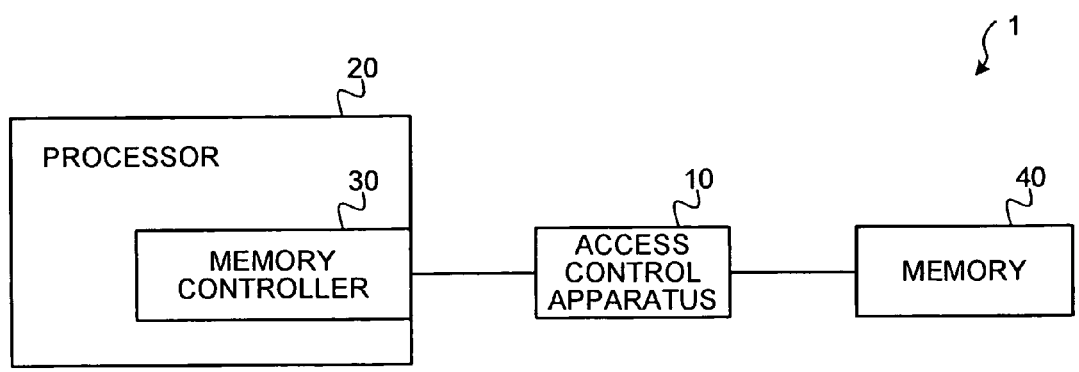
FIG. 50 shows an access control system as a third modification.

FIG. 50 shows the entire structure of an access control system 1 in accordance with a third modification. In the access control system 1 in accordance with the third modification, the processor 20 contains the memory controller 30. The processor 20 is connected to the memory 40 via the access control apparatus 10.

Figure 51:
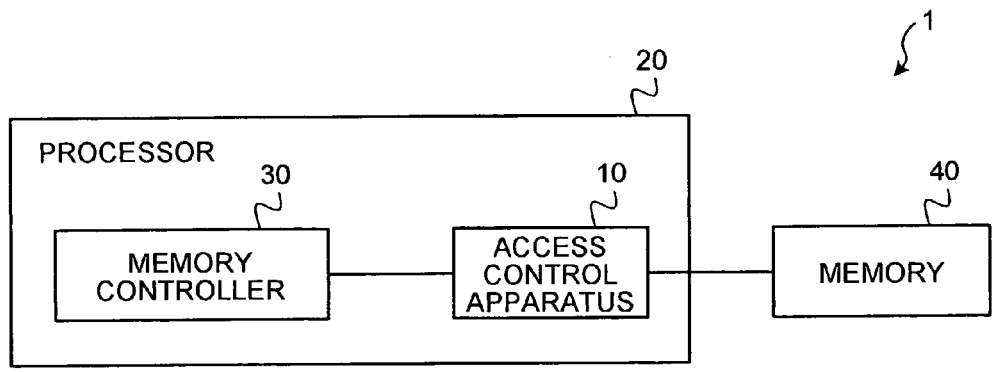
FIG. 51 shows an access control system as a fourth modification.

FIG. 51 shows the entire structure of an access control system 1 in accordance with a fourth modification. In the access control system 1 in accordance with the fourth modification, the processor 20 contains the memory controller 30 and the access control apparatus 10. The processor 20 is connected directly to the memory 40.

Figure 52:
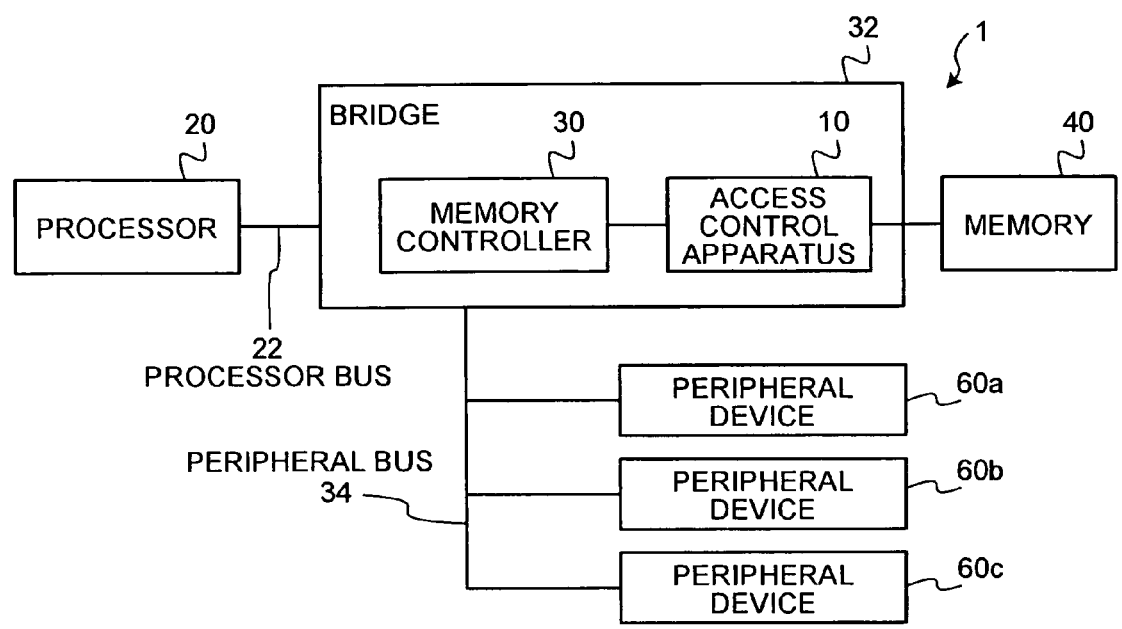
FIG. 52 shows an access control system as a fifth modification.

FIG. 52 shows the entire structure of an access control system 1 in accordance with a fifth modification. The access control system 1 in accordance with the fifth modification includes the processor 20, the memory 40, a bridge 32, and peripheral devices 60a, 60b, and 60c.

The bridge 32 is connected to the processor bus 22, and contains the memory controller 30 and the access control apparatus 10. When the bridge 32 connected to a peripheral bus 34 contains the controller for peripheral devices, the access control apparatus 10 may be incorporated into the bridge 32. Alternatively, the access control apparatus 10 may be provided between the bridge 32 and the memory 40.

Figure 53:
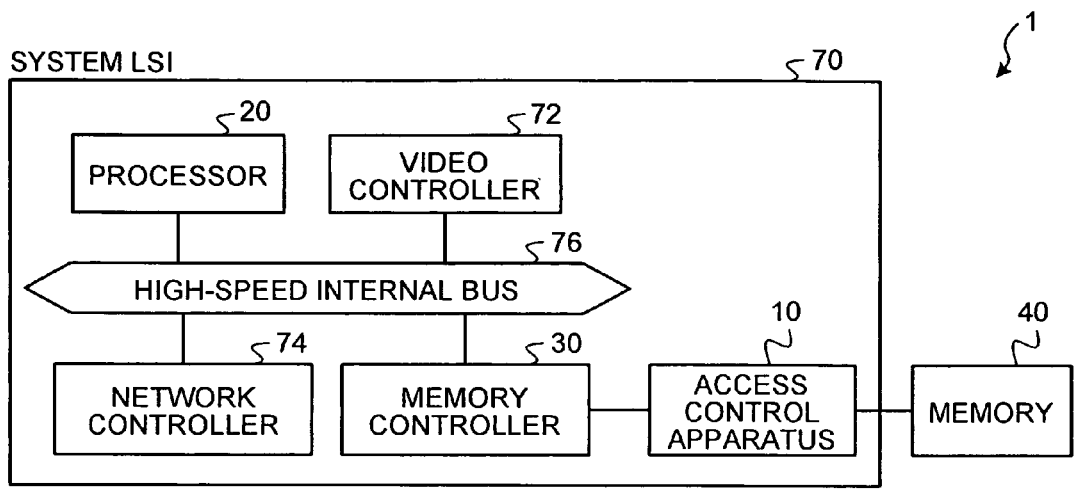
FIG. 53 shows an access control system as a sixth modification.

FIG. 53 shows the entire structure of an access control system 1 in accordance with a sixth modification. The access control system 1 in accordance with the sixth modification is structured as a system LSI (Large Scale Integration). As shown in FIG. 53, the access control apparatus 10, together with the memory controller 30 connected to the processor 20 with a high-speed internal bus 76, is mounted in the system LSI.

Figure 54:
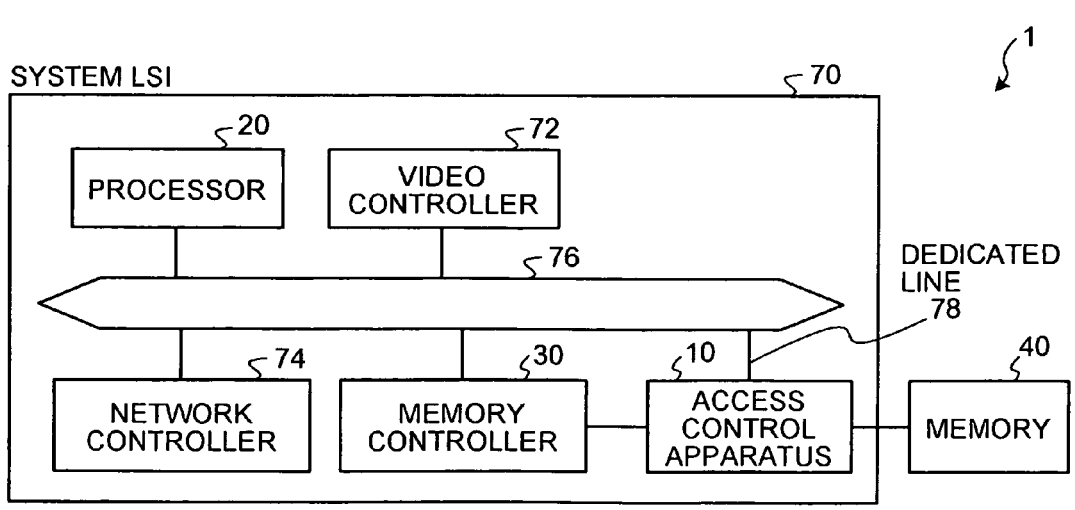
FIG. 54 shows an access control system as a seventh modification.

FIG. 54 shows the entire structure of an access control system 1 in accordance with a seventh modification. Like the access control system 1 in accordance with the sixth modification, the access control system 1 in accordance with the seventh modification is structured as a system LSI. The access control system 1 in accordance with the seventh modification includes a dedicated line 78 for the processor 20 to set the information as to the access rights into the access control apparatus 10. Accordingly, the processor 20 can access the access control apparatus 10 through the high-speed internal bus 76.

Alternatively, the memory controller 30 and the access control apparatus 10 may be mounted as an integrated circuit.

Ninth Embodiment

Figure 55:
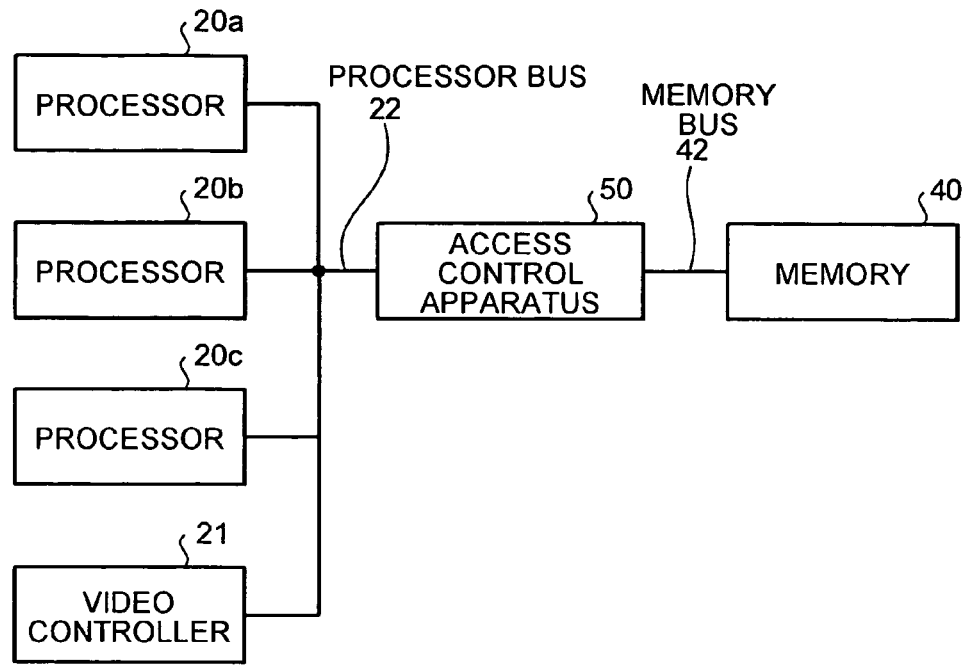
FIG. 55 shows an access control system in accordance with a ninth embodiment of the present invention.

Next, an access control system 1 in accordance with a ninth embodiment is described. The access control system 1 in accordance with the ninth embodiment performs access control on a cache memory. FIG. 55 shows the entire structure of the access control system 1 in accordance with the ninth embodiment. The access control system 1 includes processors 20a to 20c, a video controller 21, a memory 40, and an access control apparatus 50 equipped with a cache memory.

The access control apparatus 50 is connected to a processor bus 22 and a memory bus 42. The access control apparatus 50 controls accesses to the cache memory from the processors 20a to 20c and the video controller 21 connected to the access control apparatus 50 via the processor bus 22. The access control apparatus 50 also writes data into the memory 40 and reads data from the memory 40 in place of the processor 20a or the like, when necessary. In this manner, the access control apparatus 50 also has the function of the memory controller 30 of each of the foregoing embodiments.

When two or more processors and an input/output device such as the video controller 21 are employed as in the access control system 1 of the ninth embodiment, the cache memory shared among those components is used so as to increase the memory access speed.

Figure 56:
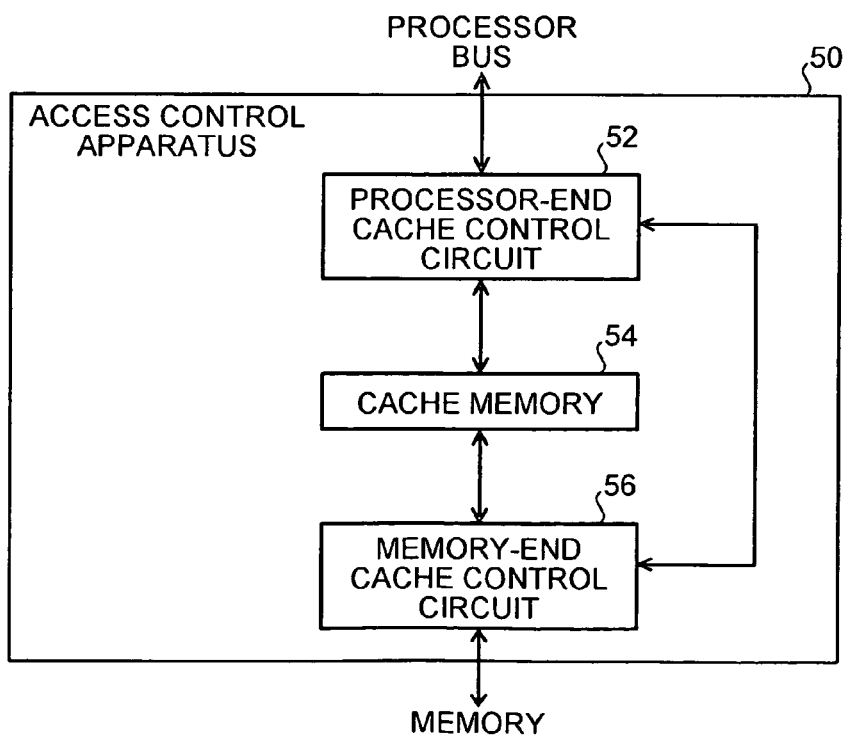
FIG. 56 is a block diagram showing the functional structure of the access control apparatus.

FIG. 56 is a block diagram showing the functional structure of the access control apparatus 50. The access control apparatus 50 includes a processor-end cache control circuit 52, a cache memory 54, and a memory-end cache control circuit 56. In accordance with an instruction from a processor, the processor-end cache control circuit 52 writes data into the cache memory 54 or reads data from the cache memory 54. The cache memory 54 temporarily stores the data in association with a memory address or the like.

In accordance with an instruction from the processor-end cache control circuit 52, the memory-end cache control circuit 56 writes data into the memory 40 or reads data from the memory 40.

Figure 57:
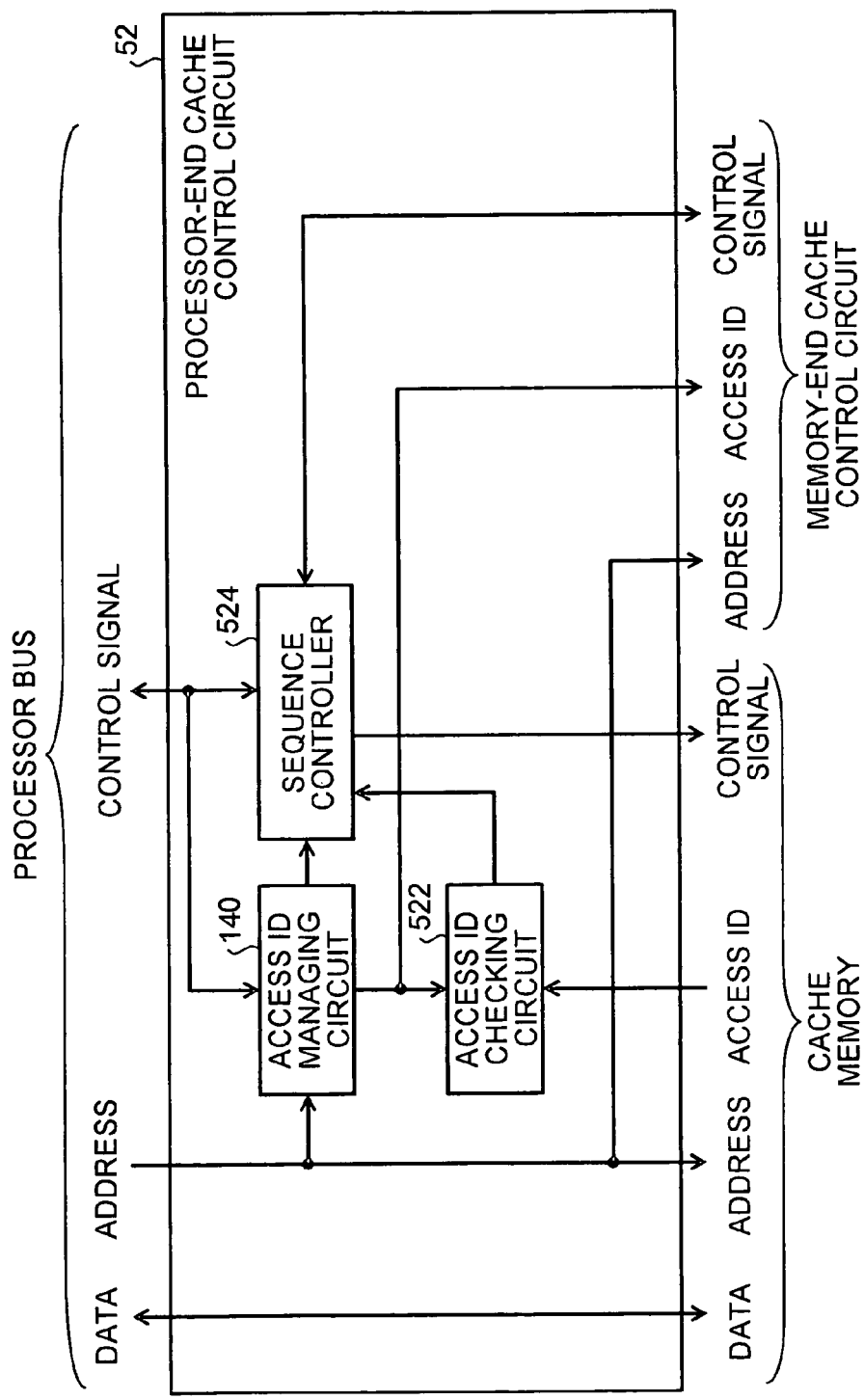
FIG. 57 is a block diagram showing the functional structure of the processor-end cache control circuit.

FIG. 57 is a block diagram showing the functional structure of the processor-end cache control circuit 52. The processor-end cache control circuit 52 includes an access ID managing circuit 140, an access ID checking circuit 522, and a sequence controller 524.

The functional structure of the access ID managing circuit 140 is the same as the functional structure of the access ID managing circuit 140 of the second embodiment shown in FIG. 19, and determines an access ID based on an address. The access ID checking circuit 522 compares the access ID determined by the access ID managing circuit 140 with the access ID stored in the cache memory 54 to determine if they match. The sequence controller 524 controls the entire operation of the processor-end cache control circuit 52.

Figure 58:
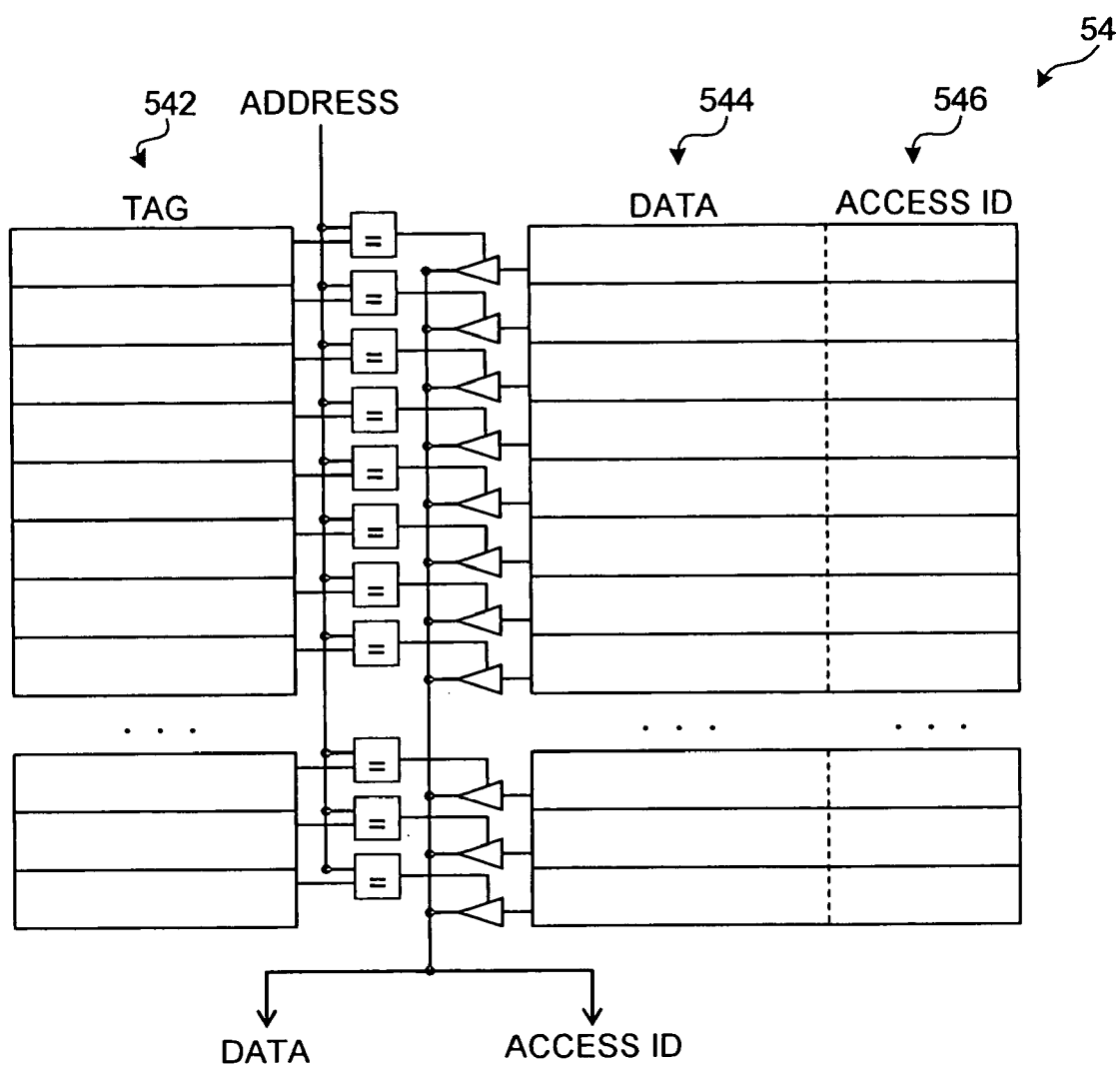
FIG. 58 is a block diagram showing the functional structure of the cache memory.

FIG. 58 is a block diagram showing the functional structure of the cache memory 54. The cache memory 54 includes a data region 544 for storing the data that have been accessed in the past, a tag storing region 542 for storing the addresses of data in the memory 40, and an access ID storing region 546 for storing access IDs that are allowed to access the data. In those regions, the addresses, the data, and the access IDs are associated with one another.

When data is stored in the cache memory 54 and there is a request for an access to the address of the data, the data stored in association with the address in the data region 544 is returned, so that the delay due to the access to the memory 40 can be reduced. The cache memory 54 may be of a direct mapping type or a set associative type. However, the type of the cache memory 54 of this embodiment is not limited those types, and may be of any other type.

Figure 59:
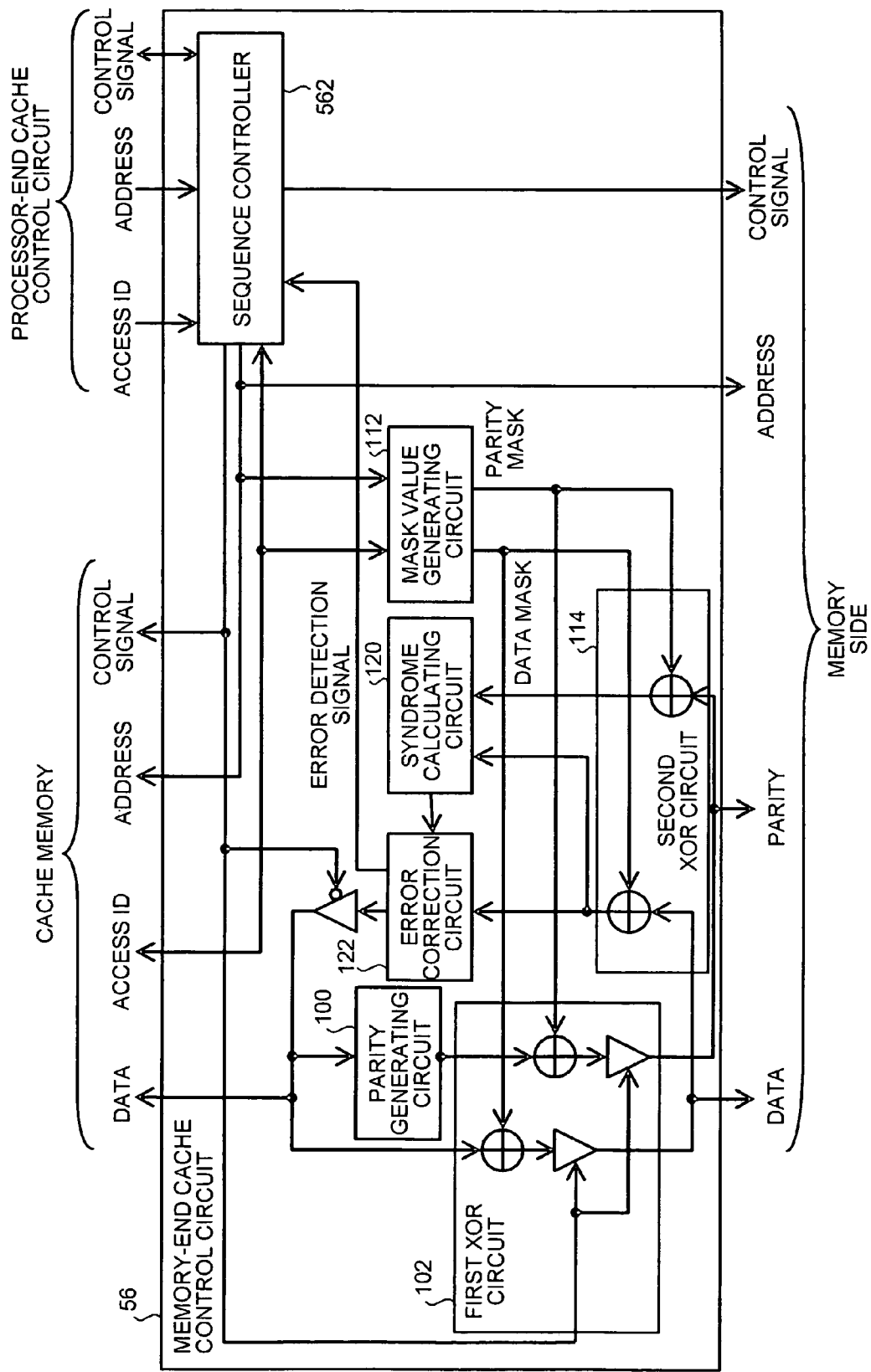
FIG. 59 is a block diagram showing the functional structure of the memory-end cache control circuit.

FIG. 59 is a block diagram showing the functional structure of the memory-end cache control circuit 56. The memory-end cache control circuit 56 includes a parity generating circuit 100, a first XOR circuit 102, a mask value generating circuit 112, a second XOR circuit 114, a syndrome calculating circuit 120, an error correction circuit 122, and a sequence controller 562.

The sequence controller 562 controls the entire operation of the memory-end cache control circuit 56. The functional structures of the parity generating circuit 100, the first XOR circuit 102, the mask value generating circuit 112, the second XOR circuit 114, the syndrome calculating circuit 120, and the error correction circuit 112 are the same as the functional structures of the parity generating circuit 100, the first XOR circuit 102, the mask value generating circuit 112, the second XOR circuit 114, the syndrome calculating circuit 120, and the error correction circuit 112 of the first embodiment, respectively.

In the memory-end cache control circuit 56 of the ninth embodiment, however, data read from the memory 40 is stored in association with the corresponding access ID in the cache memory 54. When data is written into the memory 40, the data is acquired from the cache memory 54.

Figure 60:
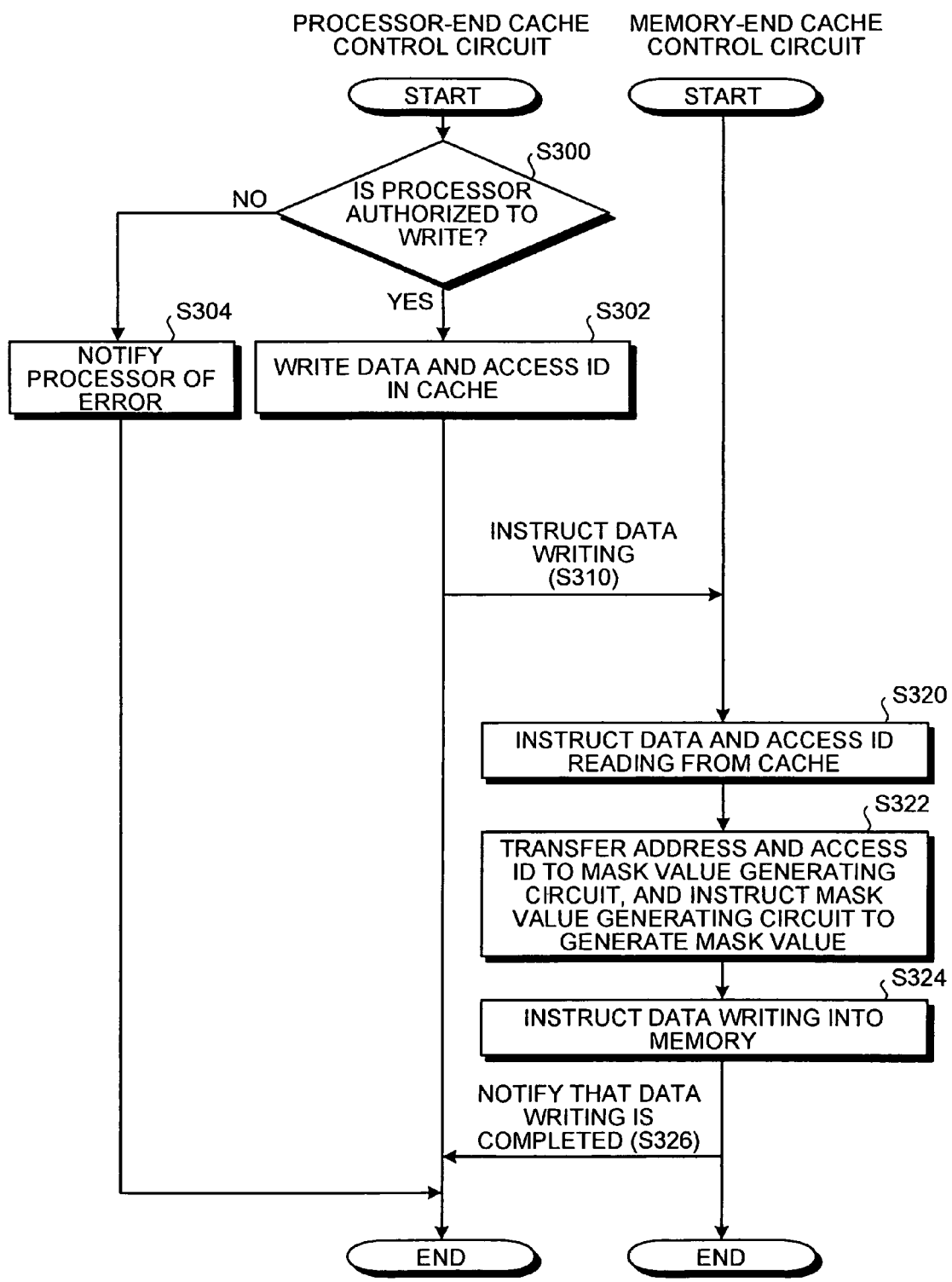
FIG. 60 is flowchart of a writing operation that is a part of the access control operation in the access control system in accordance with the ninth embodiment.

FIG. 60 is a flowchart of a writing operation that is a part of the access control operation of the access control system 1 in accordance with the ninth embodiment. First, the access ID managing circuit 140 of the processor-end cache control circuit 52 determines whether the processor 20 is authorized to perform writing (step S300). More specifically, an access ID and the address of the destination of writing are acquired from the processor 20. The access ID managing circuit 140 determines whether the acquired access ID and the acquired address are linked to each other in the access ID table 142.

If the access ID and the address are linked to each other, the processor 20 is determined to have the authorization to perform writing. If the processor 20 is not authorized to perform writing ("NO" in step S300), an error is reported to the processor 20 (step S304), and the operation comes to an end.

On the other hand, if the processor 20 is authorized to perform writing ("YES" in step S300), the data and the access ID acquired from the processor 20 are written in association with each other into the cache memory 54 (step S302).

The sequence controller 524 then instructs the memory-end cache control circuit 56 to write data (step S310). More specifically, the sequence controller 524 issues an instruction in the form of a control signal. Upon receipt of the write instruction, the sequence controller 562 of the memory-end cache control circuit 56 instructs the cache memory 54 to read the data and the access ID, and acquires the data and the access ID from the cache memory 54 (step S320).

The mask value generating circuit 112 then receives an instruction to send the address and the access ID of the storing destination, and to generate a mask value (step S322). In accordance with the instruction, the mask value generating circuit 112 generates a mask value based on the address and the access ID. The sequence controller 562 then issues an instruction to write data into the memory 40 (step S324). In accordance with this instruction, first post-operation data that is obtained by adding a parity and calculating an XOR between the data and a mask value through the operations performed by the first XOR circuit 102 and the second XOR circuit 114 is written at the address designated by the processor 20.

After the data writing into the memory 40 is completed, the sequence controller 562 notifies the processor-end cache control circuit 52 of the completion of the data writing (step S326). Here, the writing operation comes to an end.

In a case of employing a write through system, the processor 20 should preferably take over the control after the writing from the cache memory 54 into the memory 40 is completed. In a case of employing a write back system, the processor 20 should preferably take over the control before the writing from the cache memory 54 into the memory 40 is completed.

In a modification, the access IDs with which writing is allowed and the access IDs with which reading is allowed may be associated with addresses in the access ID table 142. In this manner, a proper operation can be performed even if different restrictions are set between reading and writing.

Figure 61:
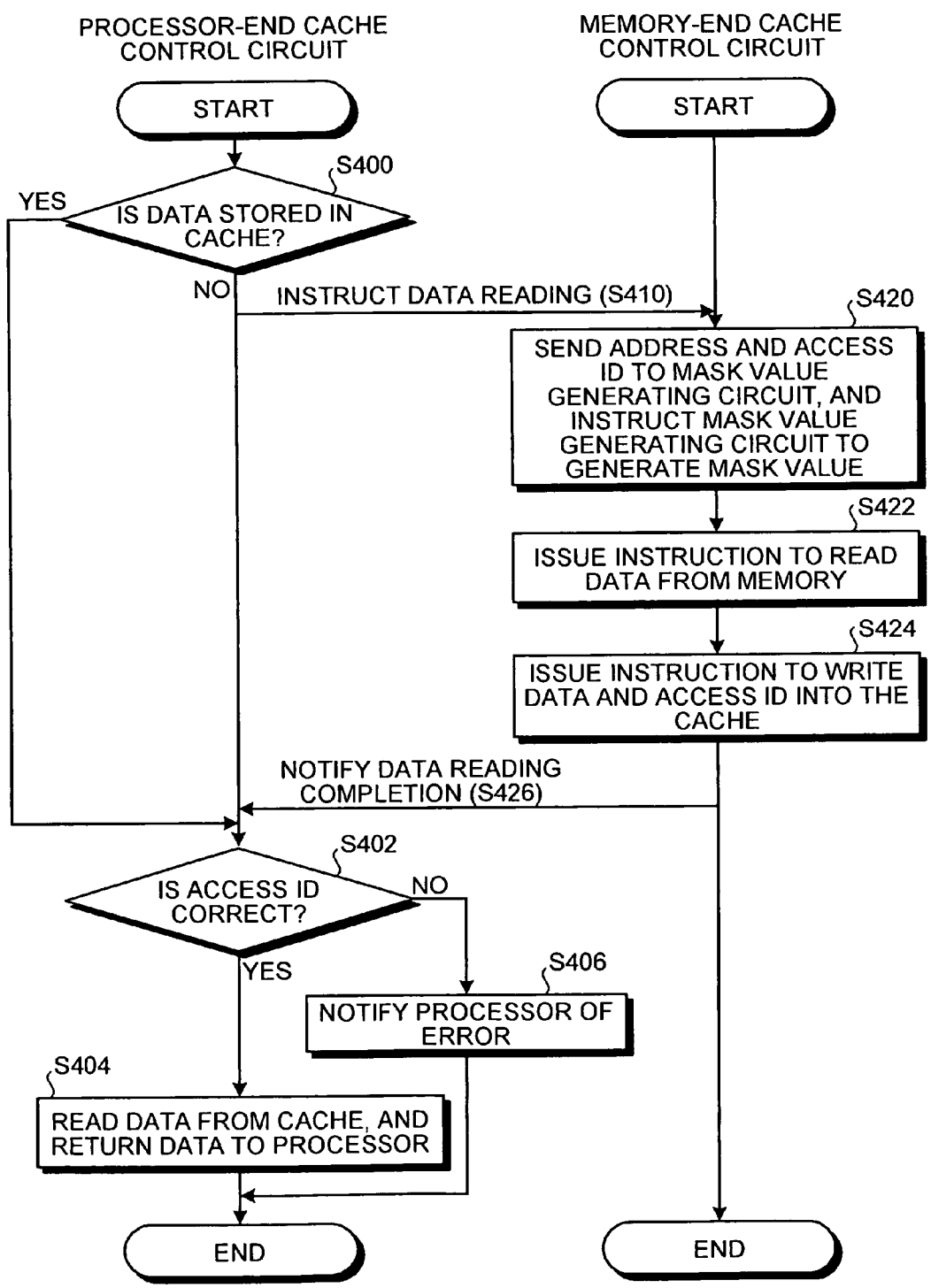
FIG. 61 is flowchart of a reading operation that is a part of the access control operation in the access control system in accordance with the ninth embodiment.

FIG. 61 is a flowchart of a reading operation that is a part of the access control operation of the access control system 1 in accordance with the ninth embodiment. Upon receipt of a data read request from the processor 20, the sequence controller 524 of the processor-end cache control circuit 52 determines whether the subject data is stored in the cache memory 54 (step S400). If the data is stored in the cache memory 54 ("YES" in step S400), the access ID checking circuit 522 determines whether the access ID acquired from the processor 20 is correct, or whether the processor 20 has a right of access (step S402).

If the access ID is correct ("YES" in step S402), the subject data is read from the cache memory 54, and sent to the processor 20 (step S404). If the access ID is not correct ("NO" in step S402), an error is reported to the processor 20 (step S406).

The correctness of the access ID is determined by comparing the access ID associated with the subject data with the access ID acquired from the processor 20. If the access IDs are the same, the access ID acquired from the processor 20 is determined to be correct.

On the other hand, if the subject data is not stored in the cache memory 54 ("NO" in step S400), an instruction to read data is issued to the memory-end cache control circuit 56 (step S410). Upon receipt of the data read instruction, the sequence controller 562 of the memory-end cache control circuit 56 sends the address and the access ID to the mask value generating circuit 112, and instructs the mask value generating circuit 112 to generate a mask value (S420). In accordance with this instruction, the mask value generating circuit 112 generates a mask value.

An instruction to read data from the memory 40 is then issued (step S422). In accordance with this instruction, the data is read from the memory 40. The first post-operation data that is read here is converted into the original data through the operations by the first XOR circuit 102 and the second XOR circuit 114.

An instruction to write the obtained data, the access ID, and the address into the cache memory 54 is then issued, and the data, the access ID, and the address are stored in the cache memory 54 (step S424). Thus, the original data is stored in the cache memory 54. After the data storing into the cache memory 54 is completed, the sequence controller 562 notifies the processor-end cache control circuit 52 of the completion of the data reading (step S426). Upon receipt of the notification of the completion of the data reading, the processor-end cache control circuit 52 moves on to step S402.

As described above, in the access control system 1 of the ninth embodiment, all the data that has been accessed once is stored in the cache memory 54. Accordingly, when the data is accessed again later, the data can be read directly from the cache memory 54, and the processing speed can be increased accordingly. Before data is read from the cache memory 54, only whether the access IDs are the same is checked. Thus, the processing speed can be made higher than in the case where data is read from the memory 40.

The other aspects of the structure and the operation of the access control system 1 in accordance with the ninth embodiment are the same as the structure and the operation of the access control system 1 in accordance with the first embodiment. Also, the cache memory that is characteristic of the access control system 1 of the ninth embodiment may be employed in any of the foregoing embodiments.

Figure 62:
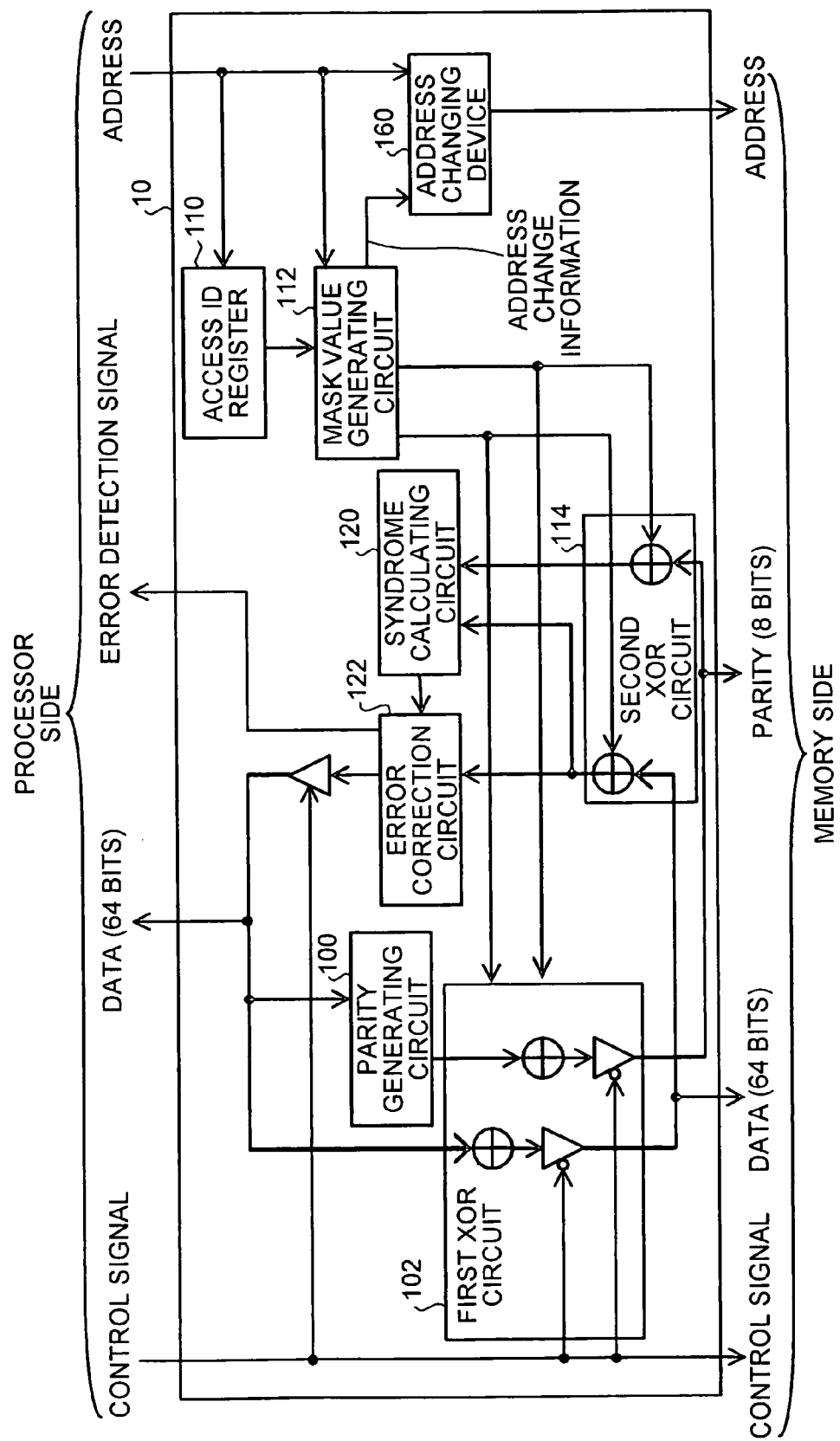
FIG. 62 is a block diagram showing the functional structure of an access control apparatus in accordance with a tenth embodiment of the present invention.

FIG. 62 is a block diagram showing the functional structure of an access control apparatus 10 in accordance with a tenth embodiment. The memory access control apparatus 10 in accordance with the tenth embodiment includes an address changing device 160 in addition to the functional structure of the memory access control apparatus 10 of the second embodiment. The access control apparatus 10 of this embodiment changes each address acquired from the processor 20 to another address, and performs data access with respect to the address after the change. Based on the address change information stored in the mask value generating circuit 112, the address changing device 160 performs an address change.

Figure 63:
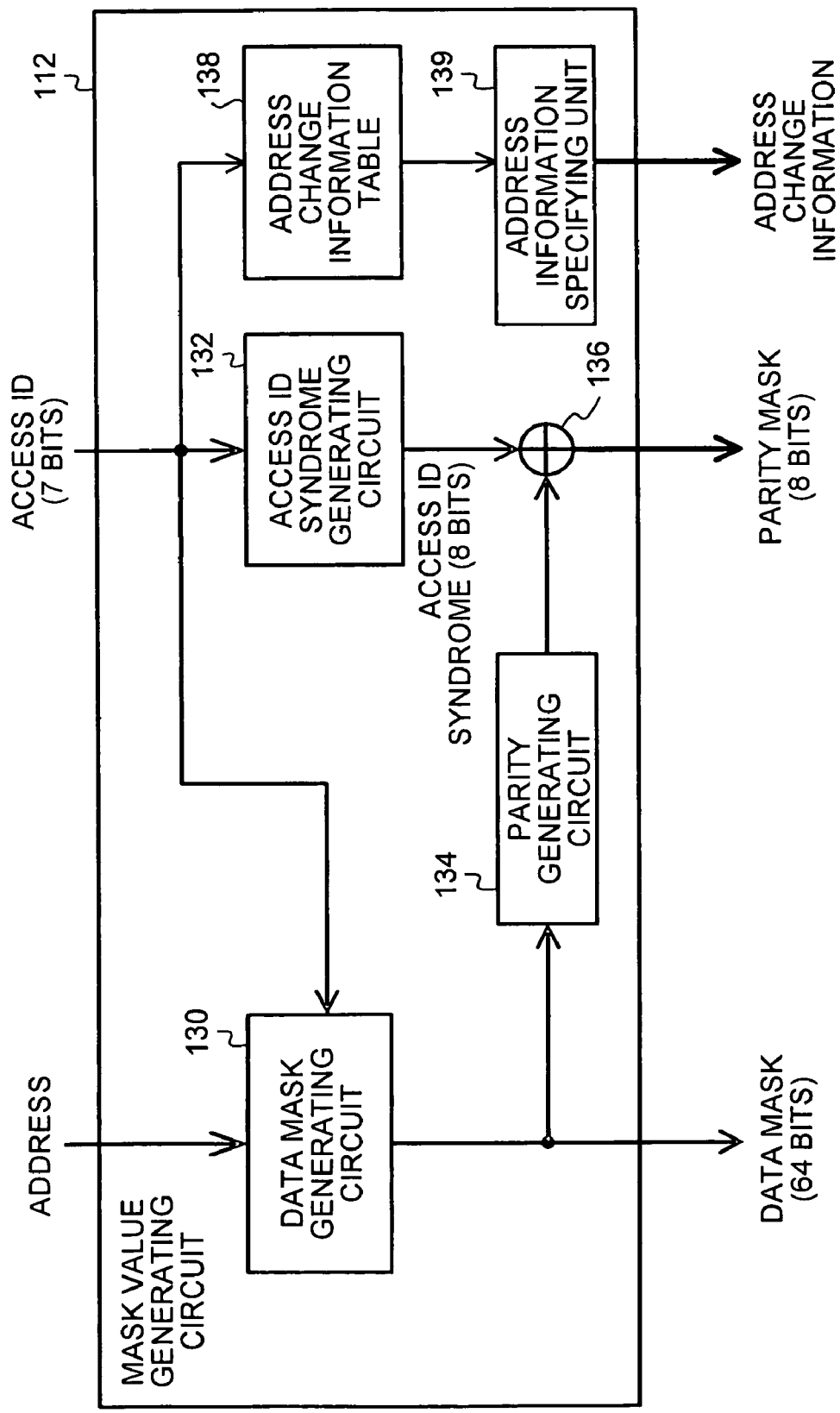
FIG. 63 is a block diagram showing the functional structure of the mask value generating circuit in accordance with the tenth embodiment.

FIG. 63 is a block diagram showing the functional structure of the mask value generating circuit 112 of the tenth embodiment in detail. The mask value generating circuit 112 includes an address change information table 138 and an address information specifying unit 139, as well as a data mask generating circuit 130, a syndrome generating circuit 132, and a parity generating circuit 134. The address information specifying unit 139 refers to the address change information table 138, and determines the address change information based on the access ID.

Figures 64, 65:
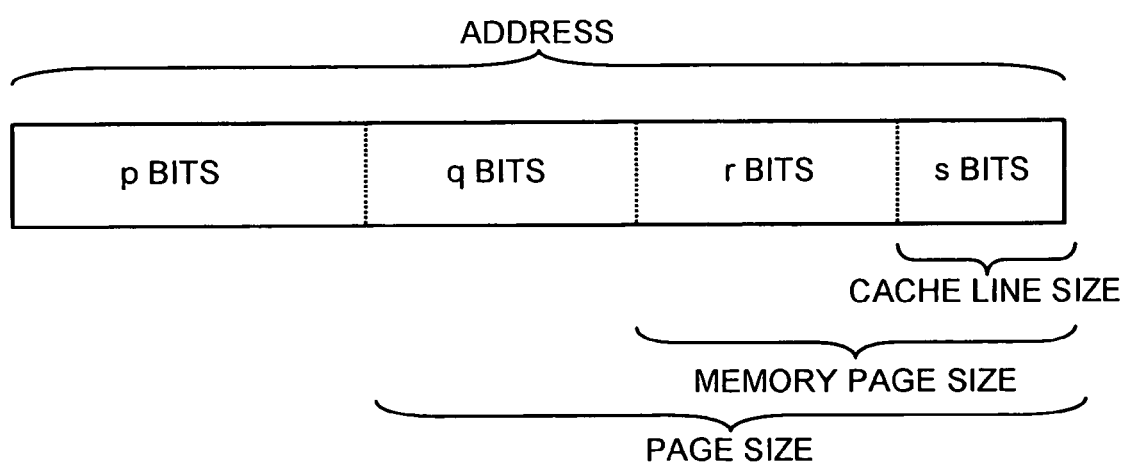
FIG. 64 schematically shows the data structure of the address change information table.
FIG. 65 shows a memory address.

FIG. 64 schematically shows the data structure of the address change information table 138. The address change information table 138 associates access IDs with address change information. In this manner, it is desirable to allocate different address change information to each access ID.

The address change information specifying unit 139 sends the address change information associated with the access ID after access IDs are switched in the address change information table 138.

In the address changing operation to be performed by the address changing device 160, it is essential that a certain address is not changed to the same address, and two or more addresses are not changed to the same addresses. As long as these conditions are satisfied, the method of changing addresses is not limited to the method employed in this embodiment.

FIG. 65 shows a memory address. In general, a memory address has a fixed number of bits required for accessing the range (s) corresponding to the cache line size, the range (r+s) corresponding to the page size of the memory device, and the range (q+r+s) corresponding to the page size managed by a page table.

For example, the range (s) corresponding to the cache line size is 2 bits in a case where the memory uses 64 bits for 1 word and each cache line consists of 256 bits. The range (r+s) corresponding to the page size of the memory device, which is the range in which a burst transfer can be performed for 128 words of seven bits, for example. An address changing operation is performed based on this relationship, so as to prevent a decrease in memory access speed.

For example, the words in the memories belonging to the same cache line should preferably be changed to successive addresses, so that the words can be read or written at a high speed by burst transfer. The successive addresses may be shuffled among them.

The words in a page of a memory device should preferably be converted into successive addresses within the page, so that the words can be read or written at a high speed by burst transfer. The successive addresses may be shuffled among them.

Figure 66A:
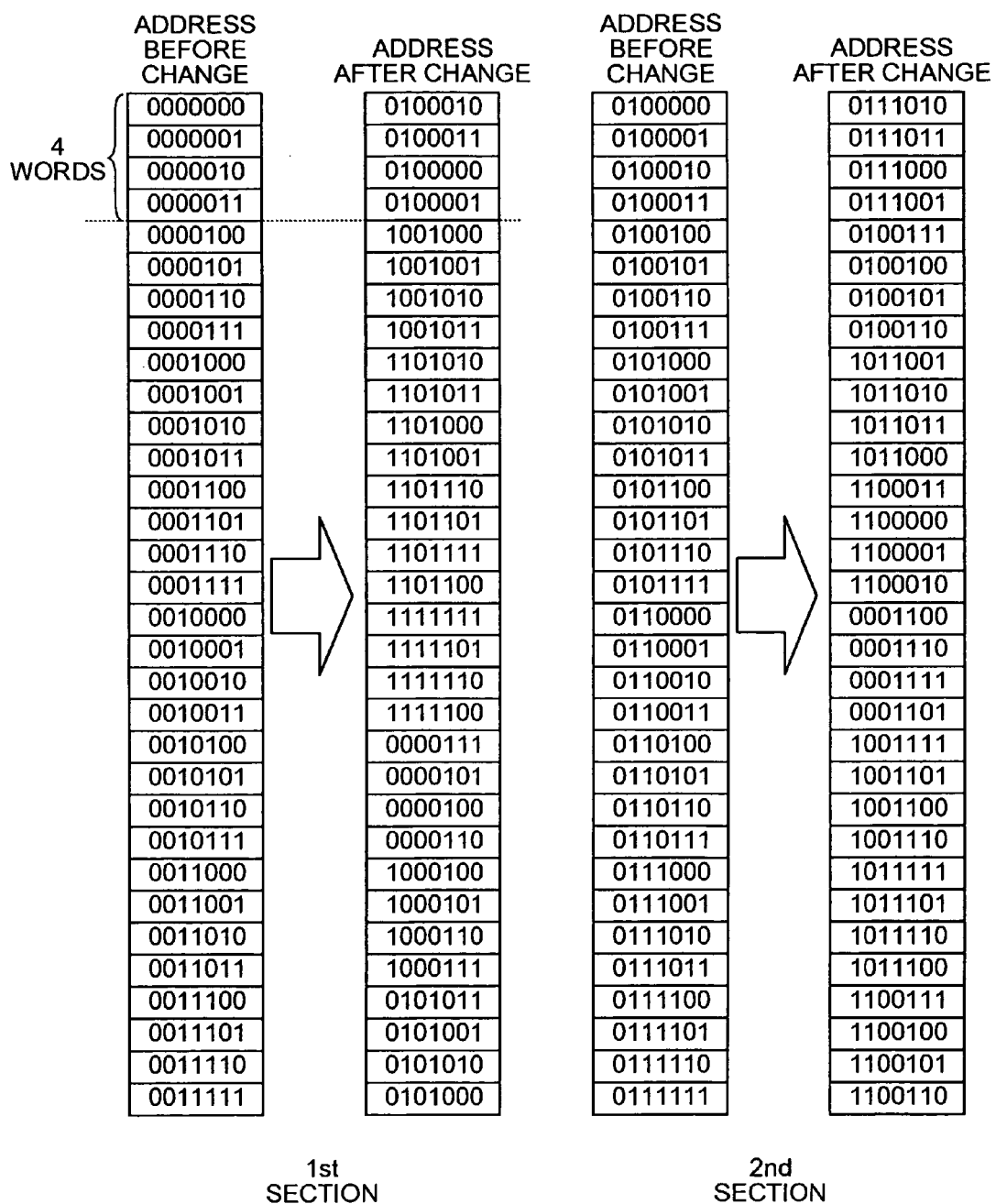
FIG. 66A shows an address changing operation to be performed by the address changing device.

The address changing device 160 performs such an address changing operation that satisfies the following conditions. FIGS. 66A and 66B show the address changing operation to be performed by the address changing device 160. In FIGS. 66A and 66B, only the lower seven bits in each of the memory addresses. The address changing device 160 changes only the lower seven bits. In this example, four words form one cache line.

As shown in the drawings, the bits in each set of four words are changed at random, but the addresses after a change are still successive addresses shuffled within each set. However, the addresses after a changing operation are not successive over two or more cache lines. Thus, a decrease in transfer efficiency can be prevented.

FIG. 67 shows the structure of the address changing device 160 in detail. Te address change information is stored in an address change table 162 that is formed with memories. FIG. 68 shows the address change table that realizes the address changes shown in FIGS. 66A and 66B.

The upper 5 bits of the lower 7 bits of each address are used when the address change table 162 is referred to. The upper 5 bits of the obtained 13-bit information replace the upper 5 bits of the lower 7 bits of each corresponding address. Further, 2 bits are selected from the remaining 8 bits in accordance with the lower 2 bits of each corresponding address. The selected 2 bits replace the lower 2 bits of each corresponding address.

Figure 69:
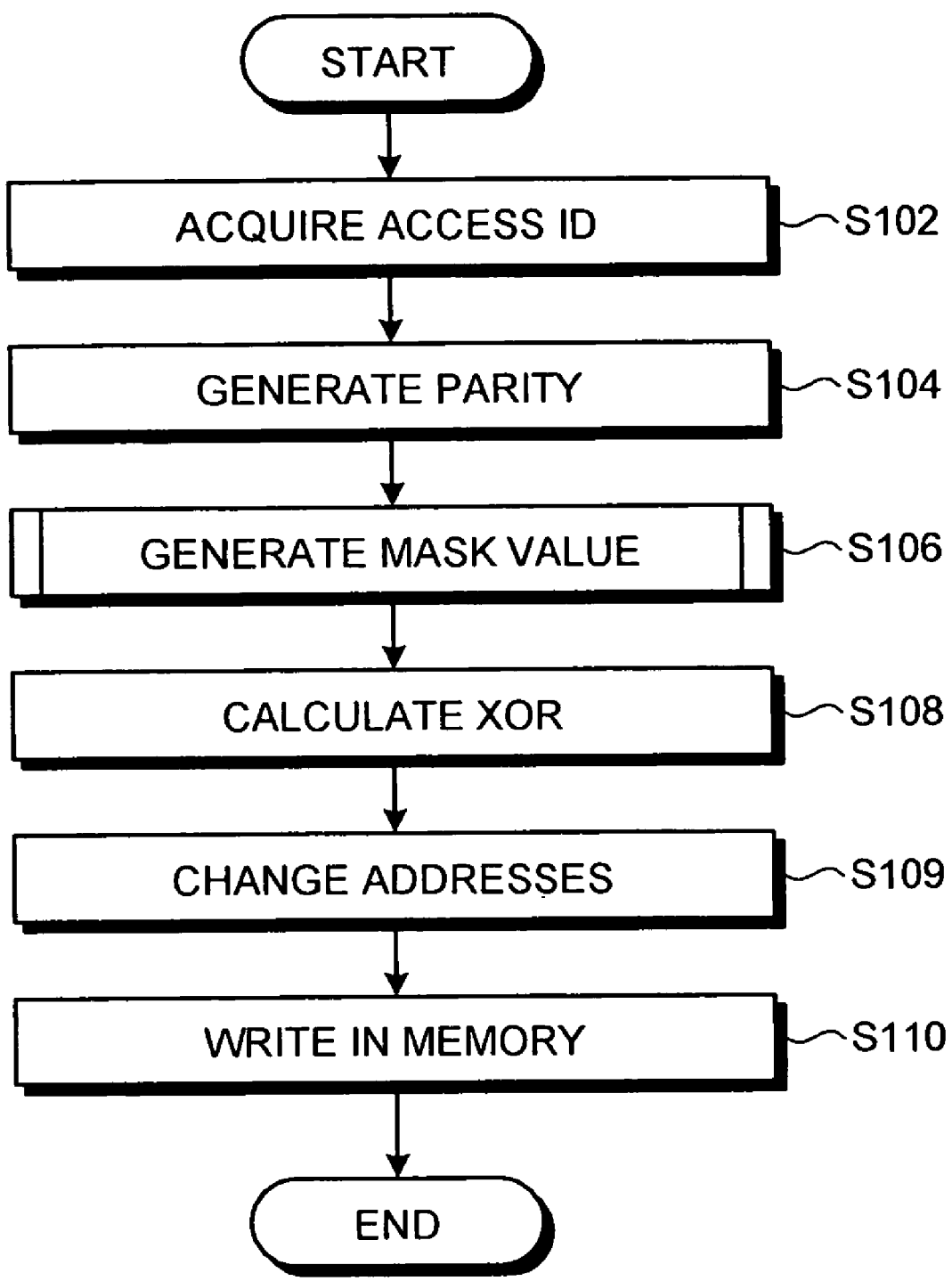
FIG. 69 is a flowchart of a writing operation in the access control system in accordance with the tenth embodiment.

FIG. 69 is a flowchart of a writing operation to be performed by the access control system 1 in accordance with the tenth embodiment. After an XOR is calculated (step S108), the above described address changing operation is performed (S109). Data is then written at the memory address after the change (step S110).

Figure 70:
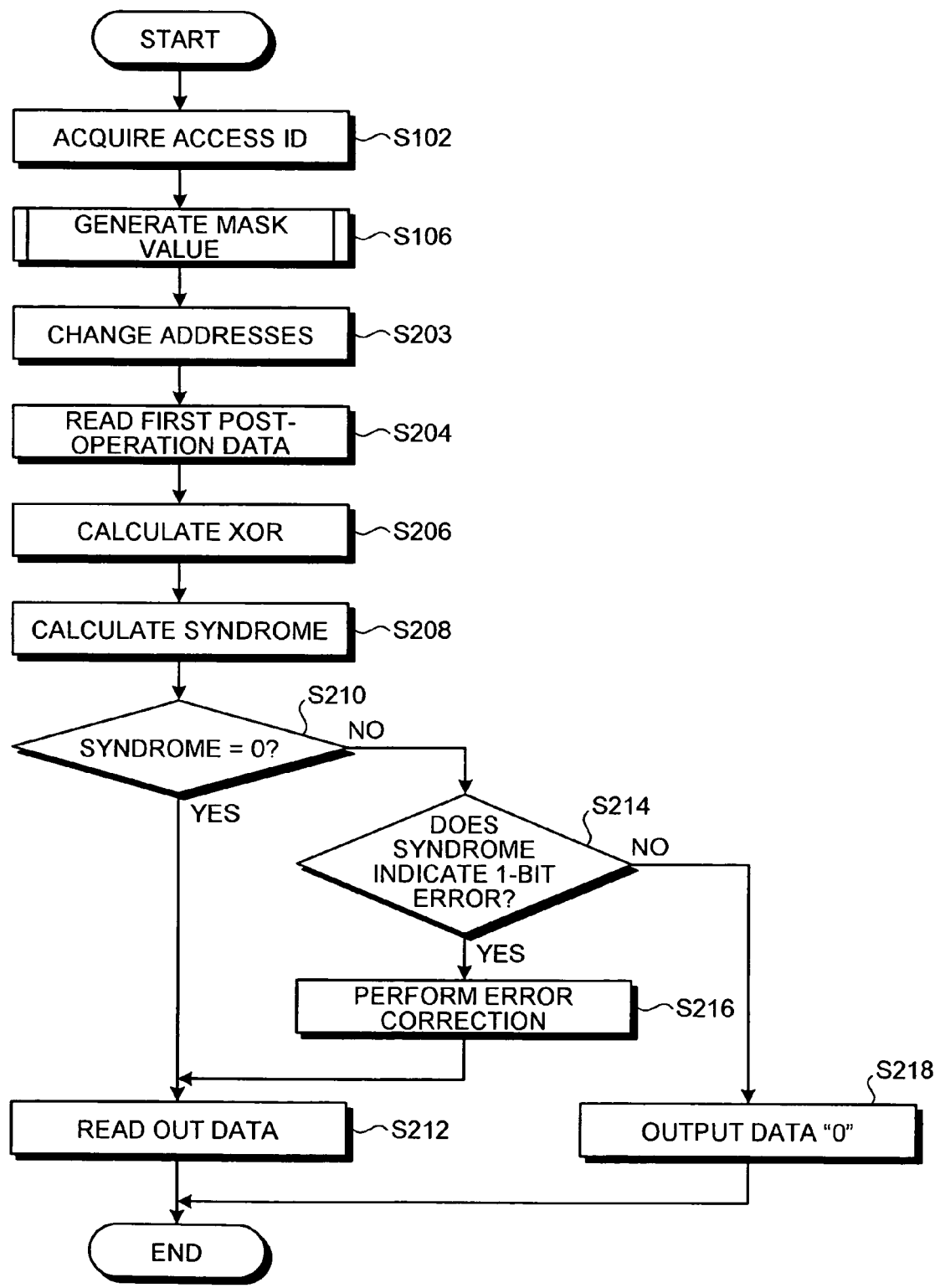
FIG. 70 is a flowchart of a reading operation in the access control system in accordance with the tenth embodiment.

FIG. 70 is a flowchart of a reading operation to be performed by the access control system 1 in accordance with the tenth embodiment. After mask values are generated (step S106), the address changing operation is performed (S203). The first post-operation data is then read from the memory address after the address change (step S204).

The other aspects of the structure and the operation of the access control system 1 in accordance with the tenth embodiment are the same as the structure and the operation of the access control system 1 in accordance with the first embodiment.

Figure 71:
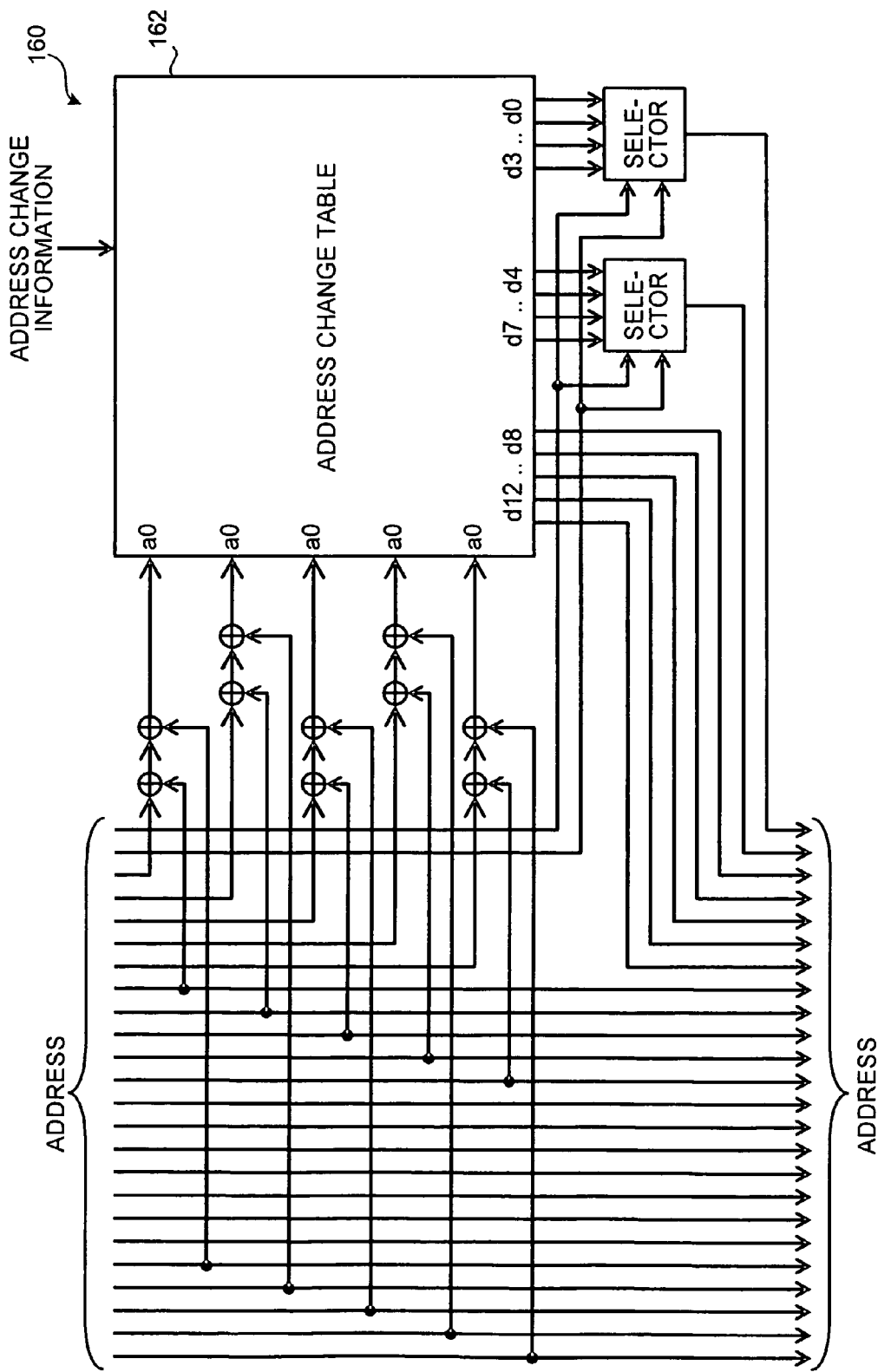
FIG. 71 shows the address changing device in accordance with a first modification of the tenth embodiment.

FIG. 71 shows the structure of an address changing device 160 in accordance with a first modification of the tenth embodiment. In this modification, a wider variety of changes can be achieved by using an XOR between the upper bits and the lower bits in each address when the address change table 162 is referred to. By doing so, it becomes more difficult to estimate the address change patterns.

Although the address change information is stored in the data mask generating circuit 130 in the tenth embodiment, it may be stored in some other component. In a second modification of the tenth embodiment, the address changing operation in accordance with the tenth embodiment is applied to the access control system 1 in accordance with the fifth embodiment, and the address change information is recorded in the data mask generation information table 1302.

FIG. 72 schematically shows the data structure of the data mask generation information table 1302 in accordance with the second modification. In the data mask generation information table 1302, the address change information is associated with access IDs. The address change information can be determined by each access ID by referring to the data mask generation information table 1302.

Eleventh Embodiment

Figure 73:
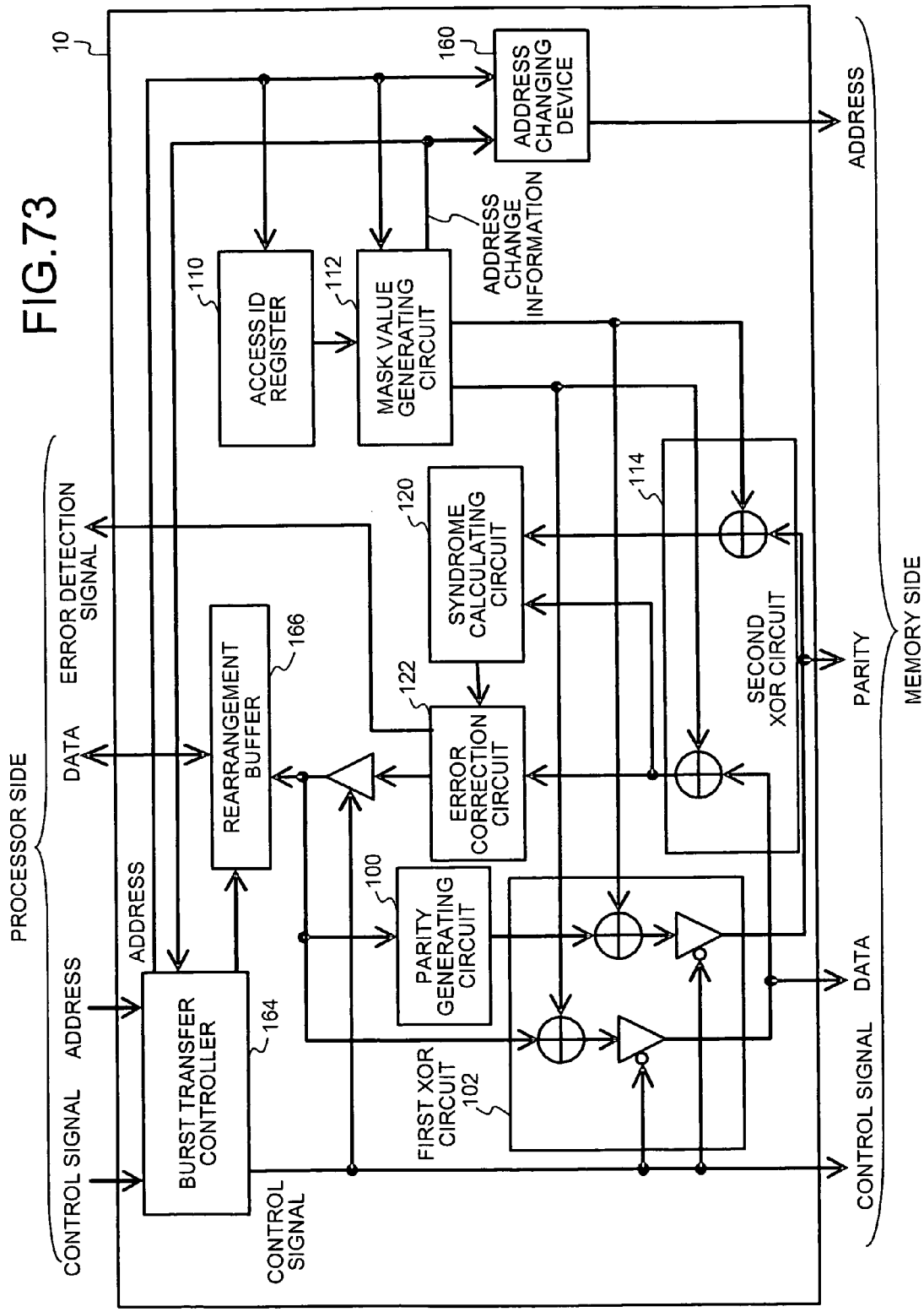
FIG. 73 is a block diagram showing the functional structure of a memory access control apparatus in accordance with an eleventh embodiment of the present invention.

FIG. 73 is a block diagram showing the functional structure of a memory access control apparatus 10 in accordance with an eleventh embodiment. The memory access control apparatus 10 in accordance with the eleventh embodiment includes a burst transfer controller 164 and a rearrangement buffer 166 in addition to the functional structure of the memory access control apparatus 10 in accordance with the tenth embodiment.

When a burst transfer in accordance with the sequence of the addresses in the memory 40 is performed, the burst transfer controller 164 controls the burst transfer. The rearrangement buffer 166 is used in the burst transfer. When the words in each cache line are shuffled by the address changing device 160, the burst transfer function of each memory device cannot be utilized if accesses are made in accordance with the shuffled sequence. As a result, a higher transfer efficiency cannot be achieved. To counter this problem, the burst transfer controller 164 makes accesses through a burst transfer in accordance with the sequence of the addresses in the memory 40, and the rearrangement buffer 166 rearranges the sequence of the addresses in the memory 40 and the sequence of the addresses after a change made by the address changing device 160.

Figure 74:
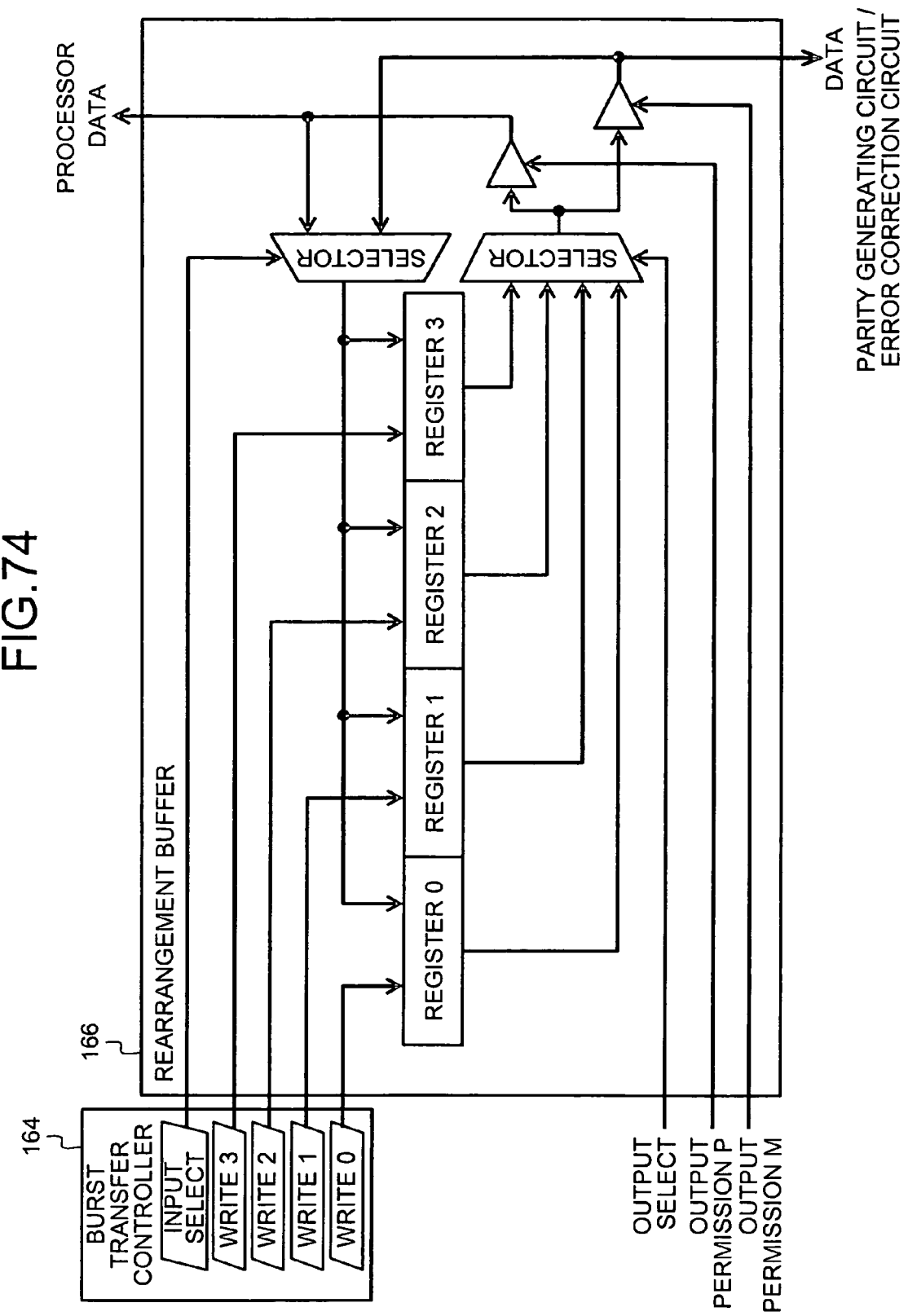
FIG. 74 shows the rearrangement buffer.

FIG. 74 shows the structure of the rearrangement buffer 166. In this structure, each one cache line consists of 256 bits, each one word in the memory consists of 64 bits, and each four words constitute one cache line.

As shown in FIG. 74, the rearrangement buffer 166 includes register 0 to register 3 for the four words of one cache line. In accordance with an instruction from the burst transfer controller 164, data read from the processor 20 or the memory 40 is written into a designated register among the four registers. Further, the data stored in the designated register of the four registers is read out, and is sent to the processor 20 or the memory 40.

Figure 75:
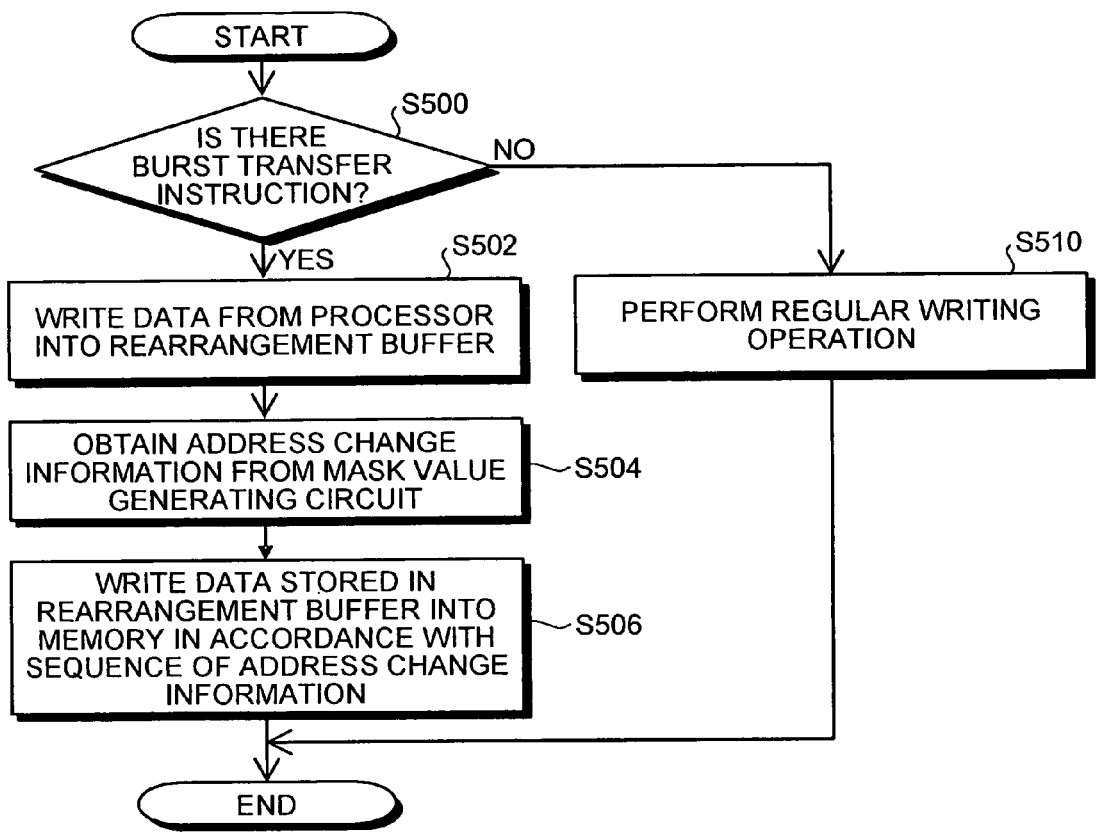
FIG. 75 is a flowchart of an operation to be performed by the burst transfer controller to write data into the memory.

FIG. 75 is a flowchart of an operation to be performed by the burst transfer controller 164 to write data into the memory 40. If there is not a burst transfer instruction ("NO" in step S500), a regular writing operation is performed (step S510). Here, a "regular writing operation" is the same as the writing operation of the tenth embodiment, and data is written at a memory address obtained by the address changing device 160.

If there is a burst transfer instruction ("YES" in step S500), data that is sent from the processor 20, which is the data to be written into the memory 40, is temporarily written into the rearrangement buffer 166 (step S502). The address change information is then obtained from the address change information table 138 in the mask value generating circuit 112 (step S504). The data is then written into the memory 40 through a burst transfer in accordance with the sequence of the memory addresses changed based on the address change information (step S506). The operation then comes to an end.

Figure 76:
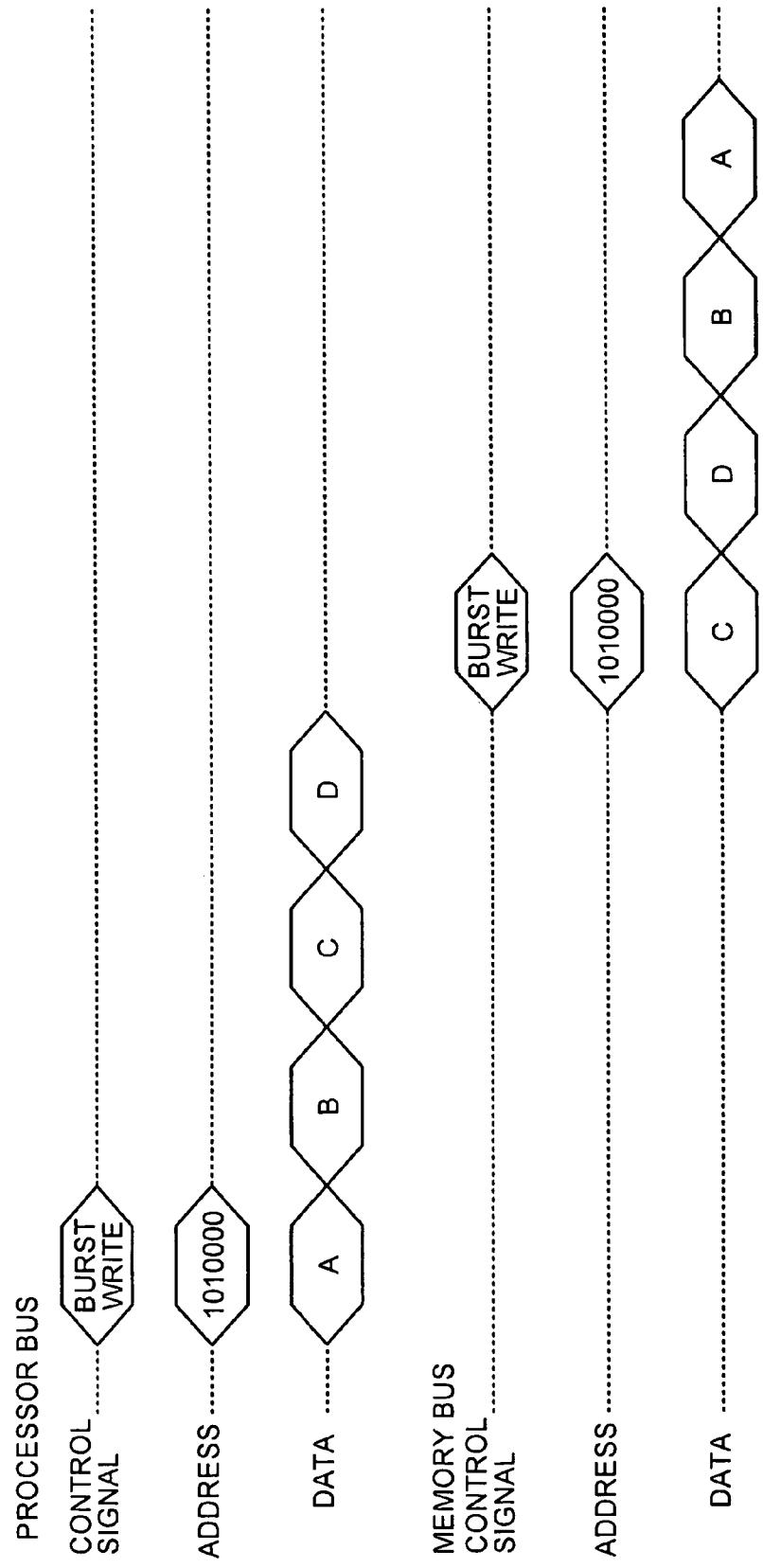
FIG. 76 shows in greater detail the writing operation shown in FIG. 75.

FIG. 76 shows the writing operation described with reference to FIG. 75. In the example shown in FIG. 76, the processor 20 writes data A, B, C, and D from the word having the lower seven bits "1010000" in its address to four words.

Here, the address "1010000" is changed to an address "0110011" by the address changing device 160 shown in FIG. 67. Likewise, an address "1010001" is changed to "0110010", an address "1010010" is changed to "0110000", and an address "1010011" is changed to "0110001".

When data is to be written in accordance with the sequence of the memory addresses after the changes, a burst transfer cannot be performed. Therefore, the burst transfer controller 164 temporarily stores the data into the rearrangement buffer 166. Based on the address change information, the data are rearranged so as to reproduce successive addresses. In the example shown in FIG. 76, the data C is written at the address "0110000", the data D is written at the address "0110001", the data B is written at the address "0110010", and the data A is written at the address "0110011". Writing is then performed through a burst transfer from the address "0110000" in the order of C, D, B, and A.

Figure 77:
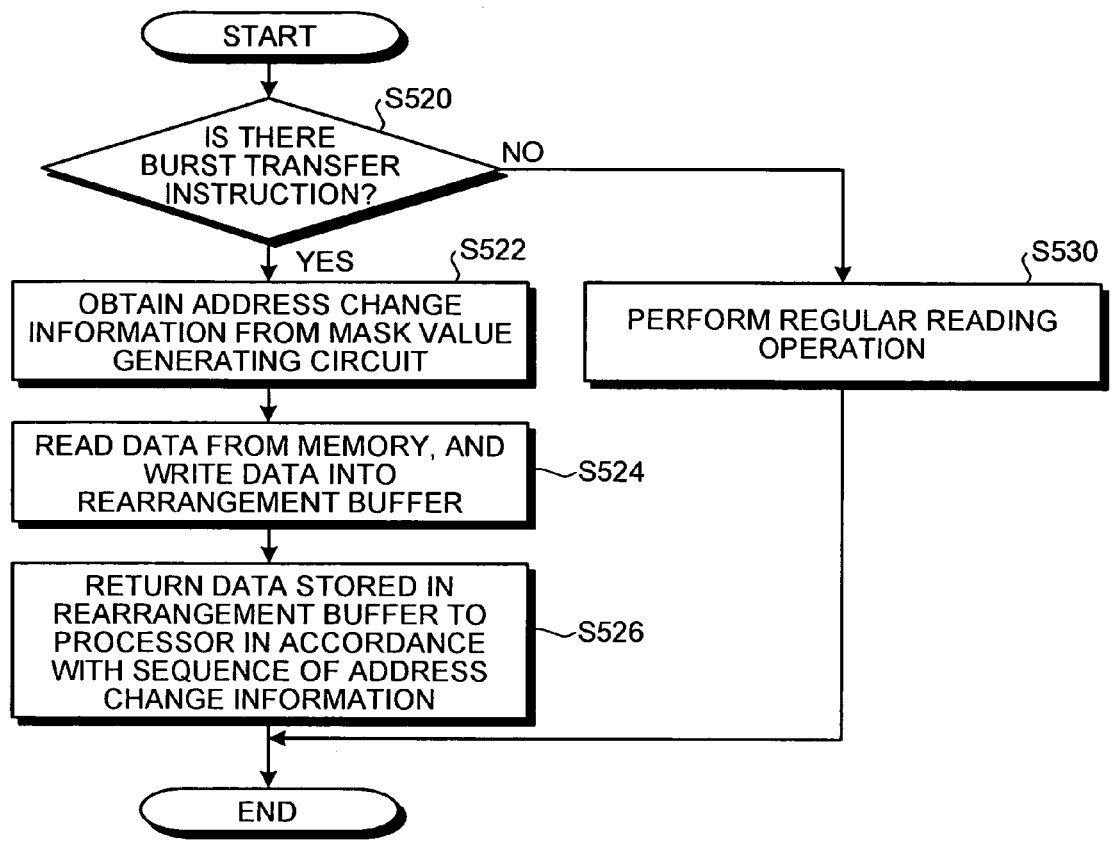
FIG. 77 is a flowchart of an operation to be performed by the burst transfer controller to read data from the memory.

FIG. 77 is a flowchart of an operation to be performed by the burst transfer controller 164 to read data from the memory 40. If there is not a burst transfer instruction ("NO" in step S520), a regular reading operation is performed (step S530). Here, a "regular reading operation" is the same as the reading operation of the tenth embodiment to sequentially read the data from the memory addresses obtained by the address changing device 160.

If there is a burst transfer instruction ("YES" in step S520), the address change information is obtained from the address change information table 138 in the mask value generating circuit 112 (step S522). In accordance with the sequence of the memory addresses changed based on the address change information, the four words from the top address are read from the memory 40, and are temporarily written into the rearrangement buffer 166 (step S524). Te data stored in the rearrangement buffer 166 is then returned to the processor 20 through a burst transfer in accordance with the sequence of the memory addresses changed based on the address change information (step S526). Here, the operation comes to an end.

Figure 78:
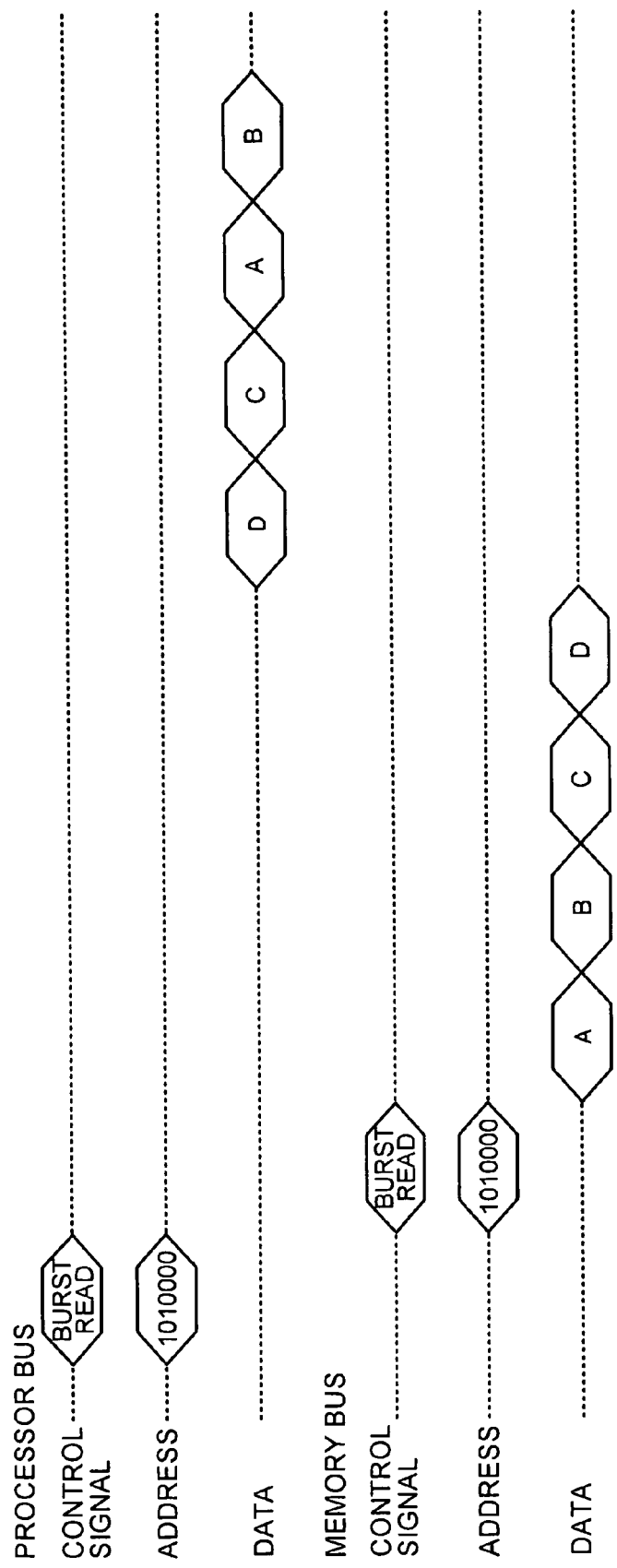
FIG. 78 shows in greater detail the reading operation shown in FIG. 77.

FIG. 78 shows the above reading operation in greater detail. In the example shown in FIG. 78, the processor 20 reads four words from the word having "1010000" as the lower seven bits in its address.

Here, the address "1010000" is changed to an address "0110011" by the address changing device 160 shown in FIG. 67. Likewise, an address "1010001" is changed to "0110010", an address "1010010" is changed to "0110000", and an address "1010011" is changed to "0110001".

The burst transfer controller 164 first reads four words through a burst transfer from "0110000" representing the top address of the addresses after address changes. The four words are temporarily stored in the rearrangement buffer 166. The data that are read at this point are data A, B, C, and D.

Based on the address change information, the burst transfer controller 164 rearranges the data in accordance with the sequence of the original addresses. In the example shown in FIG. 78, the data D is read out at the address "0110000", the data C is read out at the address "0110001", the data A is read out at the address "0110010", and the data B is read out at the address "0110011". The data are then returned to the processor 20 through a burst transfer from the address "0110000" in the order of D, C, A, and B.

As described above, with the access control system 1 in accordance with the eleventh embodiment, the real addresses in the memory are modified, so as to eliminate the correlations between the real addresses and the mask values. By doing so, the probability of the mask values being correctly estimated can be lowered. Thus, higher security can be achieved.

The other aspects of the structure and the operation of the access control system 1 in accordance with the eleventh embodiment are the same as the structure and the operation of the access control system 1 in accordance with the tenth embodiment.

Figure 79:
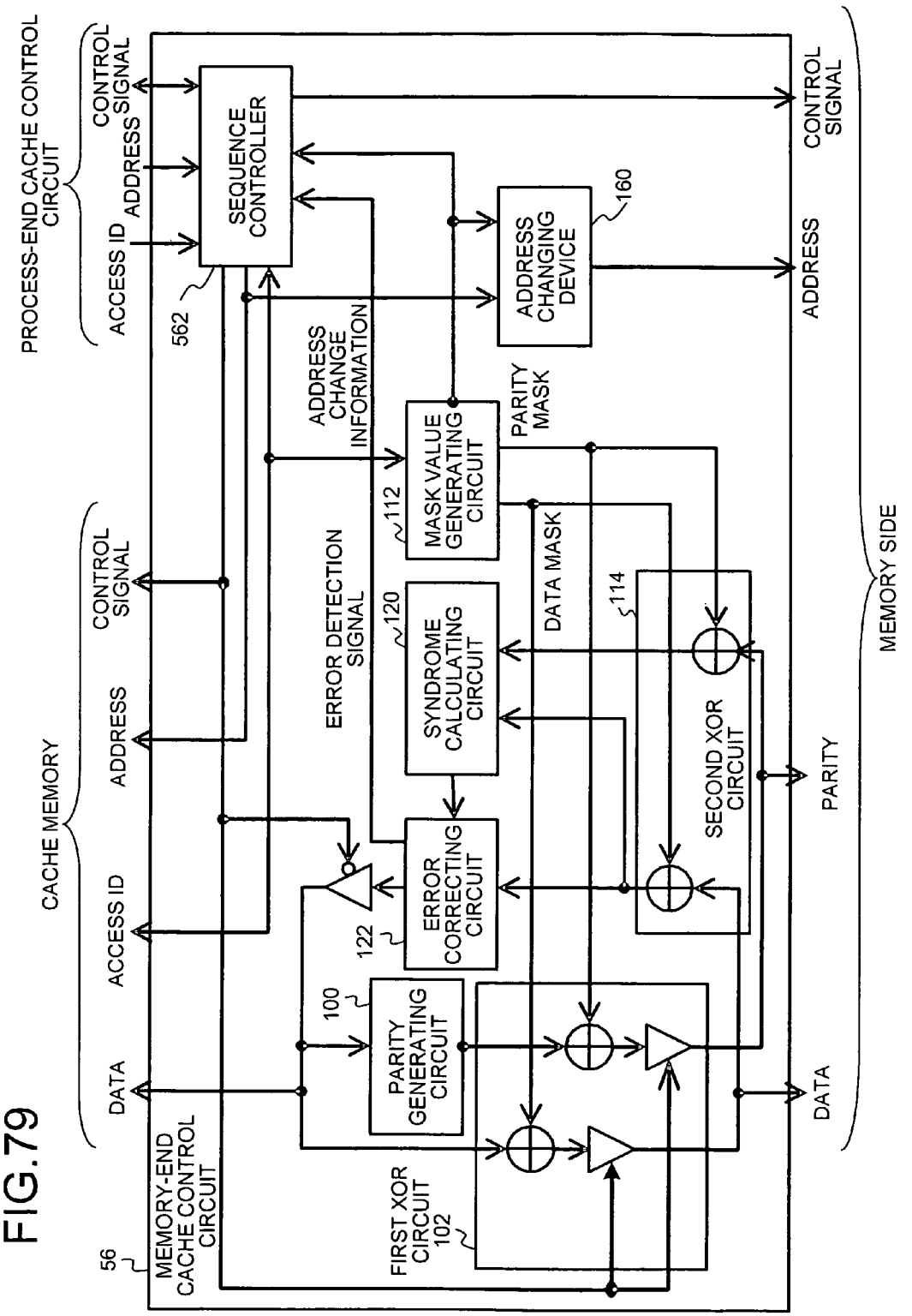
FIG. 79 is a block diagram showing the functional structure of the memory-end cache control circuit in accordance with a modification of the eleventh embodiment.

Next, a modification of the address changing operation in accordance with the eleventh embodiment is described. In this modification, the address changing operation of the eleventh embodiment is applied to the access control system 1 of the ninth embodiment. FIG. 79 is a block diagram showing the functional structure of the memory-end cache control circuit 56 in accordance with this modification. The memory-end cache control circuit 56 in accordance with this modification includes an address changing device 160 in addition of the functional structure of the memory access control apparatus 10 in accordance with the eleventh embodiment.

The sequence controller 562 performs the same operation as the operation to be performed by the burst transfer controller 164. Accordingly, the same operation as that in the eleventh embodiment can be performed in the access control system 1 of the ninth embodiment, and the same effects can also be achieved.

The memory-end cache control circuit 56 in this modification does not have a rearrangement buffer. In this structure, the data at the time of a burst transfer are not rearranged in a rearrangement buffer, but the cache memory 54 is designed to be accessed by the word. In this manner, the cache memory 54 can be used as a rearrangement buffer.

Figure 80:
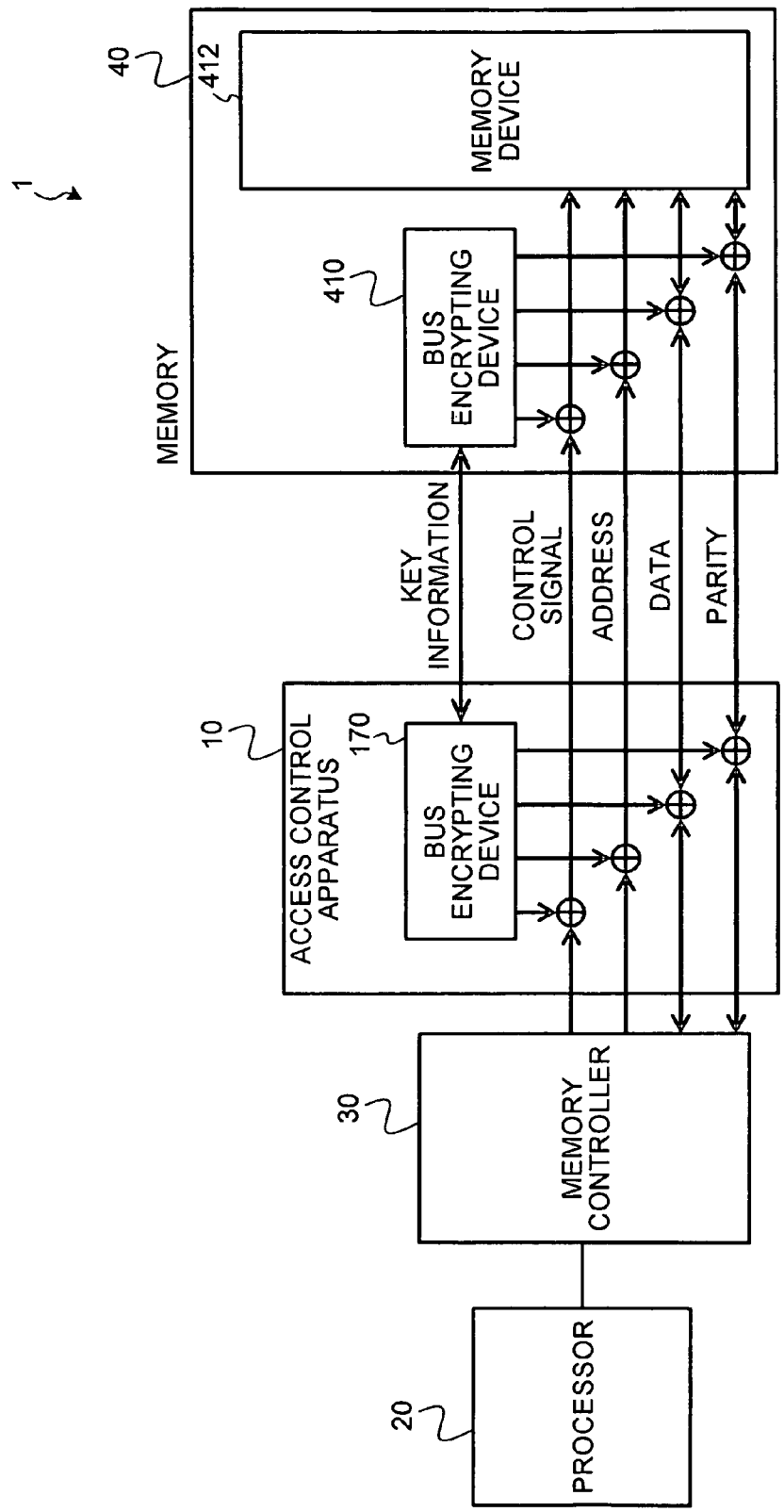
FIG. 80 shows an access control system in accordance with a twelfth embodiment of the present invention.

FIG. 80 shows the entire structure of an access control system 1 in accordance with a twelfth embodiment. In the access control system 1 in accordance with the twelfth embodiment, the memory access control apparatus 10 and the memory 40 have the same bus encrypting devices 170 and 410. The bus encrypting devices 170 and 410 share a cryptic key. Using random numbers generated based on the cryptic key, the bus encrypting devices 170 and 410 encrypt signals that are being transmitted through the memory bus 42.

Figure 81:
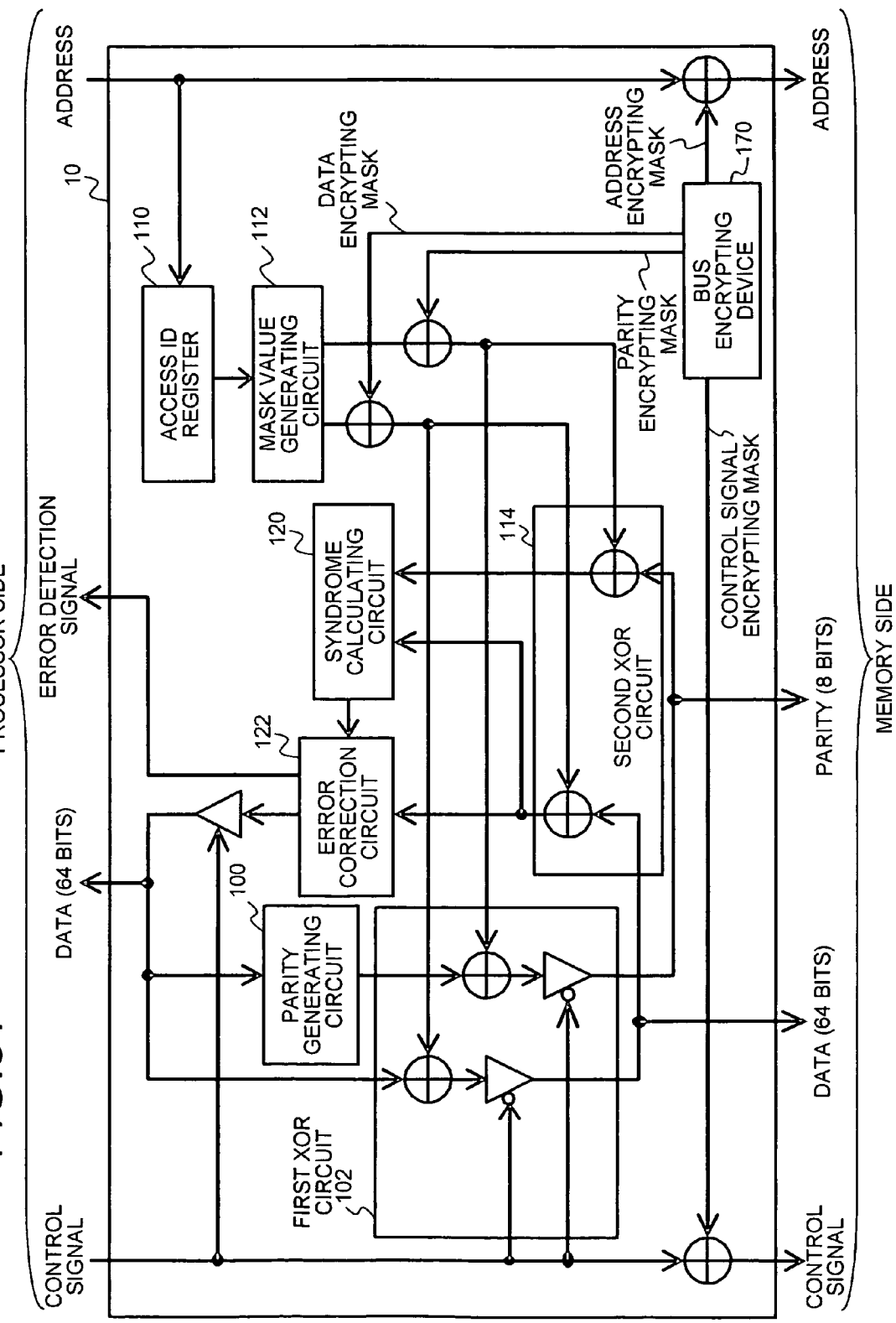
FIG. 81 shows the functional structure of the memory access control apparatus.

FIG. 81 shows the functional structure of the memory access control apparatus 10. The memory access control apparatus 10 in accordance with the twelfth embodiment includes the bus encrypting device 170 in addition to the functional structure of the memory access control apparatus 10 of the first embodiment. The bus encrypting device 170 generates control signal masks for encrypting control signals, address masks for encrypting memory addresses, data masks for encrypting data, and parity masks for encrypting parities. Each of those signals is masked and output through the memory bus 42.

Figure 82:
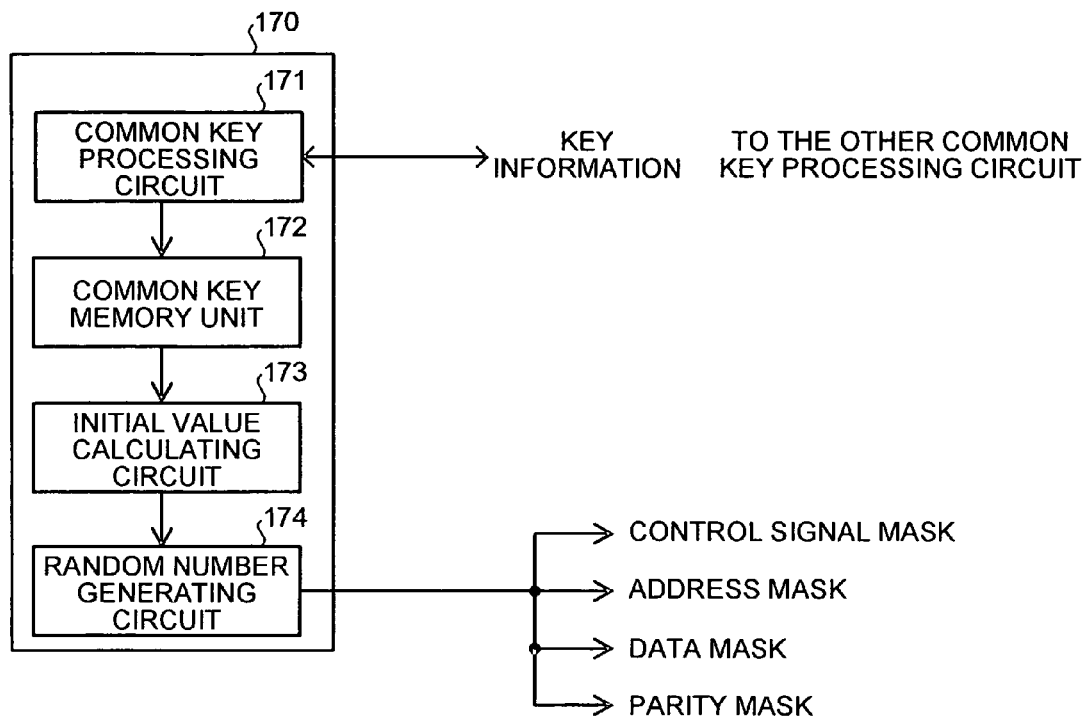
FIG. 82 is a block diagram showing the functional structure of the bus encrypting device.

FIG. 82 is a block diagram showing the functional structure of the bus encrypting device 170 in detail. The bus encrypting device 170 includes a common key processing circuit 171, a common key memory unit 172, an initial value calculating circuit 173, and a random number generating circuit 174.

The common key processing circuit 171 performs an operation to have a cryptic key shared between the bus encrypting devices 170 and 410. The common key sharing can be realized in various manners. For example, an initial key is written into each of the bus encrypting devices 170 and 410 at the time of initialization of the access control system 1. Later on, a new key is generated at regular intervals, and the new key replaces the common key between the bus encrypting devices 170 and 410.

The common key memory unit 172 stores a cryptic key. Based on the cryptic key, the initial value calculating circuit 173 generates an initial value of the random generating circuit 174. It is desirable that a one-way function or the like is used so as to prevent a correct estimate of the cryptic key. For example, a value that is generated by a hash function based on the cryptic key can be used as the initial value. The random number generating circuit 174 generates a random number sequence, with the value calculated by the initial value calculating circuit 173 serving as the initial value.

The functional structure of the bus encrypting device 410 of the memory 40 is the same as the functional structure of the bus encrypting device 170. The common key processing circuits of the two encrypting devices share a cryptic key. The random number generating circuits of the two encrypting devices generate random numbers in the same timing, based on the cryptic key. With the generated random number being encrypting masks, XORs between the signals being transmitted through the memory bus 42 are calculated on the transmission side and the reception side. Accordingly, the signals being transmitted through the memory bus 42 can be scattered.

In this manner, the original data are masked by the mask values generated with respect to addresses by the access control apparatus to check the rights of access and the mask values generated by the bus encrypting devices without regard to the addresses through XOR operations. Accordingly, it becomes even more difficult to estimate the data and the mask values of the two types. Thus, higher security can be achieved.

Figure 83:
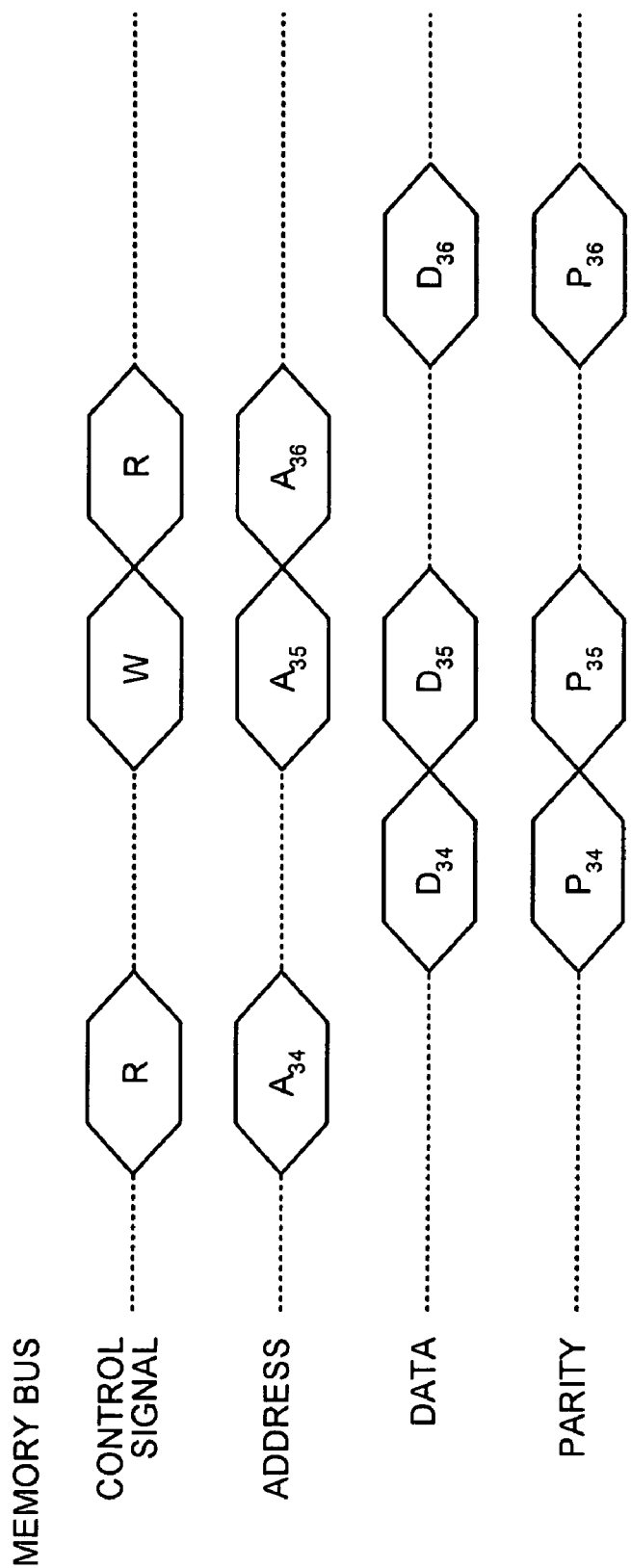
FIG. 83 shows examples of signals that are not subjected to masking performed by the bus encrypting devices.
Figure 84:
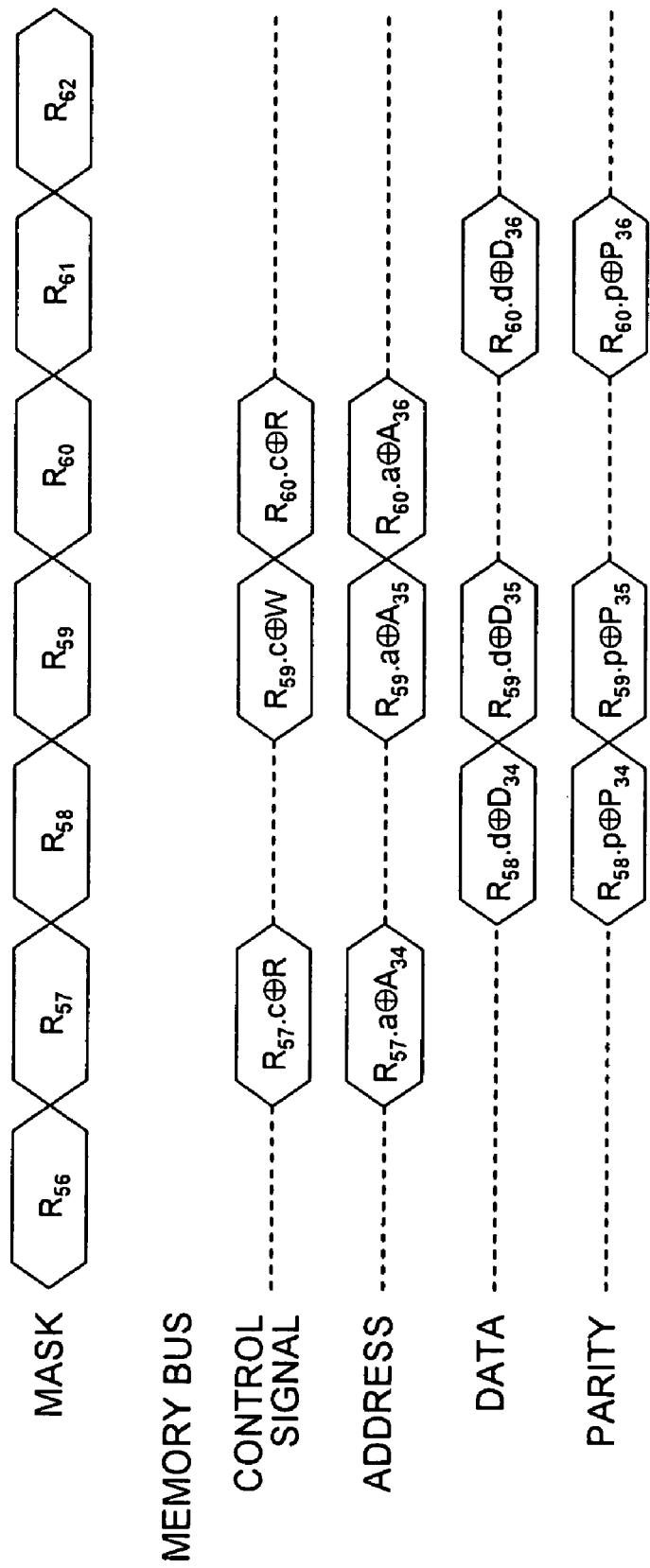
FIG. 84 shows examples of signals that are subjected to masking performed by the bus encrypting devices.

FIGS. 83 and 84 show the flow of signals transmitted through the memory bus 42 in accordance with the twelfth embodiment. FIG. 83 shows examples of signals that are not subjected to masking by the bus encrypting devices 170 and 410. Reading from address A34, writing at address A35, and reading from address A36 are performed sequentially. In this case, the corresponding memory addresses, the corresponding data, and the corresponding parities are transmitted through the memory bus 42.

FIG. 84 shows examples of signals that are subjected to masking by the bus encrypting devices 170 and 410. In FIG. 84, Ri.c, Ri.a, Ri.d, and Ri.p represent a control signal encrypting mask, an address encrypting mask, a data encrypting mask, and a parity encrypting mask, respectively, for Ri. As shown in FIG. 84, the bus encrypting devices 170 and 410 generate random numbers for masking by the clock. The signals transmitted through the memory 42 are combined with the random values for masking through XOR operations.

In a first modification of the twelfth embodiment, the bus encrypting device 170 does not have the initial value calculating circuit 173, and the cryptic key is supplied as the initial value of the random number generating circuit 174. However, in view of security, it is more preferable to use an initial value calculated by the initial value calculating circuit 173, so as not to allow a correct estimate of the cryptic key.

Figure 85:
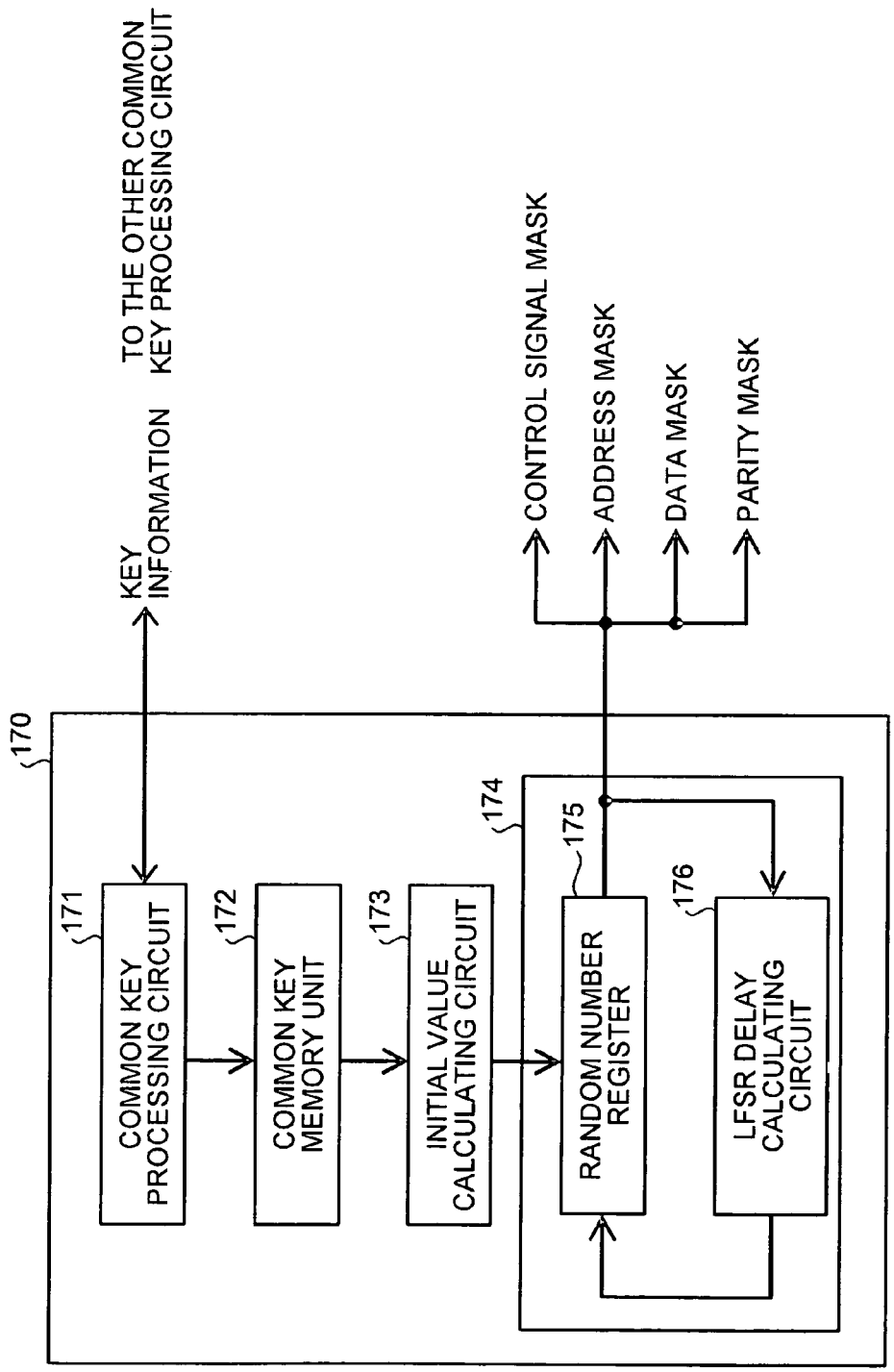
FIG. 85 is a block diagram showing the functional structure of the bus encrypting device in accordance with a second modification of the twelfth embodiment.

In a second modification, a LFSR is employed for the random number generating circuit 174. FIG. 85 is a block diagram showing the functional structure of the bus encrypting device 170 in accordance with the second modification. The random number generating circuit 174 includes a random number register 175 and a LFSR delay calculating circuit 176.

The current status is recorded in the random number register 175, and the status delayed by the number of steps according to the current status is calculated by the LFSR delay calculating circuit 176. The delayed status is set as the next status, and its value is output as an encrypting mask.

Figure 86:
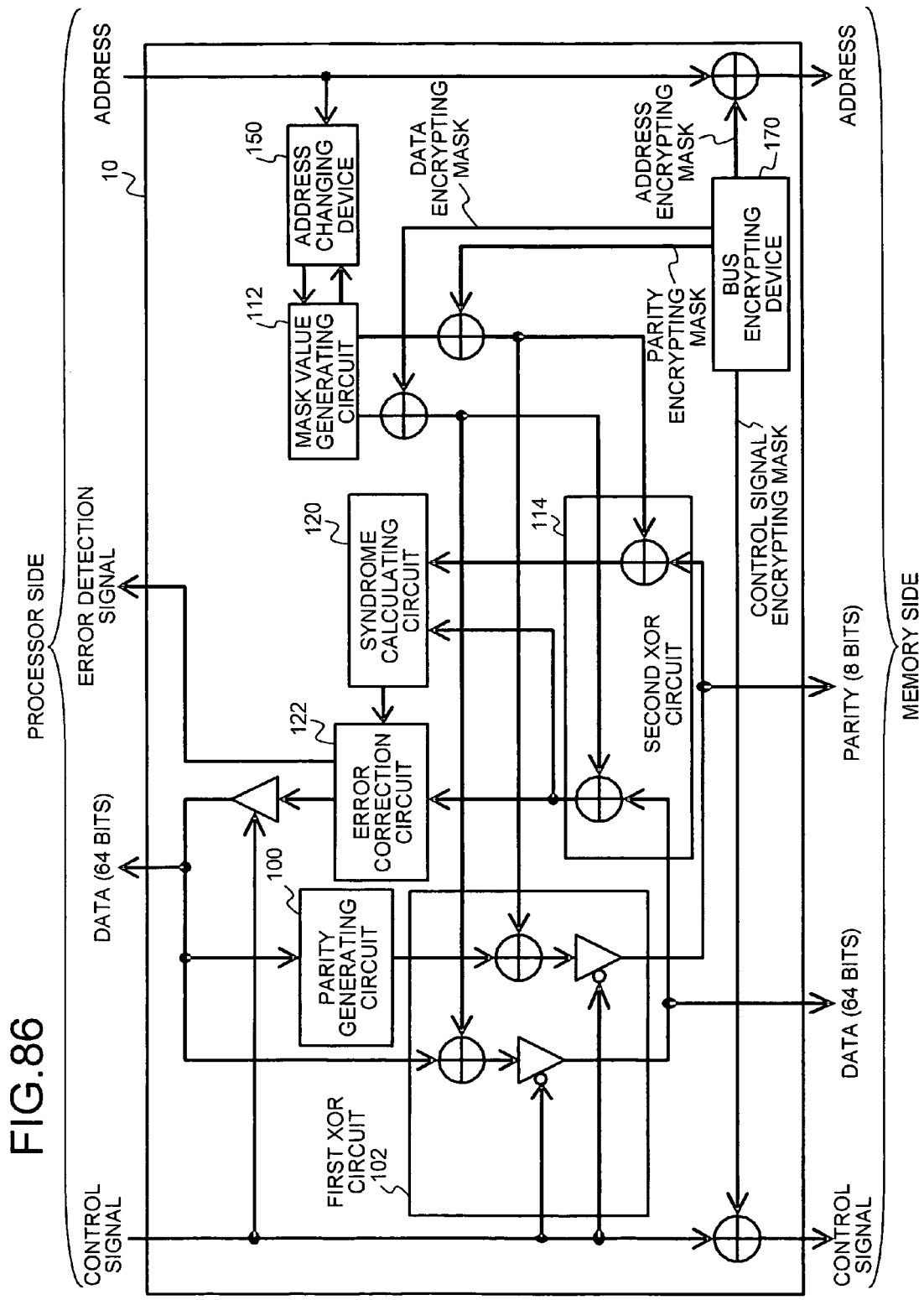
FIG. 86 is a block diagram showing the functional structure of the memory access control apparatus in accordance with a third modification of the twelfth embodiment.

FIG. 86 is a block diagram showing the functional structure of a memory access control apparatus 10 in accordance with a third modification. The memory access control apparatus 10 in accordance with the third modification includes a bus encrypting device 170 in addition to the functional structure of the memory access control apparatus 10 of the eighth embodiment.

Figure 87:
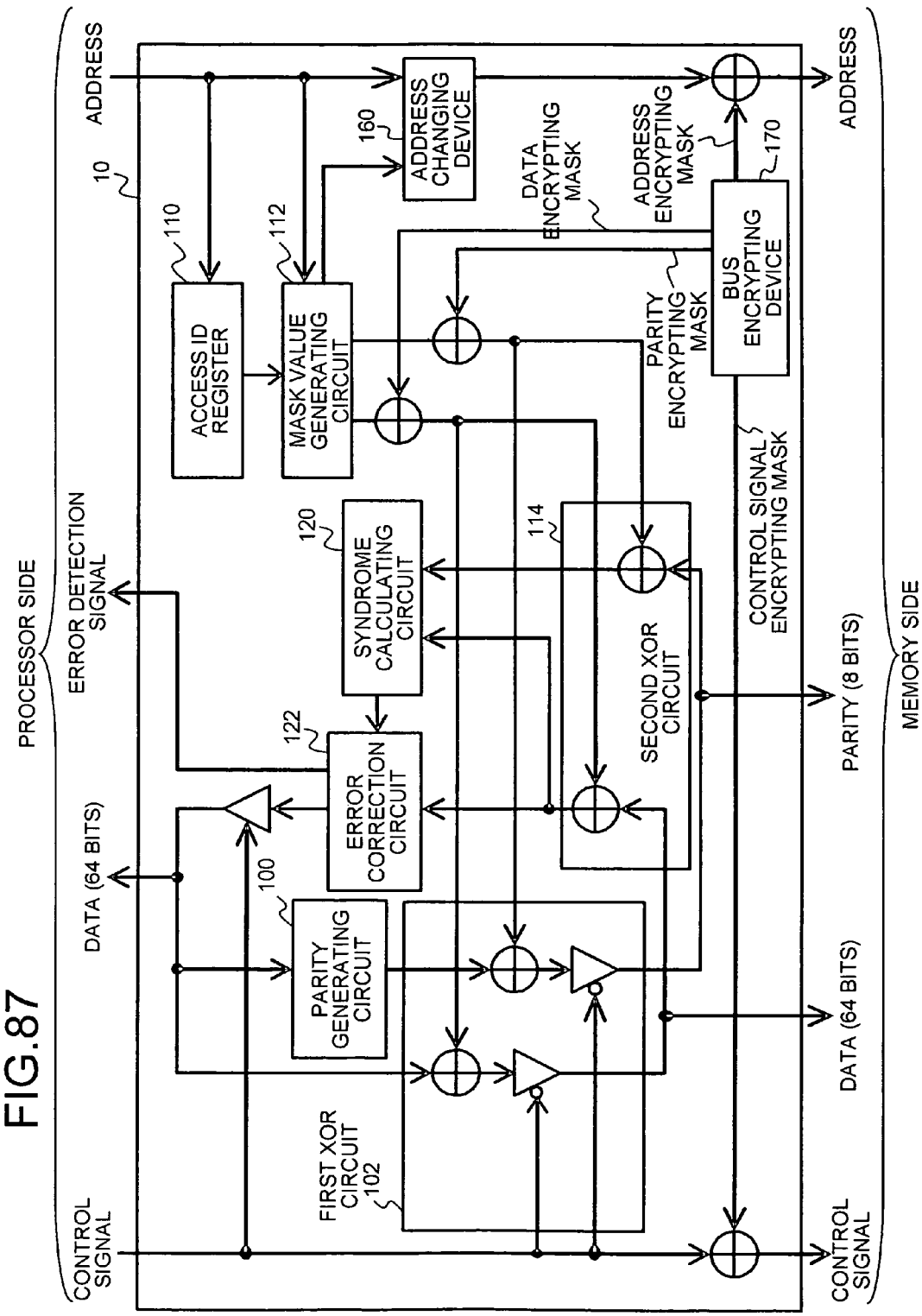
FIG. 87 is a block diagram showing the functional structure of the memory access control apparatus in accordance with a fourth modification of the twelfth embodiment.

FIG. 87 is a block diagram showing the functional structure of a memory access control apparatus 10 in accordance with a fourth modification. The memory access control apparatus 10 in accordance with the fourth modification includes a bus encrypting device 170 in addition to the functional structure of the memory access control apparatus 10 of the tenth embodiment.

Figure 88:
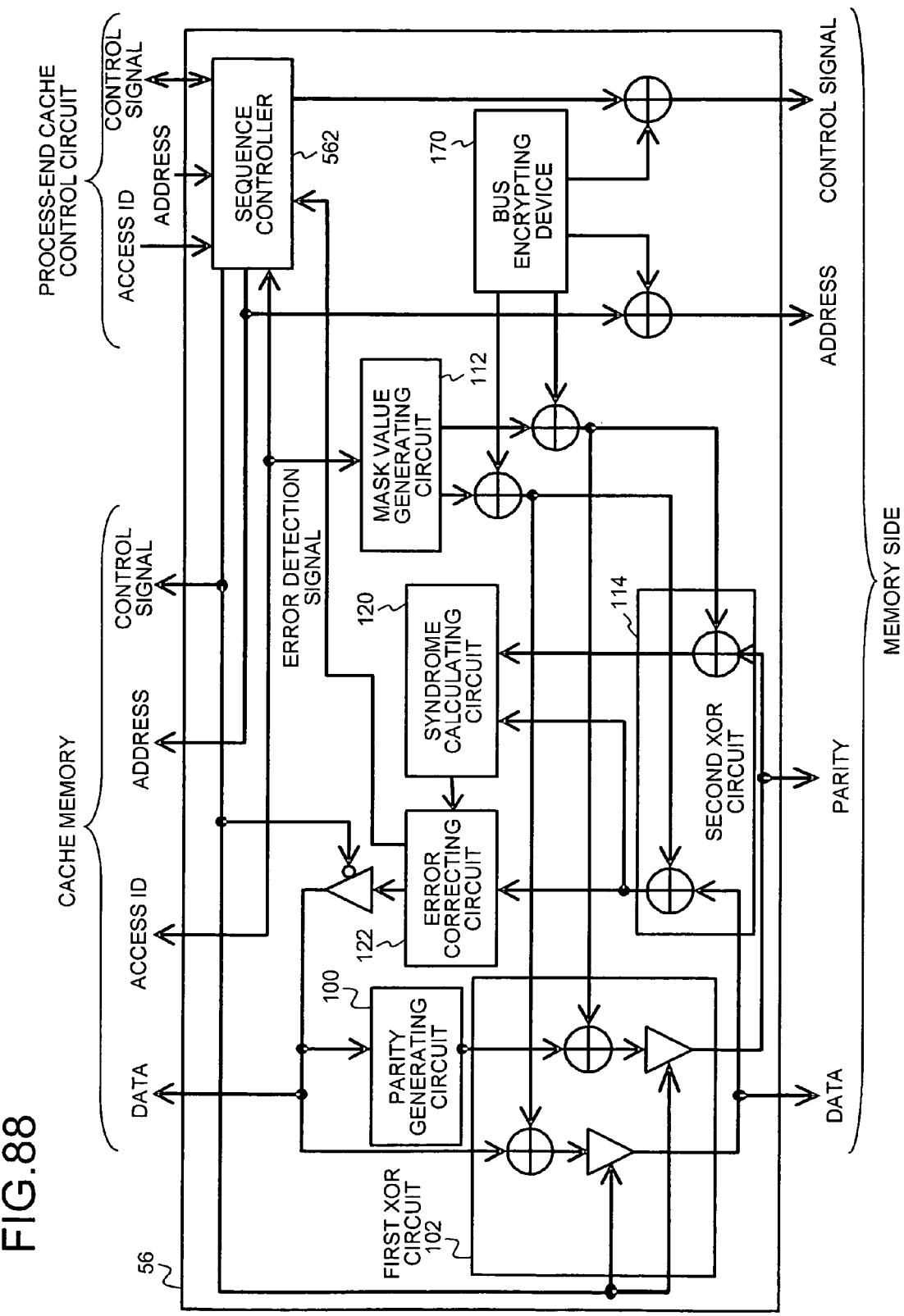
FIG. 88 is a block diagram showing the functional structure of the memory access control apparatus in accordance with a fifth modification of the twelfth embodiment.

FIG. 88 is a block diagram showing the functional structure of a memory access control apparatus 10 in accordance with a fifth modification. The memory access control apparatus 10 in accordance with the fifth modification includes a bus encrypting device 170 in addition to the functional structure of the memory-end cache control circuit 56 of the ninth embodiment.

As described above, the bus encrypting device 170 of the twelfth embodiment may be applied to the access control system 1 of some other embodiment. In this manner, the original data are masked by the mask values generated with respect to addresses by the access control apparatus to check the rights of access and the mask values generated by the bus encrypting devices without regard to the addresses through XOR operations. Accordingly, it becomes even more difficult to estimate the data and the mask values of the two types. Thus, higher security can be achieved.

As in the other foregoing embodiments, the access control apparatus 10 that is characteristic of each of the access control systems 1 of the ninth through twelfth embodiments may be applied to the other systems shown in FIGS. 48 to 54.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. An access control apparatus to control an access among a writer, a reader, and a memory, comprising:
    a parity generator that generates a parity for original data to be written into the memory;
    a parity adder that generates parity-added data by adding the parity generated by the parity generator to the original data;
    a first syndrome generator that generates a first syndrome which is a value associated with a first access code used by the writer to request writing of the original data into the memory;
    a first mask generator that generates the first mask data, based on the first syndrome, the first access code, and a first memory address at which the original data is to be written by the writer;
    a first XOR unit that obtains first post-operation data by calculating an XOR between the parity-added data and the first mask data;
    a writing unit that writes the first post-operation data into the memory;
    a second syndrome generator that generates a second syndrome which is a value associated with a second access code used by the reader to request reading of data from the memory;
    a second mask generator that generates the second mask data, based on the second syndrome, the second access code, and a second memory address from which the data is to be read by the reader;
    a reading unit that reads the first post-operation data from the memory;
    a second XOR unit that obtains second post-operation data by calculating an XOR between the second mask data and the first post-operation data;
    a data syndrome calculator that calculates a real data syndrome based on the second post-operation data; and
    an output determining unit that determines whether the second post-operation data is to be output as the original data, based on the real data syndrome.

2. The access control apparatus according to claim 1, further comprising:
    a first address acquirer that acquires the first memory address from the writer;
    a first code storage that stores the first memory address and the first access code associated with each other;
    a first code specifier that determines the first access code that is stored in the first code storage and is associated with the first memory address acquired by the first address acquirer;
    a second address acquirer that acquires the second memory address from the reader;
    a second code storage that stores the second memory address and the second access code associated with each other; and
    a second code specifier that determines the second access code that is stored in the second code storage and is associated with the second memory address acquired by the second address acquirer, wherein
    the first syndrome generator generates the first syndrome, based on the first access code determined by the first code specifier, and the second syndrome generator generates the second syndrome, based on the second access code determined by the second code specifier.

3. The access control apparatus according to claim 1, further comprising:
    a writer address changer that changes the first memory address to a different address; and
    a reader address changer that changes the second memory address to a different address, wherein
    the first syndrome generator generates the first syndrome, based on the first memory address changed by the writer address changer,
    the first mask generator generates the first mask data, based on the first memory address changed by the writer address changer,
    the second syndrome generator generates the second syndrome, based on the second memory address changed by the reader address changer, and
    the second mask generator generates the second mask data, based on the second memory address changed by the reader address changer.

4. The access control apparatus according to claim 1, wherein the writer and the reader are a processor or a process.

5. The access control apparatus according to claim 1, further comprising:
    a random number generator that generates the same random numbers as random numbers generated in the memory;
    an random XOR unit that performs an XOR operation between the random values generated by the random generator and a memory address of a region to be accessed in the memory; and
    a post-operation address transmitter that transmits a post-operation address that is an operation result of the random XOR unit.

6. The access control apparatus according to claim 1, further comprising:
    a first code acquirer that acquires the first access code from the writer; and
    a second code acquirer that acquires the second access code from the reader, wherein
    the first syndrome generator generates the first syndrome, based on the first access code acquired by the first code acquirer, and
    the second syndrome generator generates the second syndrome, based on the second access code acquired by the second code acquirer.

7. The access control apparatus according to claim 6, wherein
    the first code acquirer acquires the first access code via a first dedicated line that is connected to the writer; and
    the second code acquirer acquires the second access code via a second dedicated line that is connected to the reader.

8. The access control apparatus according to claim 1, further comprising:
    a writer ID acquirer that acquires a writer ID for identifying the writer;
    a first code specifier that determines the first access code, based on the writer ID acquired by the writer ID acquirer;
    a reader ID acquirer that acquires a reader ID for identifying the reader; and
    a second code specifier that determines the second access code, based on the reader ID acquired by the reader ID acquirer, wherein
    the first syndrome generator generates the first syndrome, based on the first access code determined by the first code specifier, and the second syndrome generator generates the second syndrome, based on the second access code determined by the second code specifier.

9. The access control apparatus according to claim 8, further comprising:
a first code storage that stores the writer ID and the first access code associated with each other; and
a second code storage that stores the reader ID and the second access code associated with each other, wherein
the first code specifier determines the first access code that is stored in the first code storage and is associated with the writer ID acquired by the writer ID acquirer, and
the second code specifier determines the second access code that is stored in the second code storage and is associated with the reader ID acquired by the reader ID acquirer.

10. The access control apparatus according to claim 9, further comprising:
a first address acquirer that acquires the first memory address from the writer; and
a second address acquirer that acquires the second memory address from the reader, wherein
the first code storage further stores the first memory address associated with the first access code,
the first code specifier determines the first access code that is stored in the first code storage and is associated with the first memory address acquired by the first address acquirer,
the second code storage further stores the second memory address associated with the second access code, and
the second code specifier determines the second access code that is stored in the second code storage and is associated with the second memory address acquired by the second address acquirer.

11. The access control apparatus according to claim 1, wherein
the first mask generator comprises
a first data mask generator that generates a data mask for masking the original data, based on the first access code and the first memory address; and
a first parity mask generator that generates a parity mask for masking the parity generated by the parity generator, the parity mask being an XOR between a syndrome of the data mask generated by the data mask generator and the first syndrome generated by the first syndrome generator,
the second mask generator comprises
a second data mask generator that generates a data mask for masking a portion of the first post-operation data corresponding to the original data, based on the second access code and the second memory address; and
a second parity mask generator that generates a parity mask for masking a portion of the first post-operation data corresponding to the parity, the parity mask being an XOR between a syndrome of the data mask generated by the data mask generator and the second syndrome generated by the second syndrome generator,
the first XOR unit calculates an XOR between the original data and the data mask generated by the first data mask generator, and calculates an XOR between the parity and the parity mask generated by the first parity mask generator, and
the second XOR unit calculates an XOR between a data portion of the first post-operation data and the data mask generated by the second data mask generator, and an XOR between a parity portion of the first post-operation data and the parity mask generated by the second parity mask generator.

12. The access control apparatus according to claim 11, wherein the first data mask generator and the second data mask generator each comprise a Linear Feedback Shift Registers (LFSR) delay calculator.

13. The access control apparatus according to claim 12, wherein the LFSR delay calculator operates using a different parameter for each of the first access code and the second access code.

14. The access control apparatus according to claim 11, wherein the first data mask generator and the second data mask generator each comprise a zero-shifter that shifts each memory address.

15. The access control apparatus according to claim 11, wherein the first data mask generator and the second data mask generator each comprise an address separator that changes values of successive memory addresses to values that are more distant to each other.

16. The access control apparatus according to claim 11, wherein the first data mask generator and the second data mask generator each comprise
a plurality of LFSR delay calculators; and
an XOR unit that calculates an XOR between output values from at least two LFSR delay calculators among output values of the plurality of LFSR delay calculators.

17. The access control apparatus according to claim 16, wherein the LFSR delay calculator operates using a different parameter for each of the first access code and the second access code.

18. The access control apparatus according to claim 17, further comprising
a data mask generation information storage that stores parameters of the LFSR delay calculator, the parameters being associated with the first access code or the second access code, wherein
the LFSR delay calculator operates using the parameters that are stored in the data mask generation information storage and are associated with the first access code or the second access code.

19. An access control system comprising:
a processor;
a memory controller; and
a memory access control apparatus that controls access to a memory,
the memory access control apparatus comprising
a parity generator that generates a parity for original data to be written into the memory;
a parity adder that generates parity-added data by adding the parity generated by the parity generator to the original data;
a first syndrome generator that generates a first syndrome of first mask data to mask the parity-added data, the first syndrome being a value associated beforehand with a first access code that is information to be used when a writer accesses the memory, the writer requesting writing of the original data into the memory;
a first mask generator that generates the first mask data, based on the first syndrome, the first access code, and a first memory address at which the original data is to be written;
a first XOR unit that obtains first post-operation data by calculating an XOR between the parity-added data and the first mask data;

a writing unit that writes the first post-operation data into the memory;

a second syndrome generator that generates a second syndrome of second mask data to mask the first post-operation data, the second syndrome being a value associated beforehand with a second access code that is information to be used when a reader accesses the memory, the reader requesting reading of data from the memory;

a second mask generator that generates the second mask data, based on the second syndrome, the second access code, and a second memory address from which the data is to be read;

a reading unit that reads the first post-operation data from the memory;

a second XOR unit that obtains second post-operation data by calculating an XOR between the second mask data and the first post-operation data;

a data syndrome calculator that calculates a real data syndrome based on the second post-operation data; and an output determining unit that determines whether the second post-operation data is to be output as the original data, based on the real data syndrome.

20. An access control system comprising:

a processor;

a memory access control apparatus that controls access to a memory, the memory access control apparatus comprising a parity generator that generates a parity for original data to be written into the memory;

a parity adder that generates parity-added data by adding the parity generated by the parity generator to the original data;

a first syndrome generator that generates a first syndrome of first mask data to mask the parity-added data, the first syndrome being a value associated beforehand with a first access code that is information to be used when a writer accesses the memory, the writer requesting writing of the original data into the memory;

a first mask generator that generates the first mask data, based on the first syndrome, the first access code, and a first memory address at which the original data is to be written;

a first XOR unit that obtains first post-operation data by calculating an XOR between the parity-added data and the first mask data; and a writing unit that writes the first post-operation data into the memory;

a second syndrome generator that generates a second syndrome of second mask data to mask the first post-operation data, the second syndrome being a value associated beforehand with a second access code that is information to be used when a reader accesses the memory, the reader requesting reading of data from the memory;

a second mask generator that generates the second mask data, based on the second syndrome, the second access code, and a second memory address from which the data is to be read;

a reading unit that reads the first post-operation data from the memory;

a second XOR unit that obtains second post-operation data by calculating an XOR between the second mask data and the first post-operation data;

a data syndrome calculator that calculates a real data syndrome based on the second post-operation data; and an output determining unit that determines whether the second post-operation data is to be output as the original data, based on the real data syndrome.

21. A processor that is equipped with a memory controller and a memory access control apparatus that controls access to a memory, the processor comprising:

a parity generator that generates a parity for original data to be written into the memory;

a parity adder that generates parity-added data by adding the parity generated by the parity generator to the original data;

a first syndrome generator that generates a first syndrome of first mask data to mask the parity-added data, the first syndrome being a value associated beforehand with a first access code that is information to be used when a writer accesses the memory, the writer requesting writing of the original data into the memory;

a first mask generator that generates the first mask data, based on the first syndrome, the first access code, and a first memory address at which the original data is to be written;

a first XOR unit that obtains first post-operation data by calculating an XOR between the parity-added data and the first mask data;

a writing unit that writes the first post-operation data into the memory;

a second syndrome generator that generates a second syndrome of second mask data to mask the first post-operation data, the second syndrome being a value associated beforehand with a second access code that is information to be used when a reader accesses the memory, the reader requesting reading of data from the memory;

a second mask generator that generates the second mask data, based on the second syndrome, the second access code, and a second memory address from which the data is to be read;

a reading unit that reads the first post-operation data from the memory;

a second XOR unit that obtains second post-operation data by calculating an XOR between the second mask data and the first post-operation data;

a data syndrome calculator that calculates a real data syndrome based on the second post-operation data; and an output determining unit that determines whether the second post-operation data is to be output as the original data, based on the real data syndrome.

22. An access control method comprising:

generating a parity for original data to be written into a memory;

generating parity-added data by adding the parity generated to the original data;

generating a first syndrome of first mask data to mask the parity-added data, the first syndrome being a value associated beforehand with a first access code that is information to be used when a writer accesses the memory, the writer requesting writing of the original data into the memory;

generating the first mask data based on the first syndrome, the first access code, and a first memory address at which the original data is to be written;

acquiring first post-operation data by calculating an XOR between the parity-added data and the first mask data;

writing the first post-operation data into the memory;

generating a second syndrome of second mask data to mask the first post-operation data, the second syndrome being a value associated beforehand with a second access code that is information to be used when a reader accesses the memory, the reader requesting reading of data from the memory;

generating the second mask data, based on the second syndrome, the second access code, and a second memory address from which the data is to be read;

reading the first post-operation data from the memory;

obtaining second post-operation data by calculating an XOR between the second mask data and the first post-operation data;

calculating a real data syndrome based on the second post-operation data; and determining whether the second post-operation data is to be output as the original data, based on the real data syndrome.

23. A memory access control apparatus, comprising:

a read request acquirer that acquires data to be read from a memory, and a memory address at which the data is to be read, the data and the memory address being acquired from a reader that requests the reading of the data from the memory;

a cache memory monitor that determines whether the memory address acquired by the read request acquirer is stored in a cache memory that stores data, a memory address of the data, and a request or access code in association with one another, the data being requested to be written into the memory by a writer that requests writing of the data into the memory or being requested to be read from the memory by the reader, the requestor access code being information to be used when a writer or a reader that is allowed to access the data accesses the memory;

an access code comparator that compares the requestor access code, which is associated with the memory address in the cache memory, with a second access code that is information to be used by the reader to access the memory, when the cache memory monitor determines that the memory address is stored in the cache memory; and an output unit that outputs the data associated with the memory address in the cache memory to the reader, when the requestor access code matches the second access code.

24. The memory access control apparatus according to claim 23, wherein the data stored in the memory is first post-operation data that is obtained by performing a predetermined operation on the data acquired by the read request acquirer, and the memory access control apparatus further comprises a second syndrome generator that generates a second syndrome of second mask data to mask the data stored in the memory, when the cache memory monitor determines that the memory address of the data acquired by the read request acquirer is not stored in the cache memory, the second syndrome being a value associated beforehand with the second access code;

a second mask generator that generates the second mask data, based on the second syndrome, the second access code, and the memory address;

a reading unit that reads the first post-operation data from the memory;

a first XOR unit that obtains second post-operation data by calculating an XOR between the second mask data and the first post-operation data read from the reading unit;

a data syndrome calculator that calculates a real data syndrome based on the post-operation data; and an output determining unit that determines whether the second post-operation data is to be output as the data requested by the reader, based on the data syndrome.

25. The memory access control apparatus according to claim 23, further comprising:

a write request acquirer that acquires data to be written into the memory, and a memory address at which the data is to be written, the data and the memory address being acquired from a writer that requests the writing of the data into memory;

an code storage that stores the memory address in association with a first access code that is information to be used when a writer allowed to write data at the memory address makes an access at the memory address; and a data storage that stores the data and the memory address acquired by the write request acquirer in association with the first access code that is the information to be used by the writer accessing the memory in the cache memory, when the memory address acquired by the write request acquirer is associated with the first access code of the writer in the access code storage.

26. The memory access control apparatus according to claim 24, further comprising:

a parity generator that generates a parity of the data stored in the data storage;

a parity adder that generates parity-added data by adding the parity generated by the parity generator to the data;

a first syndrome generator that generates a first syndrome of first mask data to mask the parity-added data having the parity-added thereto, the first syndrome being a value that is associated beforehand with the first access code that is the information used by the writer to write the data into the memory;

a first mask generator that generates the first mask data, based on the first syndrome, the first access code, and the memory address;

a first XOR unit that obtains first post-operation data by calculating an XOR between the parity-added data and the first mask data; and a writing unit that writes the first post-operation data as the data into the memory.

27. An access control system comprising:

a processor;

a cache memory;

a memory access control apparatus that controls access to a memory, the cache memory storing data requested by a writer that requests writing of the data into the memory or a reader that requests reading of the data from the memory, a memory address of the data, and requests or access code that is information to be used when a writer or a reader that is allowed to access the data accesses the memory, the data and the memory address being associated with the requestor access code, the memory access control apparatus comprising a read request acquirer that acquires from the reader the data to be read from the memory and the memory address of the data;

a cache memory monitor that determines whether the memory address acquired by the read requests acquirer is stored in the cache memory;

an access code comparator that compares the requests or access code associated with the memory address in the cache memory with a second access code that is information to be used by the reader to access the memory, when the cache memory monitor determines that the memory address is stored in the cache memory; and an output unit that outputs the data associated with the memory address in the cache memory to the reader, when the requestor access code matches the second access code, wherein the data stored in the memory is first post-operation data that is obtained by performing a predetermined operation on the data acquired by the read request acquirer, and the memory access control apparatus further comprises a second syndrome generator that generates a second syndrome of second mask data to mask the data stored in the memory, when the cache memory monitor determines that the memory address of the data acquired by the read request acquirer is not stored in the cache memory, the second syndrome being a value associated beforehand with the second access code;

a second mask generator that generates the second mask data, based on the second syndrome, the second access code and the memory address;

a reading unit that reads the first post-operation data from the memory;

a first XOR unit that obtains second post-operation data by calculating an XOR between the second mask data and the first post-operation data read from the reading unit;

a data syndrome calculator that calculates a real data syndrome based on the post-operation data; and an output determining unit that determines whether the second post-operation data is to be output as the data requested by the reader, based on the data syndrome.

28. A memory access control method, comprising:

acquiring data to be read from a memory and a memory address at which the data is to be read, the data and the memory address being acquired from a reader that requests the reading of the data from the memory;

determining whether the memory address acquired is stored in a cache memory that stores data, a memory address of the data, and a requestor access code in association with one another, the data being requested to be written into the memory by a writer that requests writing of the data into the memory or being requested to be read from the memory by the reader, the requestor access code being information to be used when a writer or a reader that has a right of access to the data accesses the memory;

comparing the requestor access code, which is associated with the memory address in the cache memory, with a second access code that is information to be used by the reader to access the memory, when the memory address is stored in the cache memory;

outputting the data associated with the memory address in the cache memory to the reader, when the requestor access code matches the second access code, wherein the data stored in the memory is first post-operation data that is obtained by performing a predetermined operation on the data acquired by the read request acquirer; and generating a second syndrome of second mask data to mask the data stored in the memory, when the cache memory monitor determines that the memory address of the data acquired by the read request acquirer is not stored in the cache memory, the second syndrome being a value associated beforehand with the second access code;

generating the second mask data, based on the second syndrome, the second access code, and the memory address;

reading the first post-operation data from the memory;

obtaining second post-operation data by calculating an XOR between the second mask data and the first post-operation data read from the reading unit;

calculating a real data syndrome based on the post-operation data; and determining whether the second post-operation data is to be output as the data requested by the reader, based on the data syndrome.

* * * * *